United States Patent [19]

Cunningham

[11] Patent Number: 5,601,895
[45] Date of Patent: Feb. 11, 1997

[54] FLEXIBLE PUNCTURE PROOF MATERIAL

[76] Inventor: Frank W. Cunningham, 1801 Via Estudillo, Palos Verdes Estates, Calif. 90274

[21] Appl. No.: 365,056

[22] Filed: Dec. 28, 1994

Related U.S. Application Data

[63] Continuation-in-part of Ser. No. 60,734, May 10, 1993, abandoned.

[51] Int. Cl.$^6$ ........................................... F41H 1/02
[52] U.S. Cl. ........................ 428/66.6; 2/2.5; 2/16; 2/161.7; 2/167; 128/878; 128/880; 428/131; 428/137; 428/138; 428/174; 428/213; 428/220; 428/323; 428/447; 428/911
[58] Field of Search ..................... 428/65, 911, 731, 428/137, 138, 174, 213, 220, 447, 323, 66.6; 128/878, 880, 161.7; 2/2.5, 161 R, 16, 167

[56] References Cited

U.S. PATENT DOCUMENTS

| | | | |
|---|---|---|---|
| 3,633,216 | 1/1972 | Schemholtz | 2/168 |
| 4,526,828 | 7/1985 | Fogt | 428/229 |
| 4,538,301 | 9/1985 | Sawatzki | 428/911 |
| 4,559,251 | 12/1985 | Wachi | 428/911 |
| 4,742,578 | 5/1988 | Seid | 2/2.5 |
| 4,779,290 | 10/1988 | Welch | 2/161 R |
| 4,833,733 | 5/1989 | Welch | 2/169 |
| 4,864,661 | 9/1989 | Gimbel | 2/167 |
| 4,881,277 | 11/1989 | Hogle | 2/169 |
| 4,901,372 | 2/1990 | Pierce | 2/167 |
| 4,942,626 | 7/1990 | Stern | 2/161 R |
| 4,947,487 | 8/1990 | Saffer | 2/167 |
| 4,951,689 | 8/1990 | Jones | 2/2.5 |
| 5,014,361 | 7/1991 | Gray | 2/167 |
| 5,070,540 | 12/1991 | Bettcher | 2/2.5 |
| 5,087,499 | 2/1992 | Sullivan | 428/85 |
| 5,187,815 | 2/1993 | Stern | 2/161 R |
| 5,200,263 | 4/1993 | Gould | 2/2.5 |

FOREIGN PATENT DOCUMENTS

| | | | |
|---|---|---|---|
| 3895 | 11/1983 | WIPO | |
| 13250 | 8/1992 | WIPO | 2/2.5 |

*Primary Examiner*—Nasser Ahmad
*Attorney, Agent, or Firm*—Lee W. Tower

[57] ABSTRACT

In one embodiment a flexible puncture proof material for preventing a puncture by a sharp element having a pointed end includes a flexible layer for providing a flexible substrate for binding and embedding capture elements, a first plurality of capture elements for capturing the pointed end of the sharp element, the first plurality of capture elements being essentially identical and arranged in a first two dimensional array embedded in the flexible layer, a second plurality of capture elements being essentially identical and arranged in a second two dimensional array bound to and embedded in the flexible layer, the second two dimensional array offset relative to the first two dimensional array for capturing the pointed end of the sharp element if the pointed end of the sharp element passes between the first plurality of capture elements, and a third plurality of capture elements for capturing the pointed end of the sharp element, the third plurality of capture elements arranged in a third two dimensional array embedded in the flexible layer, the third two dimensional array offset relative to the first and second two dimensional array for capturing the pointed end of the sharp element if the pointed end of the sharp element passes between the first and second plurality of capture elements wherein each of the plurality of capture elements has at least one aperture large enough to accept and capture the pointed end of the sharp element and small enough to prevent the pointed end from passing through the aperture.

48 Claims, 37 Drawing Sheets

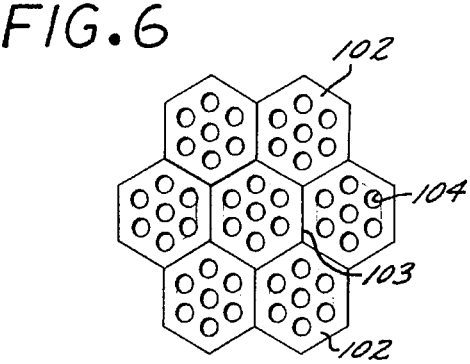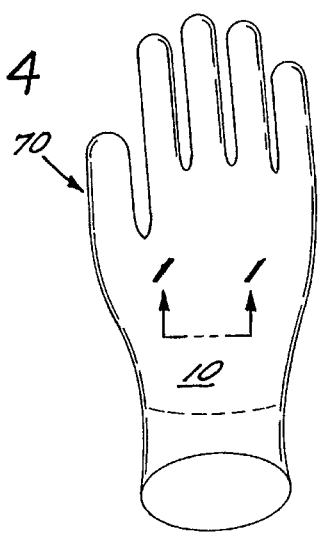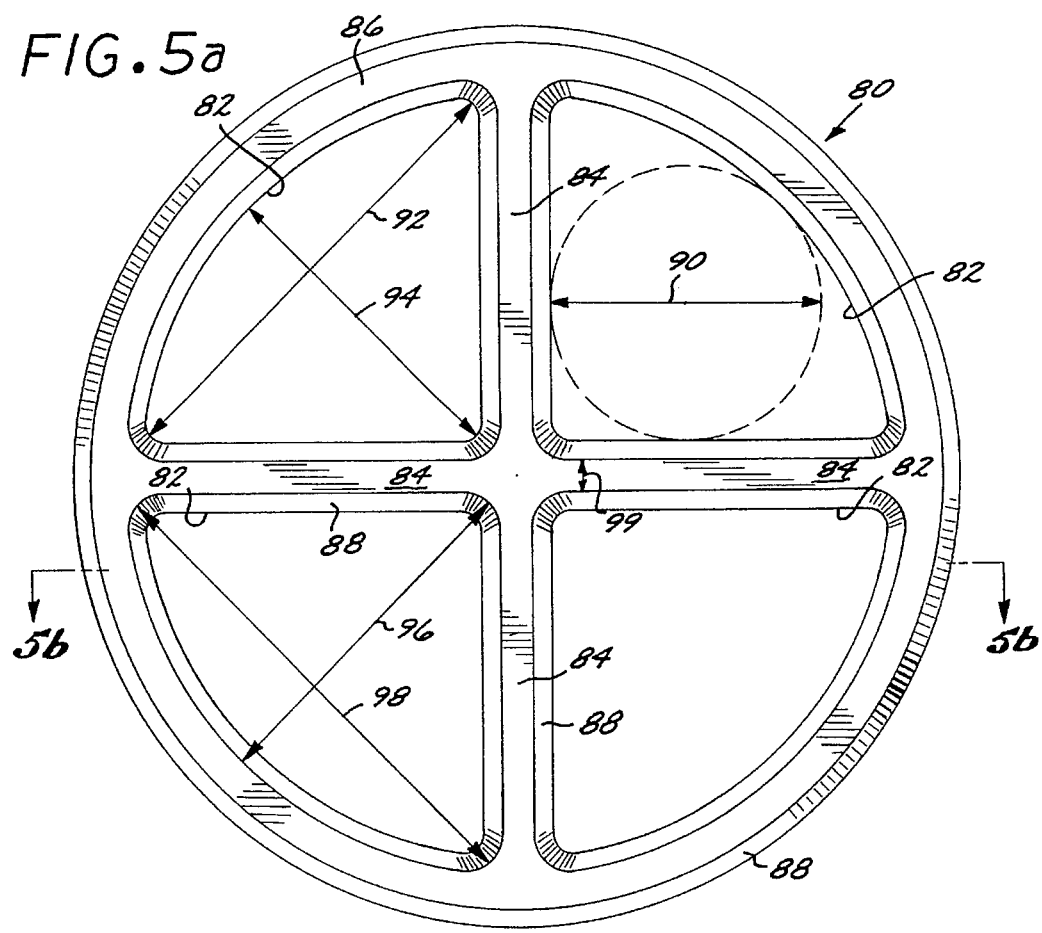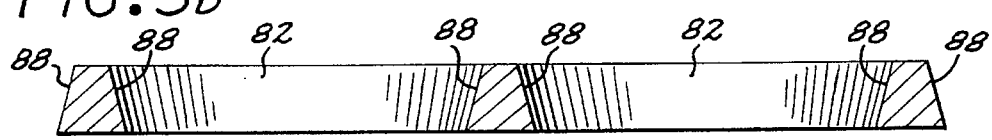

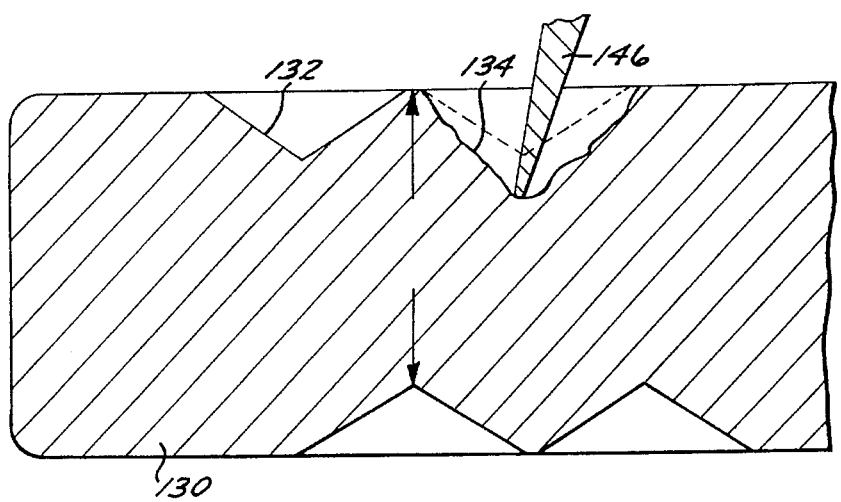
FIG. 9b
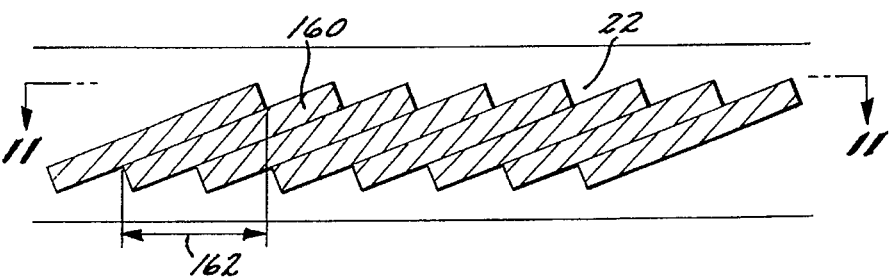
FIG. 10
FIG. 11
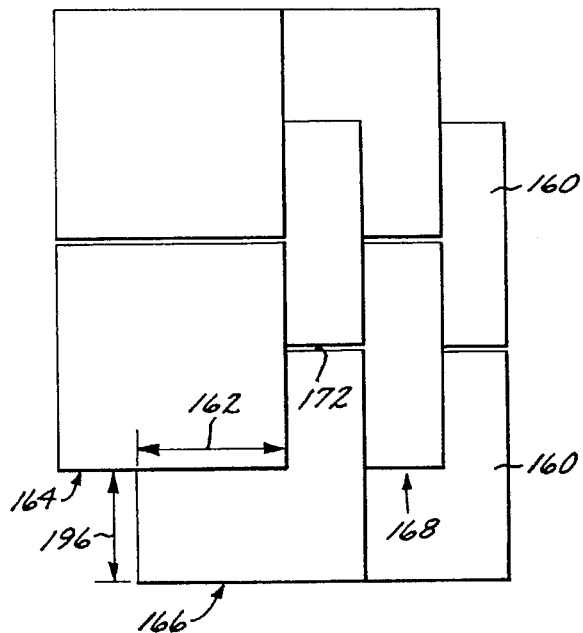
FIG. 12a
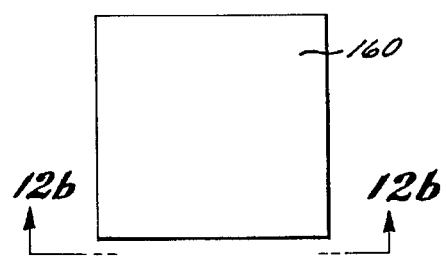
FIG. 12b

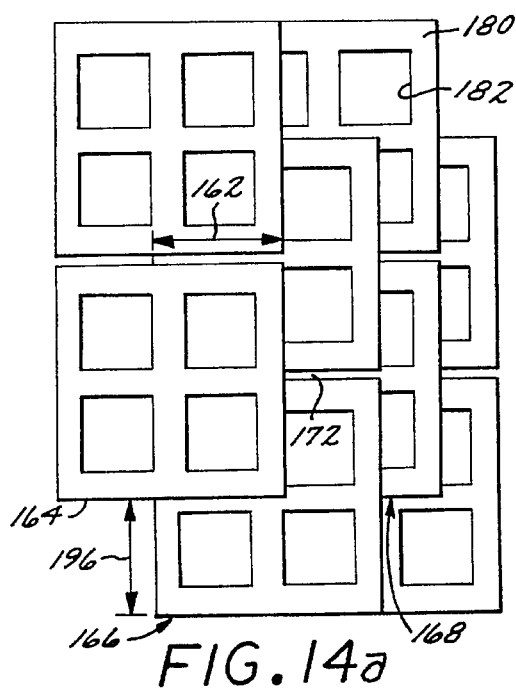
FIG.13a
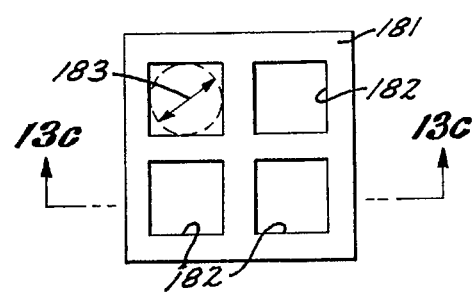
FIG.13b
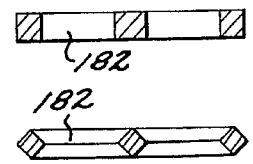
FIG.13c
FIG.13d
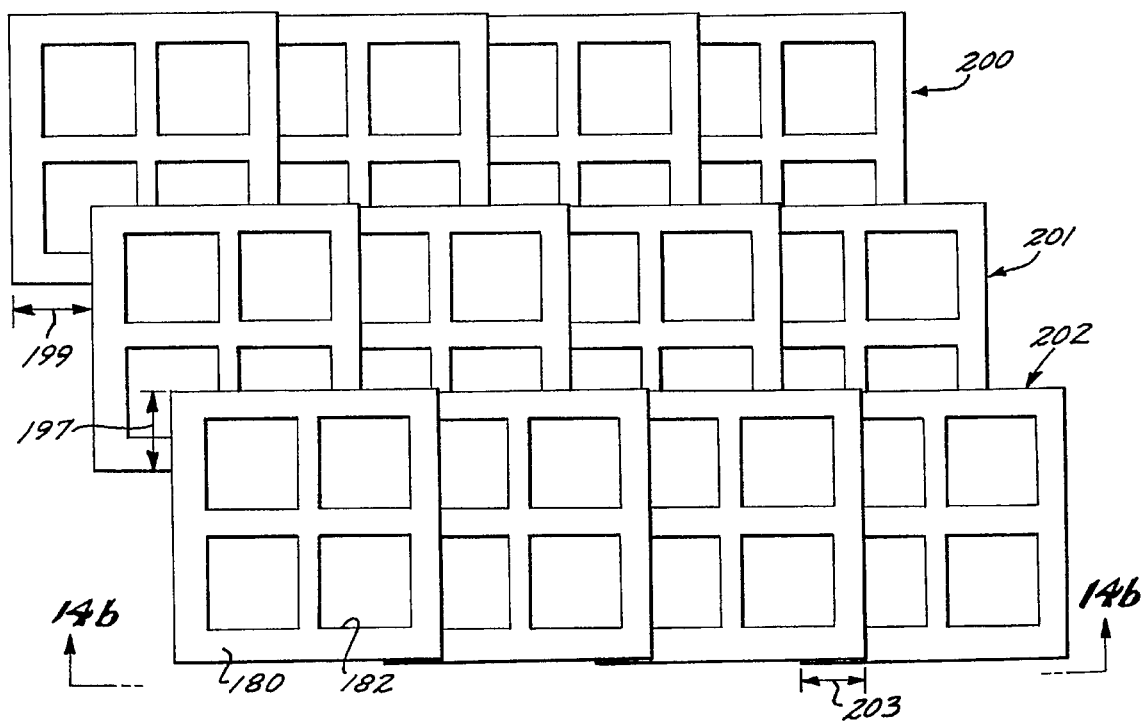
FIG.14a
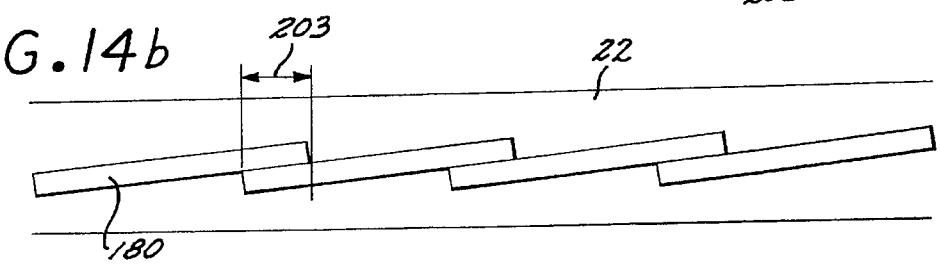
FIG.14b FIG. 15
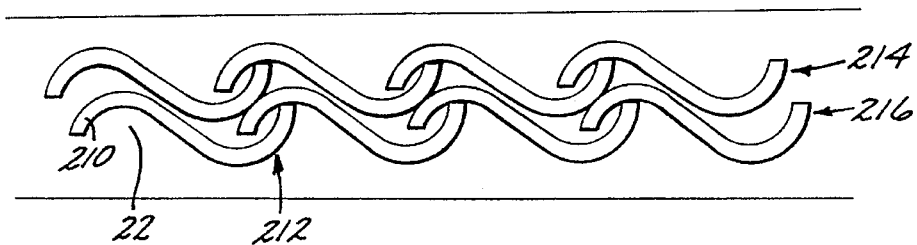
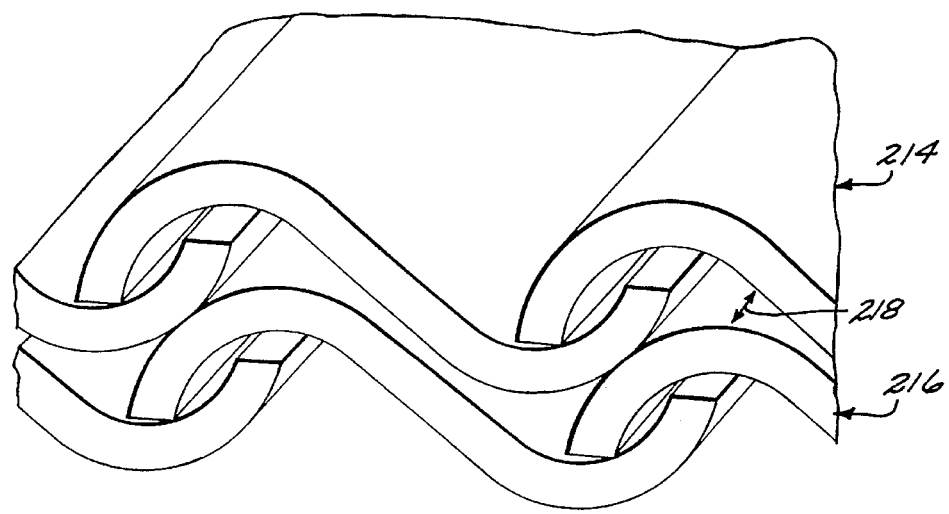
FIG. 16
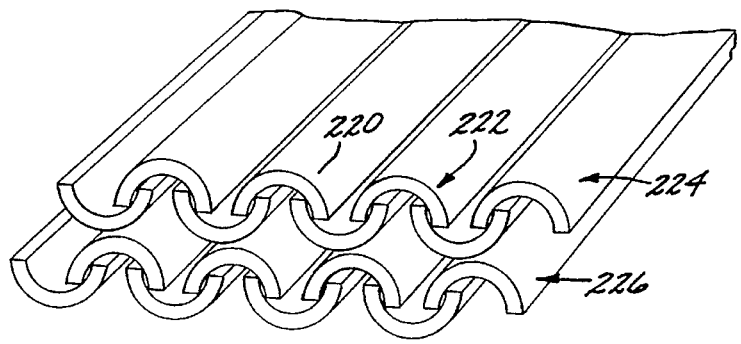
FIG. 17

FIG. 22
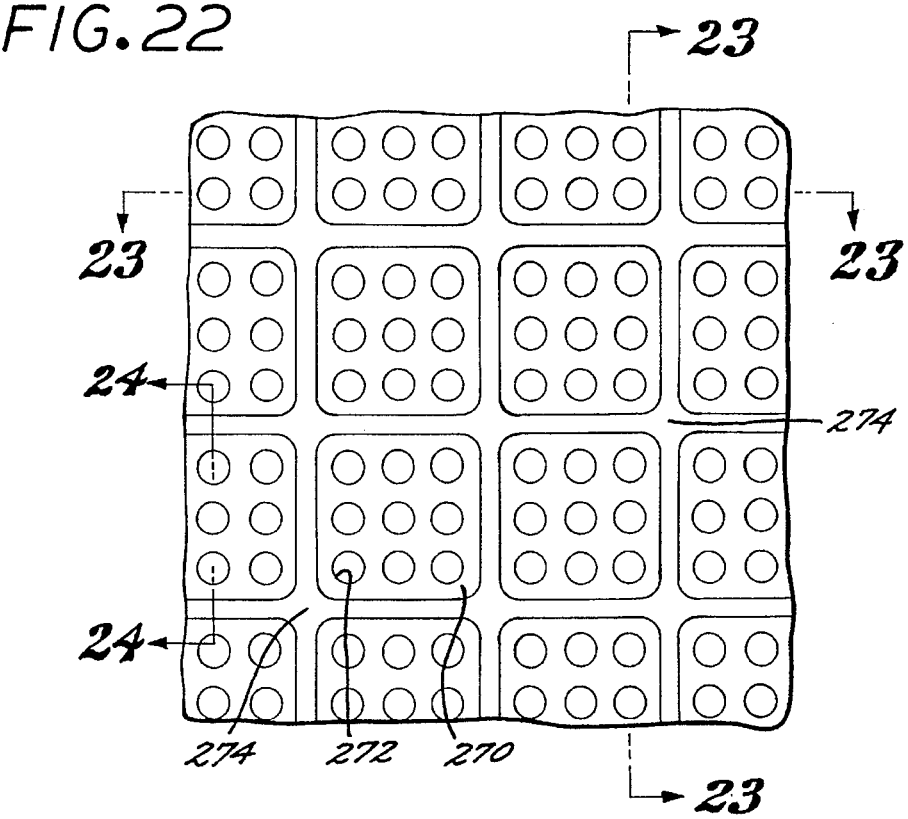
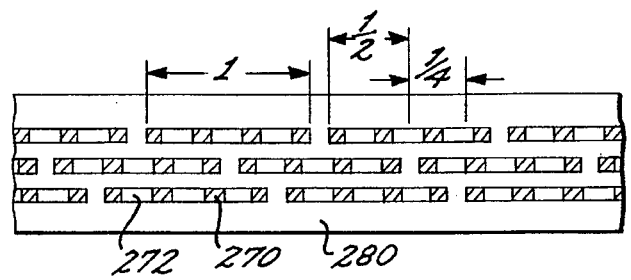
FIG. 23
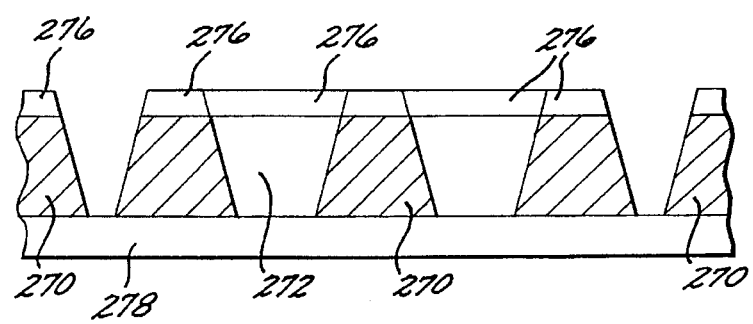
FIG. 24

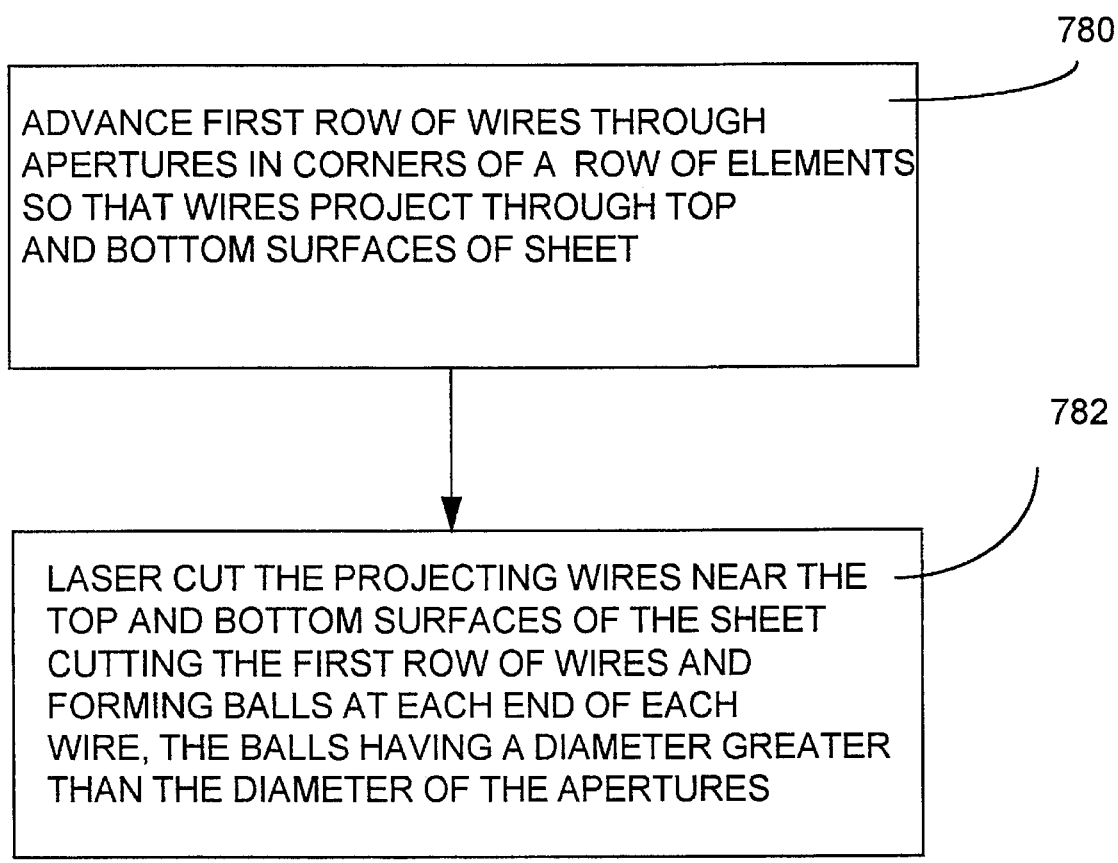

FLEXIBLE PUNCTURE PROOF MATERIAL

CROSS-REFERENCE TO RELATED APPLICATION

This is a continuation-in-part of application Ser. No. 08/060,734 filed on May 10, 1993 now abandoned.

BACKGROUND OF THE INVENTION

1. Field of the Invention

This invention relates to a protective puncture proof material and more particularly to a flexible puncture proof material to protect against accidental injuries from needles, scalpel blades, knives and other sharp pointed instruments.

2. Description of the Related Art

Protection from accidental cuts and punctures is needed in the fields of medicine and law enforcement, and in any occupation where sharp instruments are encountered and where the combination of flexibility and protection against cuts and puncture wounds is needed.

Accidental needle sticks and scalpel blade cuts occur to doctors and nurses, while performing surgery, giving injections, taking blood samples, and administering intravenous liquids. The accidental needle sticks and scalpel blade cuts by themselves are harmful; however, in a medical situation a cut or puncture can also transmit infection either to the patient or to the medical person performing the procedure.

In the past, the main concern was that a surgeon would infect the patient during surgery. This is still a concern and is adequately addressed by using latex gloves. Unfortunately, it is also increasingly crucial to protect surgeons and other medical personnel from infection. A surgeon can contract hepatitis, AIDS, and other diseases, when the blood or body fluid of a patient is transmitted through the skin of the surgeon. It is estimated that the average surgeon has about three cuts or puncture wounds per month, caused by either a hypodermic needle or a scalpel blade. This presents an unacceptable risk factor for surgeons and other medical personnel. Similarly in a law enforcement situation, an assailant wielding a blood stained knife could seriously injure and infect law enforcement personnel.

Conventionally, surgeons and other medical personnel wear sterilized latex gloves, which are thin and flexible enough to enable a surgeon to freely manipulate his fingers, and to utilize his sense of touch. If the latex gloves are not penetrated then the patient and the surgeon are protected from infection; however, latex gloves offer hardly any protection against accidental punctures or cuts, because hypodermic needles and scalpel blades can easily puncture or cut through a latex glove. Even multiple layers of latex gloves, which medical personnel increasingly use to provide additional protection against transmission of infection, offer no protection against accidental punctures or cuts.

It is important to distinguish between cuts and puncture wounds. A cut is typically from the edge of a scalpel blade. A puncture wound can be caused by the point of a scalpel blade or by the point of a hypodermic needle. A scalpel blade is typically about 0.75 inches long with a sharpened edge and with a point about 0.010 inches in diameter. A hypodermic needle can be as small as 0.010 inches in diameter at the point widening to about 0.018 inches in diameter for the shaft of a No. 27 needle. It is much easier to protect against a cut from an edge of a scalpel blade than to protect against a puncture from either a scalpel blade or a hypodermic needle, because a scalpel blade has a wider surface upon which the pressure of the cut is distributed. For example, if the pressure is 2000 grams, then the pressure per square area for a scalpel blade is 2000/(0.75*0.010), assuming the edge of the scalpel blade is the same sharpness as the point of the scalpel blade (0.010 inches) and that the scalpel blade is 0.75 inches long. For a needle with a 0.010 diameter point the same pressure would have a pressure per square area of $2000/(3.14*(0.010/2)^2)$, which is ninety five times greater than the pressure per square area for the edge of a scalpel blade. This factor of approximately one hundred is a key reason that conventional protective gloves fail to offer adequate protection against punctures.

Most accidents in the operating room occur with some significant force. For example, a surgeon turns and is wounded accidently by the point of a needle or scalpel being handed to him by a nurse, or a surgeon while suturing slips and punctures his hand with a needle. Thus, effective protection against punctures should protect against pressures exceeding 2000 grams. This level of protection is well beyond the protection provided by any conventional puncture resistant gloves.

Conventional approaches to providing increased protection beyond latex gloves against cuts and punctures for a surgeon or other medical personnel include: providing a glove with a weave or knit of a material such as Kevlar, nylon, stainless steel or fiberglass; providing reinforced areas such as on glove fingers; placing foam material between two latex gloves; and providing leather on portions of the glove. Some of the materials, such as leather and Kevlar knits provide protection against cuts, but virtually no protection against punctures.

Conventional protective gloves having a weave or knit of a material such as Kevlar, nylon, stainless steel or fiberglass are characterized by U.S. Pat. Nos. 4,526,828, 5,070,540, 4,833,733, 5,087,499, 4,742,578, and 4,779,290. These approaches have fairly effective protection against cuts, because a material such as a Kevlar weave is hard to cut through. However, a shortcoming of all of these approaches is that the weave or knit is simply spread apart by the wedge on a needle or scalpel point to form a passage as the needle or scalpel point is inserted into the material. Making the weave tighter or thicker does not prevent punctures; moreover, a thicker or tighter weave significantly reduces the flexibility of these gloves and their usefulness. As the number of layers or the thickness of the material increases, the ability of a surgeon to freely manipulate his fingers, and to utilize his sense of touch is significantly reduced.

Conventional protective gloves providing reinforced areas are characterized by U.S. Pat. No. 4,865,661, which has woven fiberglass placed at certain areas on the fingers of a glove and U.S. Pat. No. 5,187,815, which has corrugated metal foil in areas to be reinforced. The shortcoming of these approaches is that the reinforced areas have little flexibility so can only be placed on certain areas, which leaves the rest of the glove without the same protection. Also, even woven fiberglass and corrugated metal may be punctured. The point of a #11 blade will easily pass through metal foil ½ to 1 mil thick.

The approach of placing foam material between two latex layers is the approach of U.S. Pat. No. 4,901,372, which provides little if any protection against cuts and punctures, because the latex and the foam can be easily cut and punctured.

Providing leather on a glove is an approach that provides some protection to cuts; however, little protection to punctures. Even though the pores of the leather may be smaller than the diameter of a needle, a needle will simply make a hole in the leather as it passes through.

Accordingly, there is a need in the art for a puncture proof material that is flexible and protects against accidental injuries from needles, scalpel blades and other sharp pointed instruments.

SUMMARY OF THE INVENTION

An object of the present invention is to provide protection against puncture injuries from needles and other sharp pointed instruments.

Another object of the present invention is to provide a puncture proof material that is flexible enough to use as a surgeon's glove. Another object is to allow the flexible puncture proof material to be scaled for use as protection against knifes and other sharp weapons.

According to the invention, a flexible puncture proof material and methods for constructing the flexible puncture proof material are provided. In one embodiment, a flexible puncture proof material for preventing a puncture by a sharp element having a pointed end includes a flexible layer for providing a flexible substrate and for providing a binding and embedding substrate for binding and embedding capture elements, a first plurality of capture elements for capturing the pointed end of the sharp element, the first plurality of capture elements being essentially identical and arranged in a first two dimensional array bound to and embedded in the flexible layer, a second plurality of capture elements for capturing the pointed end of the sharp element, each capture element being essentially identical to the first plurality of capture elements, the second plurality of capture elements arranged in a second two dimensional array bound to and embedded in the flexible layer, the second two dimensional array offset relative to the first two dimensional array for capturing the pointed end of the sharp element if the pointed end of the sharp element passes between the first plurality of capture elements, and a third plurality of capture elements for capturing the pointed end of the sharp element, each capture element being essentially identical to the first plurality of capture elements, the third plurality of capture elements arranged in a third two dimensional array bound to and embedded in the flexible layer, the third two dimensional array offset relative to the first two dimensional array and to the second two dimensional array for capturing the pointed end of the sharp element if the pointed end of the sharp element passes between the first plurality of capture elements and between the second plurality of capture elements wherein each of the plurality of capture elements has at least one aperture large enough to accept and capture the pointed end of the sharp element and small enough to prevent the pointed end from passing through the aperture.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 4 is a perspective view of a glove composed of a flexible puncture proof material in accordance with the present invention.

FIG. 5a is a plan view of a disc with apertures forming a cartwheel with spokes for use in a flexible puncture proof material in accordance with the present invention.

FIG. 5b is an elevation section along line 5b—5b of FIG. 5a of a disc with apertures forming a cartwheel with spokes in accordance with the present invention.

FIG. 6 is a plan view of an array of hexagonal discs for use in a flexible puncture proof material in accordance with the present invention.

FIG. 9b is an elevation sectional view of a disc with indentations for use in a flexible puncture proof material in accordance with the present invention.

FIG. 10 is an elevation sectional view of a flexible puncture proof material in accordance with the present invention.

FIG. 11 is a fragmentary plan view along line 11—11 of FIG. 10 showing an array of shingles in accordance with the present invention.

FIG. 12a is a plan view of a single shingle of FIG. 11 in accordance with the present invention.

FIG. 12b is a elevation sectional view along line 12b—12b of FIG. 12a in accordance with the present invention.

FIG. 13a is an alternate fragmentary plan view along line 11—11 of FIG. 10 showing an array of shingles in accordance with the present invention.

FIG. 13b is a plan view of a single shingle of FIG. 13a in accordance with the present invention.

FIG. 13c is a elevation sectional view along line 13c—13c of FIG. 13b in accordance with the present invention.

FIG. 13d is an alternate elevation sectional view along line 13c—13c of FIG. 13b in accordance with the present invention.

FIG. 14a is a plan view of a flexible puncture proof material in accordance with the present invention.

FIG. 14b is a elevation sectional view along line 14b—14b of FIG. 14a in accordance with the present invention.

FIG. 15 is an elevation sectional view of a flexible puncture proof material in accordance with the present invention.

FIG. 16 is a perspective view of a portion of the flexible puncture proof material of FIG. 15 in accordance with the present invention.

FIG. 17 is a perspective view of a portion of flexible puncture proof material in accordance with the present invention.

FIG. 22 is an array of plates for a flexible puncture proof material in accordance with the present invention.

FIG. 23 is an elevation sectional view along lines 23—23 of FIG. 22 in accordance with the present invention.

FIG. 24 is an elevation sectional view along lines 24—24 of FIG. 22 showing the fabrication of one layer of plates in accordance with the present invention.

FIG. 47 is a flow diagram of an alternate method for vertically coupling capture elements according to the present invention.

DESCRIPTION OF THE INVENTION

Illustrative embodiments and exemplary applications will now be described with reference to the accompanying drawings to disclose the advantageous design and teachings of the present invention.

Figure 1:
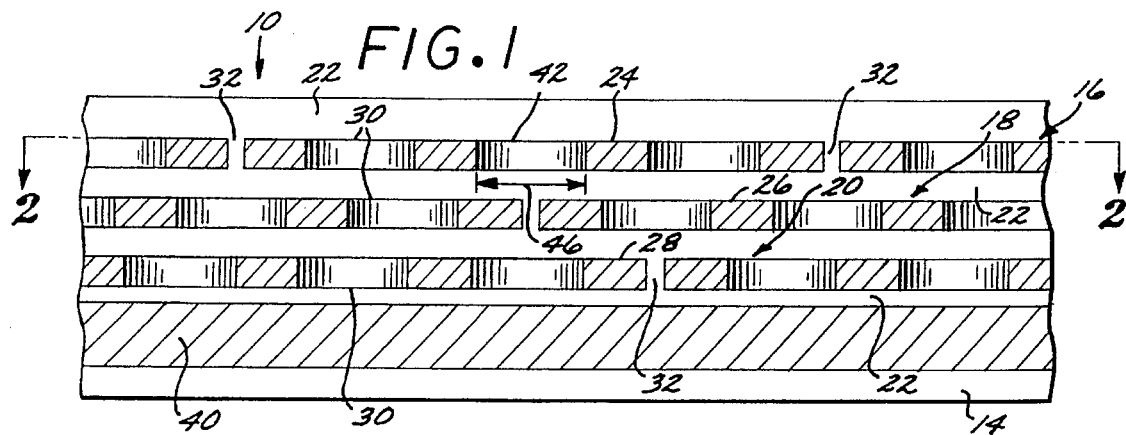
FIG. 1 is an elevation sectional view of a flexible puncture proof material in accordance with the present invention.

FIG. 1 is an elevation sectional view of a flexible puncture proof material 10 in accordance with the present invention. The flexible puncture proof material 10 has an flexible medium 22, which surrounds and attaches to capture devices, such as capture devices 24 and 26 within the flexible medium 22. The capture devices are attached in layers to the flexible medium and the number of layers depends on the type of material used for the capture devices. The flexible medium 22, which can be a silicone elastomer, binds the capture devices in the layers together and holds them in place. The flexible medium 22 provides a barrier against the transmission of water and infection through the material.

A base layer 40 can be provided, which can be fabricated of a woven material such as a steel mesh or a Kevlar weave. Alternately, base layer 40 can be made of fabric. The purpose of the base layer 40 is to provide a spacer if capture of a sharp instrument occurs in the deepest layer of the capture devices. For example, if only three layers of capture devices are used, and capture occurs in the third layer of capture devices, then the base layer 40 would prevent a point that slightly protrudes from a capture device from penetrating the entire puncture proof material. The base layer 40 also provides greater durability to the puncture proof material. The base layer 40 is purposely porous to allow the flexible medium 22 to permeate the base layer 40. The flexible medium extends to an elastomeric layer 14 on one side of the base layer 40.

As discussed the flexible medium can be made of silicone elastomer. The strength and durometer, or flexibility, of silicone elastomer can easily be adjusted to obtain a flexible medium which is strong enough to bind the flexible puncture proof material 10 together, but also flexible enough to allow the flexible material to be used for sensitive applications, such as surgeon gloves. Also gloves made of this material could easily be sterilized, because silicone elastomer can be sterilized.

The flexible puncture proof material 10, as illustrated in FIG. 1, provides first capture layer 16, second capture layer 18, and third capture layer 20. Each capture layer is comprised of a plurality of discs or plates, which have apertures. Each aperture in each plate or disc is large enough to accept and capture the pointed end of the sharp element and small enough to prevent the sharp element from passing through the aperture.

Figure 2:
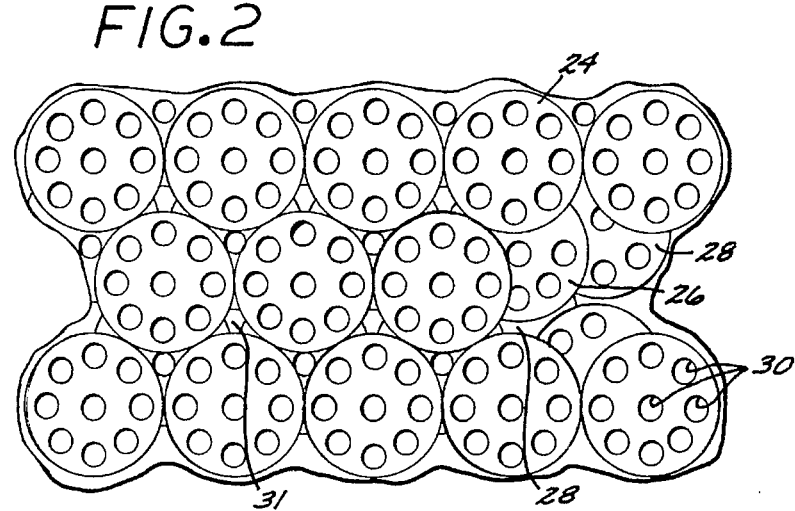
FIG. 2 is a fragmentary plan view partially cut away along line 2—2 of FIG. 1 showing discs with a plurality of apertures in accordance with the present invention.

As shown in FIG. 1, disc 24 is in first capture layer 16, disc 26 is in second capture layer 18, and disc 28 is in third capture layer 20. Within each disc, apertures 30 are provided. FIG. 2 is a fragmentary plan view partially cut away along line 2—2 of FIG. 1 and shows how the disc layers overlay each other.

The layers are arranged relative to one another so that, although there are spaces 31 between discs in each layer, there is no vertical path of spaces through the layers. For example, FIG. 2 shows the triangular spaces between the round discs on first capture layer 16, which are effectively closed or overlapped by discs on second capture layer 18. Any remaining void in the first two capture layers are overlapped by discs on third capture layer 20.

The plates or discs of FIGS. 1 and 2 can be fabricated from stainless steel or some other hard material. The purpose of the apertures 30 in the discs is to capture the point of a sharp instrument, such as a hypodermic needle or a scalpel.

Figure 3:
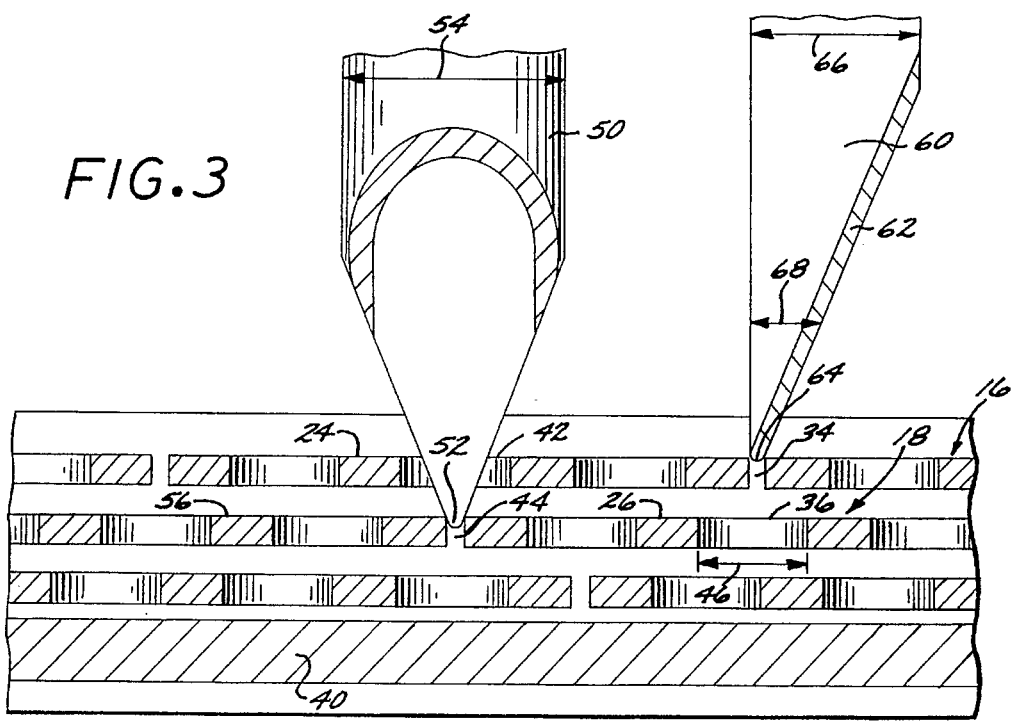
FIG. 3 is an elevation sectional view of the flexible material of FIG. 1 showing puncture prevention in accordance with the present invention.

FIG. 3 is an elevation sectional view of the flexible material of FIG. 1 showing needle 50 attempting to puncture through the flexible material 10. As shown, the needle point 52 has been captured by aperture 42 on disc 24 in first capture layer 16. The diameter 46, as shown in FIG. 1, of aperture 42 is large enough to capture the needle point 52, but small enough so that the body of needle 50 cannot pass through flexible material 10. The needle diameter 54 is larger than aperture 42. As shown in FIG. 3 the needle point 52 is about to pierce through space 44 between disc 56 and disc 26 on second capture layer however, the needle 50 has already been captured by aperture 42 so will be stopped from puncturing through the material.

FIG. 3 also shows scalpel 60, which has scalpel edge 62 and scalpel point 64, attempting to puncture through the flexible material 10 at space 34 in first capture layer 16. The scalpel will pass through space 34 but will then be captured by aperture 36 on disc 26 on the overlapping second capture layer 18. The diameter 46 of aperture 36 is small enough to capture the point of the scalpel, but small enough to not allow the scalpel to pass through flexible material 10. The diameter 46 of aperture 36 is about the width of scalpel blade dimension 68, but much smaller than the scalpel body width 66.

FIG. 3 illustrates one purpose of base layer 40. If the sharp instrument is captured by a disc in the third capture layer 20, then some additional vertical space is desirable so that the point of the sharp instrument will not pierce the elastomeric layer 14. This vertical space is provided by the base layer 40.

FIG. 4 is a perspective view of a glove composed of a flexible puncture proof material in accordance with the present invention. The flexible puncture proof material 10 can be used for the entire glove including the fingers and can be extended to provide protection for the forearms, as well.

The use of flexible material 10 for a surgical glove requires that the flexible material provide protection against cuts and punctures, while at the same time providing flexibility so the ability of a surgeon to freely manipulate his fingers, and to utilize his sense of touch is not significantly reduced.

Flexibility of the material is determined by a critical interrelationship between the capture devices, whether discs or plates, and the flexible medium. There are five parameters that determine the flexibility: 1) maximum length, width, or diameter of the plate or disc; 2) thickness of the plate or disc; 3) The number of layers of capture devices; 4) the durometer of the flexible medium; and 5) the geometry of the capture device.

In general the larger the diameter or thickness of the capture device the less flexibility of the material. A hard material, such as stainless steel, can be made relatively thin compared to a softer material, such as Kevlar, which must be thicker to stop a sharp instrument from passing through.

Increasing the number of layers decreases the flexibility of the material. In general to cover all voids and to account for stretching of the flexible material, at least three to five layers of capture device are recommended.

The durometer of the flexible medium is a measure of the flexibility of the silicone elastomer itself. The durometer of the silicone elastomer can be varied by adjusting the mix of materials that compose the silicone elastomer.

The geometry of the capture device can be varied and as will be described the capture device can be in the form of a disc, a plate, a polygon, a cartwheel, or in the shape of shingles. The capture device may have apertures, as shown in FIG. 2, or may not have apertures, as is described below.

When a sharp instrument encounters a plate or disc, such as disc 24 of FIG. 3, the point of the sharp instrument may immediately encounter an aperture in the capture device or may encounter a flat area on the surface of the disc. If the latter occurs, then the point will slide along the disc until it encounters an aperture. It is desirable to minimize the sliding, and one approach is to select a disc or plate geometry with a minimum flat area and a maximal aperture area.

For a surgical glove, the discs of FIG. 2 would have a diameter of about 40 mils and be about 5 mils thick. Each aperture in the disc would be about 15 mils in diameter, which would capture needles and scalpel blades. The number of apertures would vary from four to as many as sixteen.

For the discs of FIG. 2 and the following configurations, the dimensions of the discs and apertures are given for geometries that are appropriate for surgical gloves. There are other applications of the present invention for which other dimensions would be more appropriate. For example to prevent a knife puncture the dimensions would all be larger.

FIG. 5a is a plan view of a cartwheel disc 80 with apertures 82 forming a cartwheel with spokes 84 and edge 86 for use in a flexible puncture proof material in accordance with the present invention. In this configuration the flat area of the disc is minimized and the aperture area is maximized, which decreases the distance that the sharp instrument will slide on a flat area before being captured by one of the apertures. The diameter of cartwheel disc 80 is about 50 to 60 mils and the disc thickness is about 5 to 10 mils. Diameter 90 of a circle inside of an apertures 82 is about 15 mils. The aperture dimensions are as follows: dimension 92 is about 24 mils, dimension 94 is about 17 mils, dimension 96 is about 20 mils, and dimension 98 is about 28 mils. The flat surface dimension 99 is about 1 to 3 mils wide. FIG. 5b is an elevation section along line 5b—5b of FIG. 5a and illustrates the bevels 88 on spokes 84 and on edge 86.

Another configuration that can be used for the discs is shown in FIG. 6, which is a plan view of an array of hexagonal discs 102 with apertures 104 for use in a flexible puncture proof material in accordance with the present invention. An important feature of this configuration is that each side of each hexagonal disc is directly adjacent to another side of a hexagonal disc. Thus, in this configuration there are no inherent spaces between the discs hexagonal 102, in contrast with the spaces 31 between the circular discs shown in FIG. 2. However, even with this configuration it is necessary to use multiple layers of the hexagonal disc to ensure that a sharp instrument that pierces through a seam 103 between disc edges will be captured by an underlying layer of hexagonal discs 102.

Figure 7:
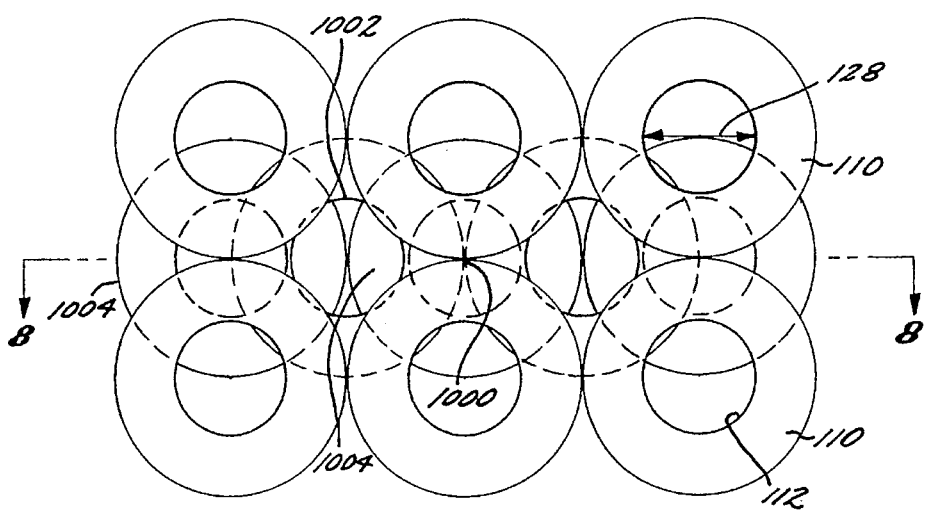
FIG. 7 is a plan view of an array of discs with one aperture for use in a flexible puncture proof material in accordance with the present invention.
Figure 8:
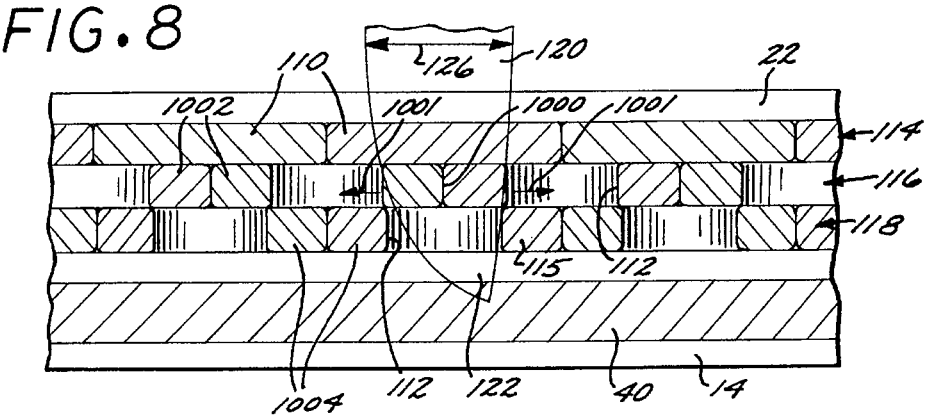
FIG. 8 is a elevation sectional view along line 8—8 of FIG. 7 of an array of discs with one aperture in accordance with the present invention.

FIGS. 7 and 8 show another configuration of discs 110, 1002, and 1004 each with only one aperture 112 embedded in a flexible puncture proof material in accordance with the present invention. For stopping punctures by needles and scalpels, aperture diameter 128 is about 10 mils and the overall diameter of disc is about 30 to 40 mils. FIG. 8 is a elevation sectional view along line 8—8 of FIG. 7 showing the layers of discs including first disc layer 114, second disc layer 116, and third disc layer 118. The array of discs is arranged so that spaces between the discs on one layer are overlapped by the next layer of discs to ensure capture of a sharp instrument. FIG. 8 shows pointed instrument 120 with sharp end 122 captured by disc 115 on third disc layer 118. The aperture diameter 128 is less than the sharp instrument width 126, so that pointed instrument 120 is prevented from piercing through the array of discs. As in FIG. 1, the discs are held in place by a flexible medium 22. In FIG. 8 it can be seen that there is a gap 1000 not entirely covered by the first and second disc layers 114 and 116, which include discs 110 and 1002, respectively. The third disc layer is arranged relative to the first and second disc layers so that, if the sharp element pierces the first and second disc layers, then the sharp instrument is captured by discs on the third disc layer 118, as shown by the capturing of the sharp instrument by disc 115 on the third disc layer. The third disc layer is essential because if the sharp instrument encounters the flexible puncture proof material at gap 1000, then the sharp instrument passes between discs 110 on disc layer 1 and discs 1002 on disc layer 2, which are spread apart by the sharp instrument, as indicated by the arrows 1001, because of the flexibility of the flexible medium. However, the third disc layer will capture the sharp instrument, thereby stopping the sharp instrument from piercing the flexible puncture proof material.

Figure 9A:
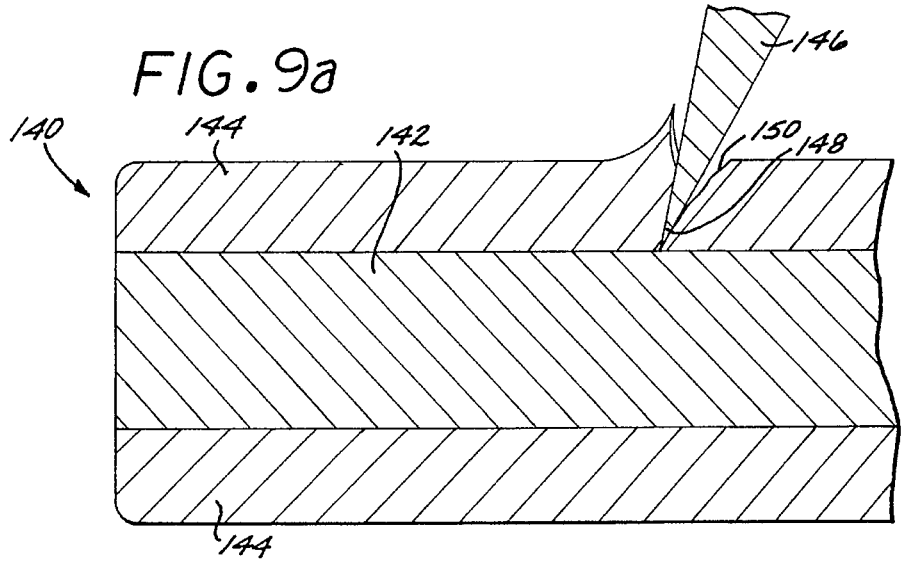
FIG. 9a is an elevation sectional view of a disc with a soft layer and a hard core for use in a flexible puncture proof material in accordance with the present invention.

Another configuration for capturing the pointed end of a sharp instrument is shown in FIG. 9a, which is an elevation sectional view of a disc 140 with a hard core 142 and a soft layer 144 for use in a flexible puncture proof material in accordance with the present invention. This configuration captures a sharp instrument 146 by allowing the sharp end 148 to penetrate the soft layer 144 as shown at penetration 150. The sharp instrument 146 is then stopped by hard core 142, which is made of material at least as hard as the sharp instrument. The sharp instrument 146 is captured by the soft layer 144 which is deformed by the penetration, as shown at penetration 150. A flexible puncture proof material using an array of discs 140 can be made by substituting these for the discs on capture layers 16, 18, and 20 for the flexible material shown in FIG. 1.

FIG. 9b is an elevation sectional view of another configuration of a disc for use in a flexible puncture proof material in accordance with the present invention. In FIG. 9b disc 130 has indentations 132. A flexible puncture proof material using an array of discs 130 can be made by substituting these for the discs on capture layers 16, 18, and 20 for the flexible material shown in FIG. 1. As shown in FIG. 9b, a sharp instrument 146 is captured by an indentation, such as indentation 134, which stops the sharp instrument.

FIG. 10 is elevation sectional view of an alternate flexible puncture proof material in accordance with the present invention. In this configuration, an array of shingles is provided and is surrounded by flexible medium 22, which binds the shingles together and provides a barrier against the transmission of water and infection. The shingles 160 are overlapped similar to shingles on a roof and each shingle has a width and length. The shingles overlap with each shingle overlapping the next shingle by about two thirds of the length of the shingle, as shown in FIG. 10 by overlap 162. FIG. 11 is a fragmentary plan view along line 11—11 of FIG. 10 showing that the first row of shingles 164 is offset from the second row of shingles 166 by about one half of the width of the shingles corresponding to dimension 196. Similarly, the third row of shingles 168 is offset from the second row of shingles 166 by about one half of the width of the shingles corresponding to dimension 196. The arrangement of shingles is such that any space 172 between shingles 160 in a row of shingles is overlapped by a shingle underneath.

FIG. 12a is a plan view of a single shingle of FIG. 11 and FIG. 12b is a elevation sectional view along line 12b—12b of FIG. 12a. In this configuration there are no apertures in the shingle and the shingle can be made of a relatively soft but strong material, such as Kevlar or an aluminum alloy. To facilitate capture the shingles have a concave surface, as shown in FIG. 12b. The shingles would be relative thick to resist puncture. Another approach is to fabricate the shingles in the same manner as shown in FIG. 9a with a hard core 142 and a soft layer 144.

FIG. 13a is a configuration showing an alternate fragmentary plan view along line 11—11 of FIG. 10. In FIG. 13a the shingles 180 have apertures 182. FIG. 13b is a plan view of a single shingle of FIG. 13a. The size of a shingle is about 40 to 50 mils square with diameter 183 within apertures 182 being about 15 mils. As shown in FIG. 13a, the first row of shingles 164 is offset from the second row of shingles 166 by about one half of the width of the shingles corresponding to dimension 196 and the third row of shingles 168 is offset from the second row of shingles 166 by about one half of the width of the shingles corresponding to dimension 196. The arrangement of shingles is such that any space 172 between shingles 180 in a row of shingles is overlapped by a shingle underneath.

FIG. 13c is a elevation sectional view along line 13c—13c of FIG. 13b showing relatively straight edges on the sides of shingle 180 and apertures 182. FIG. 13d is an alternate elevation sectional view along line 13c—13c of FIG. 13b showing angled edges on the sides of shingle 180 and apertures 182. The angled edges can be formed by etching both sides of the disc. The angled edges have the advantage of having less flat area surrounding the apertures. This reduces the amount a sharp instrument may have to slide on a flat surface before being captured inside an aperture.

FIG. 14a shows a plan view of another shingle configuration for a flexible puncture proof material in accordance with the present invention. In FIG. 14a shingles 180 with apertures 182 are arranged in rows, such as shingle rows 200, 201, and 202. Within a row each shingle is overlapped by about one fourth of the length of the shingle by another shingle, as represented by overlay 203, as shown in FIG. 14b. Each row of shingles is offset from another row by about one fourth of the length of a shingle, as represented by dimension 199 and overlaps another row of shingles by about one fourth of the width of a shingle, as represented by dimension 197. This is an arrangement of shingles that provides efficient area coverage. The shingles 180 are held in place by a flexible medium 22, which also provides a barrier to the transmission of fluids through the flexible puncture proof material.

FIG. 15 is elevation sectional view of an alternate flexible puncture proof material in accordance with the present invention. In this configuration, the flat shingles of FIGS. 10 through 14 are replaced by interlocking Spanish S shaped tiles 210, which have a S shaped cross section. Each tile interlocks with another tile as shown at interlocked tiles 212. The tiles are laid in overlapped layers, such as shown for first layer 214 and second layer 216. FIG. 16 is a perspective view of a portion of the flexible puncture proof material of FIG. 15 and shows that the first layer 214 and second layer 216 are offset along their width by offset 218. The S shaped tiles 210 are attached to a flexible medium 22 to bind the tiles together and to prevent the transmission of fluids through the flexible puncture proof material.

FIG. 17 is a perspective view of a portion of another alternate flexible puncture proof material with in accordance with the present invention. In this configuration, the flat shingles of FIGS. 10 through 14 are replaced by interlocking hemicylinder tiles 220, which have a semicircular cross section. Each tile interlocks with another tile as shown at interlocked tiles 222. The tiles are laid in offset overlapped layers, such as shown for first layer 224 and second layer 226. The hemicylinder tiles 220 are attached to a flexible medium 22 to bind the tile together and to prevent the transmission of fluids through the flexible puncture proof material.

Figure 18:
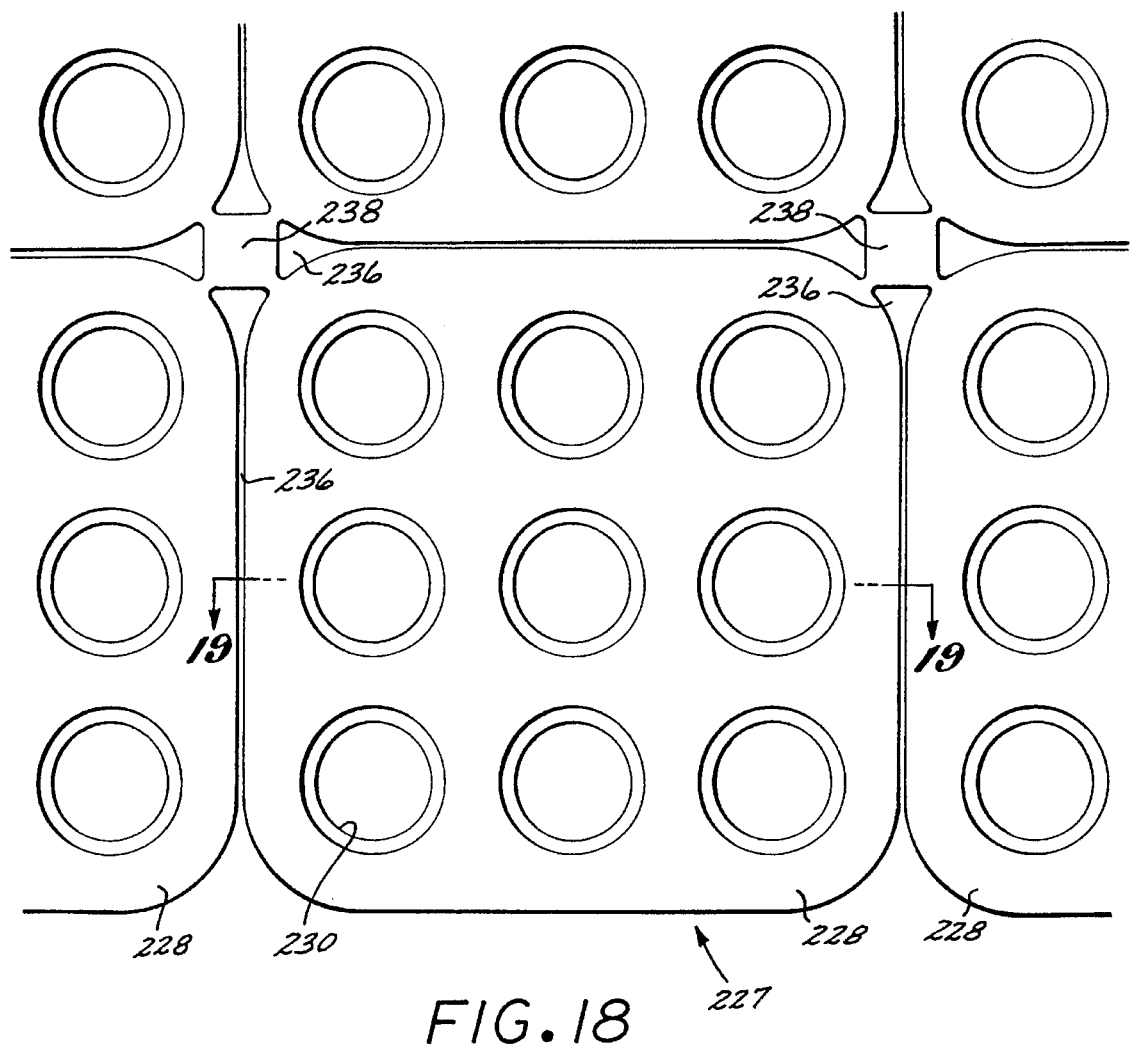
FIG. 18 is a plan view of a portion of flexible puncture proof material in accordance with the present invention.
Figure 19:
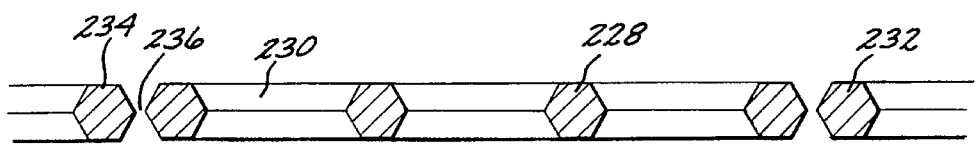
FIG. 19 is an elevation sectional view along line 19—19 of FIG. 18 in accordance with the present invention.

FIG. 18 is a plan view of a portion of flexible puncture proof material in accordance with the present invention that consists of plate array 227. Each plate 228 has apertures 230. The plate array 227 is formed by using photochemicals to control etching of a sheet of metal to form apertures 230 and spaces 236 between plates 228. The etching leaves tangs 238 between the corners of the plates 228. The tangs 238 hold the plate array 227 together. FIG. 19 is a elevation sectional view along line 19—19 of FIG. 18 that illustrates apertures 230 and spaces 236.

Figure 20:
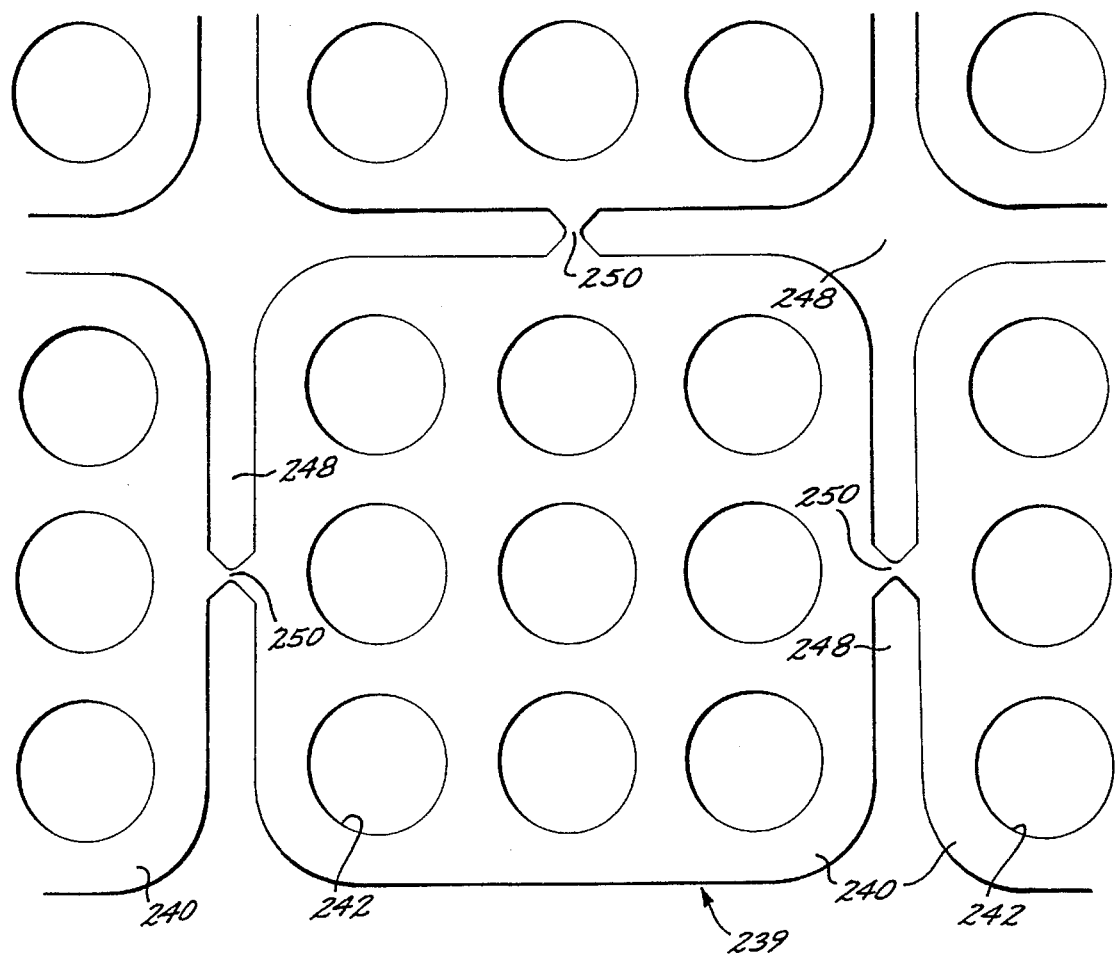
FIG. 20 is a plan view of a portion of flexible puncture proof material in accordance with the present invention.

FIG. 20 is a plan view of a portion of an alternate flexible puncture proof material in accordance with the present invention that consists of plate array 239, which is similar to plate array 227. Each plate 240 has at least one aperture 242. The plate array 239 is formed by etching a sheet of metal to form apertures 242 and spaces 248 between plates 240. The etching leaves tangs 250 between the plate edges. As in the plate array of FIG. 18, the tangs hold the plate array 239 together. FIG. 18 and 20 present two configurations that leave tangs between plates, but clearly many other configurations are possible within the scope of the present invention.

Figure 21:
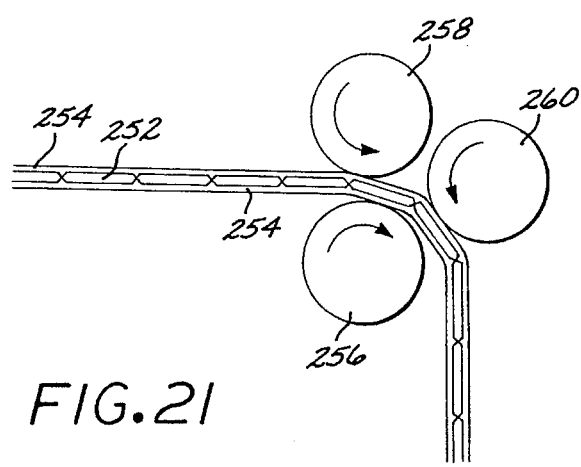
FIG. 21 is a illustration of a method for breaking tangs between plates in the plate arrays of FIGS. 18 and 20 in accordance with the present invention.

To form a flexible puncture proof material, three or more sheets are positioned relative to one another so that there are no spaces through the multiple sheets. Then the sheets are permeated with a flexible material such as silicone elastomer, which bonds the sheets together into one assembly. Then, the plates in the plate array sheets can be separated and the tangs broken by passing the assembled sheets through rollers that flex the material to break the tangs. In FIG. 21 a plate array 252, such as that shown in FIGS. 18 and 20, coated in flexible layer 254 is passed through rollers 256, 258, and 260. This is done first in one dimension and then in another dimension until each plate is separated from each other plate and the material is flexible. The flexible layer 254 holds the individual plates together. The resulting flexible material can be used to replace capture layers 16, 18, and 20 in FIG. 1 to form a flexible material that prevents punctures.

FIG. 22 is a plan view of a portion of flexible puncture proof material in accordance with the present invention that consists of an array of plates 270 separated by spaces 274. Each plate 270 has apertures 272. The array of plates is formed by starting with a sheet of metal. The sheet is then coated on the top and the bottom of the sheet with a photo-resist material. The thickness of the photo-resist material is about 1.5 mils thick. The pattern of a computer generated image of the array, as shown in FIG. 22, is projected through a lens to the surface of the side of the coated sheet of metal to be etched. This hardens the photo-resist in the pattern of the array of plates with their apertures. The unhardened part of the photo-resist is then removed with a solvent. Then a single sided etching of the exposed surfaces of the sheet is metal is performed.

After the etching of the exposed metal is performed the photo-resist 276 remains on top of the remaining portions of metal, as shown in FIG. 24. The individual plates are retained in an array by the photo-resist 278, which is not removed, on the bottom of the etched sheet of metal.

The array is then coated with silicone elastomer on the top surface. The silicone elastomer is forced into the apertures and around the edges. Once the silicone elastomer cures, the plates in the layer are held in place by the silicone elastomer. Then the photo-resist is dissolved away, leaving the sheets supported by the silicone elastomer.

As part of the photo etching process, index holes are put in precise positions for each of several layers to be used to form a flexible puncture proof material. For example, if three layers are used, then there are three offset positions for index holes corresponding to the three layers. In a final step, the index holes are used to stack multiple layers of plate arrays on a platform with indexing pins for the indexing holes for each layer. Silicone elastomer is poured onto each layer as it is placed on the platform. All the layers are then clamped together and cured.

The result is shown in FIG. 23, which shows an elevational section of a flexible puncture proof material with three layers of plates 270 with apertures 272 bound together by flexible material 280, which can be silicone elastomer. Each layer is offset so that there is no path through the flexible material for a sharp instrument. Any sharp instrument is captured by layer one, two or three. In FIG. 22 the plates are square and for that configuration FIG. 23 shows that the offsets between layers are the same in both horizontal and vertical dimensions. The second layer is offset relative to the first layer by a half a width and length of a plate. The third layer is offset relative to the second layer by a quarter a width and length of a plate.

Figure 25A:
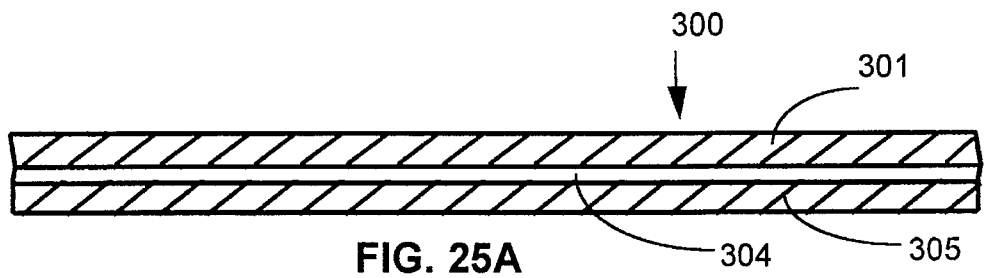
FIGS. 25A and 25B show metal sheets bonded together by a flexible medium to form a sandwich according to the present invention.
Figure 25B:
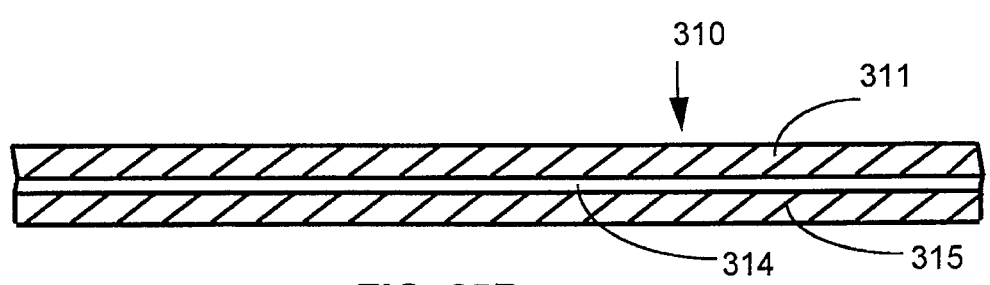
Figure 25C:
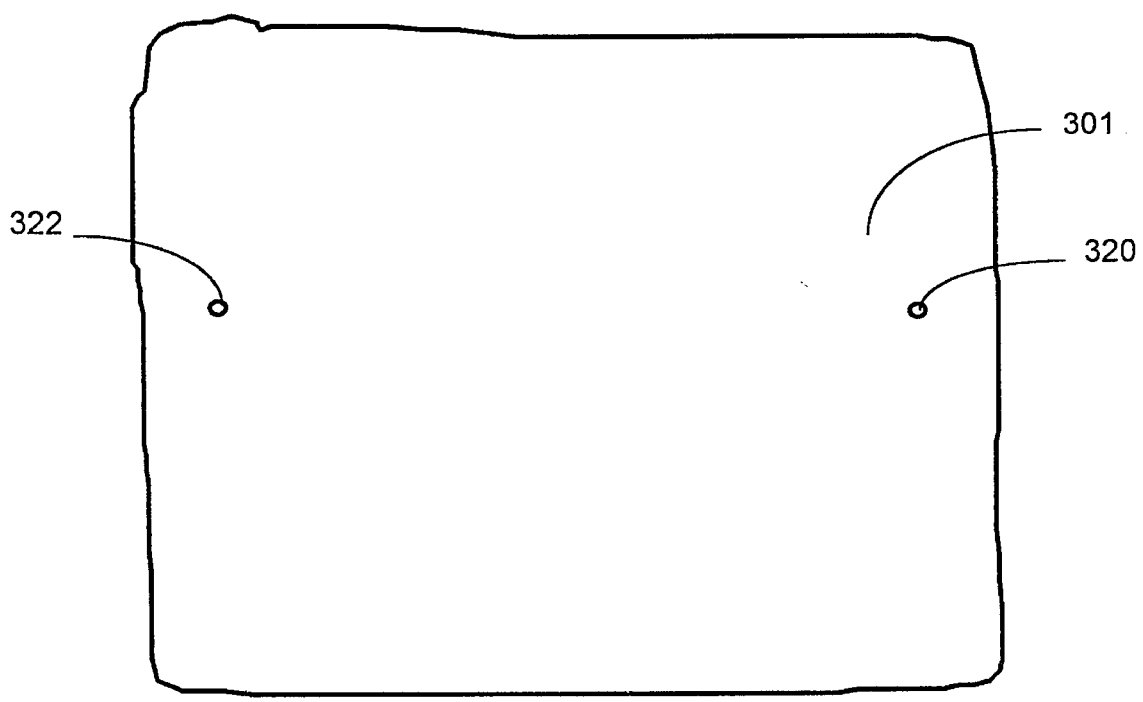
FIG. 25C shows a top view of the sandwich of FIG. 25A according to the present invention.

In another embodiment of the invention a metal sheet 301 is bonded with a flexible material 304 to another metal sheet 305, as shown in FIG. 25A. The bonded metal sheets form a first sandwich 300. Two other metal sheets 311 and 315 are also bonded together with a flexible bonding material 314 to form a second sandwich 310. At this step in the process the top of sandwich 300 appears as shown in FIG. 25C. The metal sheet does not have any apparent features except for alignment holes 320 and 322. For flexible puncture proof material for use in surgeon gloves and the like, the metal sheets are 3 mil stainless steel sheets. The flexible bonding material 304 and 314 can be silicone elastomer, acrylic adhesive, or can be a reinforced flexible bonding material such as nylon mesh embedded in silicone elastomer.

Figure 26A:
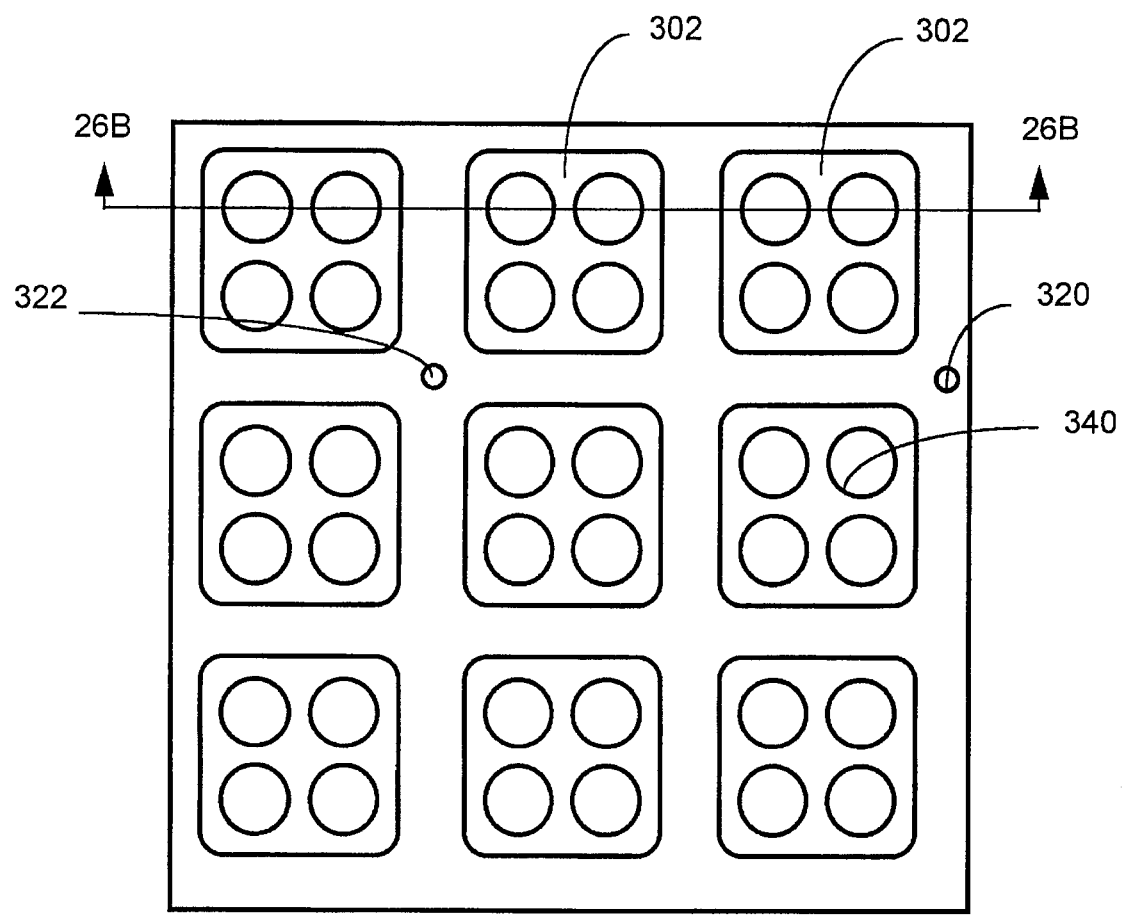
FIG. 26A is a diagram showing capture elements etched into a metal sheet of FIG. 25A according to the present invention.
Figure 26B:
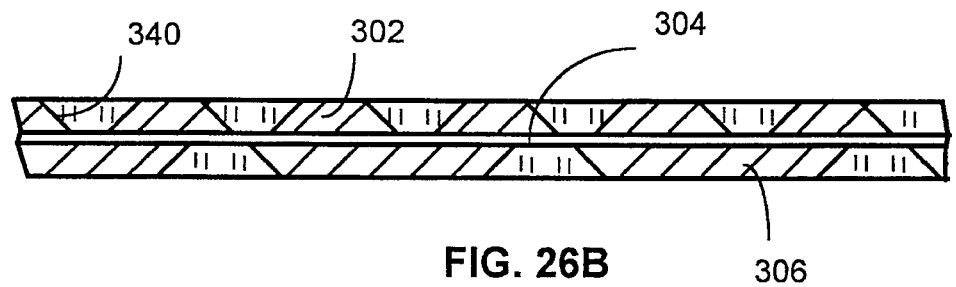
FIG. 26B is an elevation section of FIG. 26A according to the present invention.
Figure 27A:
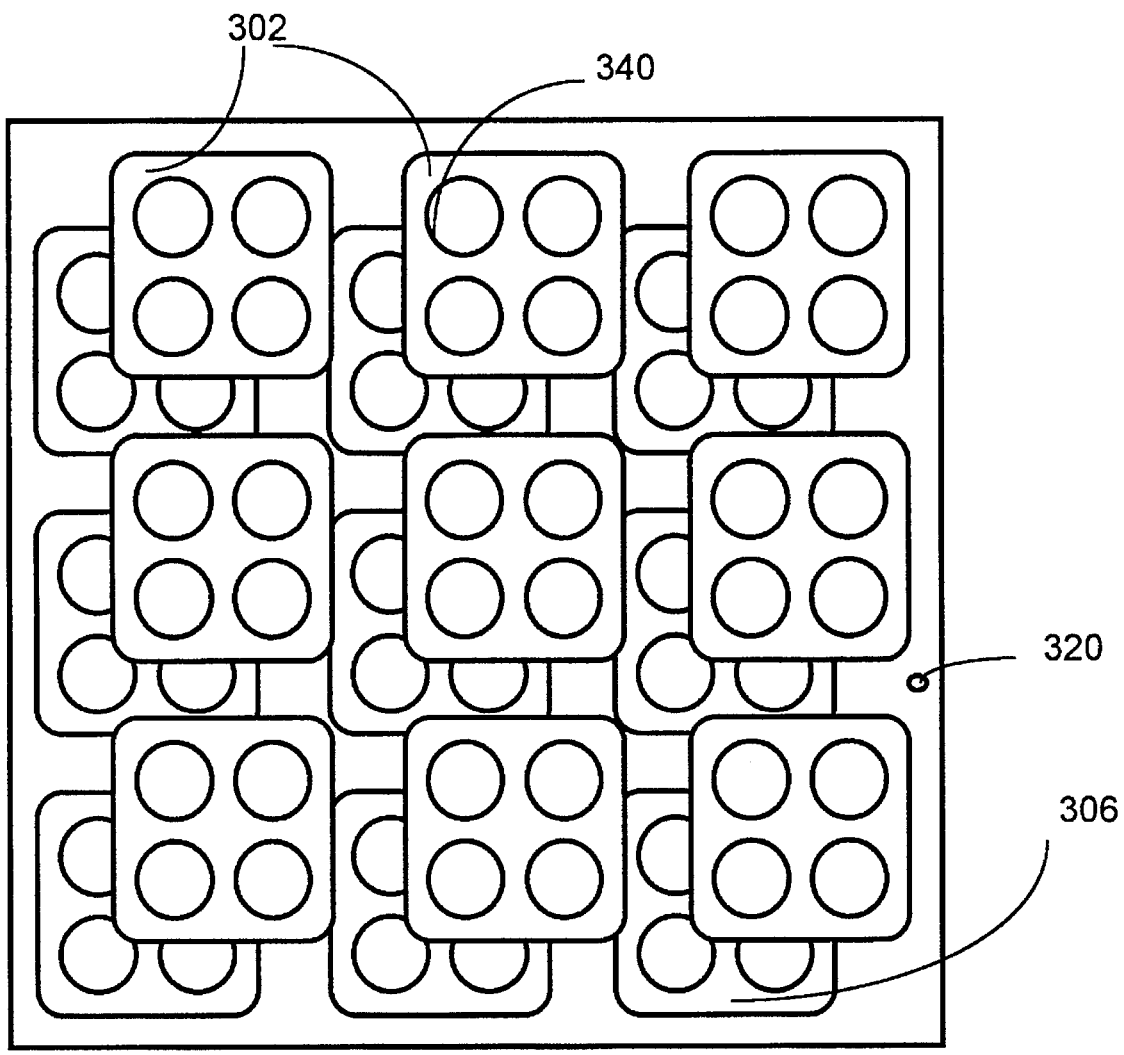
FIGS. 27A and 27B show alternate arrangements for etching capture elements having apertures on the top and bottom sheets of FIG. 26B according to the present invention.
Figure 27B:
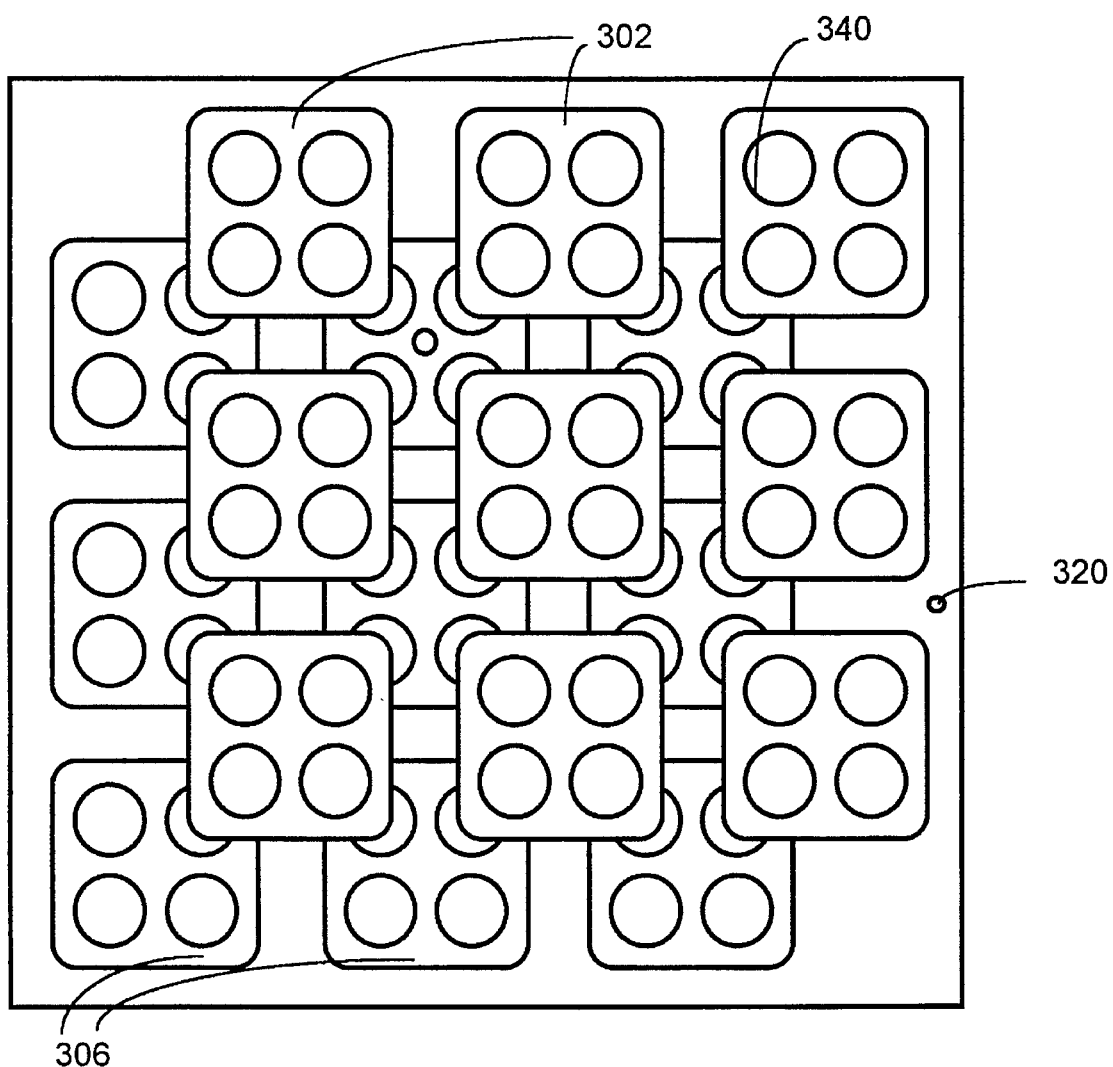

To fabricate the flexible puncture proof material the first side of the first sandwich is etched in a pattern as shown in FIG. 26A to form capture elements 302 each having apertures 340. The bottom layer of the first sandwich is also etched in a pattern that is offset from the top layer. FIG. 26B is an elevation view showing the top layer with capture elements 302 having apertures 340 and the bottom layer with capture elements 306 having apertures 340. The top and bottom layers can be etched simultaneously with a double sided etch. FIG. 27A is a diagram showing an overlay of the first and second layers of the first sandwich showing the second layer offset from the first layer. FIG. 27B is an alternate view of the first layer of the first sandwich overlaying the second layer of the first sandwich showing a different offset between the first layer and the second layer of the first sandwich. The layers are offset from one another so that the layers will cover all of the voids between capture elements. It can be seen that in FIG. 27A and 27B there are still voids between the capture elements of the first and second layer of the first sandwich. In order to cover all the voids a second sandwich is constructed as shown in FIG. 25B and etched in the same manner as the first sandwich. However, the capture elements in the second sandwich can be offset from the capture elements in the first sandwich so that when the first and second sandwich are aligned and overlaid, the capture elements cover all voids to form a flexible puncture proof material. In actuality what is required is to have offsetting alignment holes 320 for the first and second sandwiches so that when the two offsetting holes are aligned the two sandwiches have arrays of capture elements that are offset such that all voids in a vertical direction between the layers are covered by the capture elements of at least one of the layers.

Figure 28:
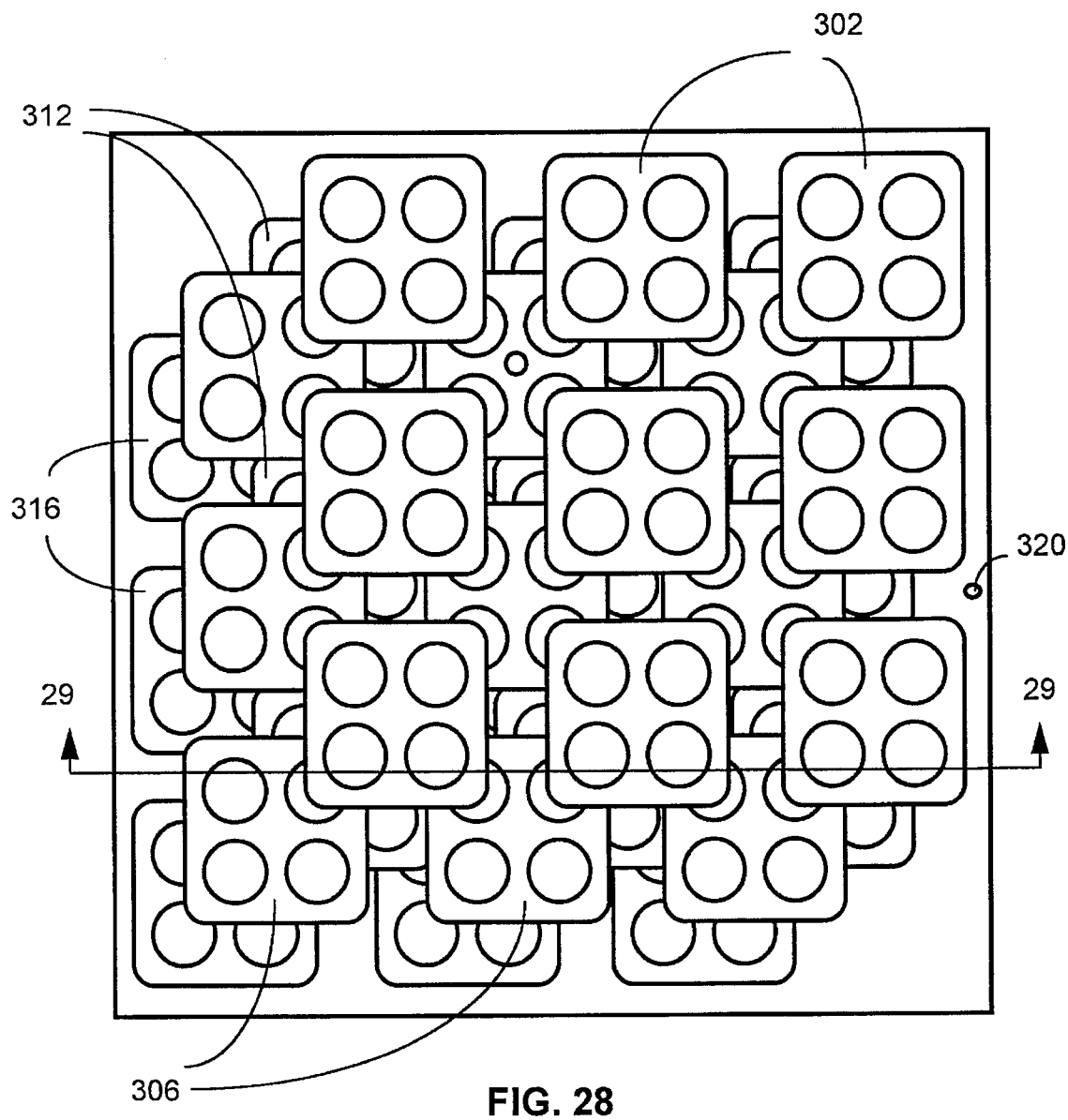
FIG. 28 is a diagram showing a superimposition of four layers of capture elements bonded together by a flexible medium according to the present invention.

FIG. 28 is a diagram of the two sandwiches overlaid on one another so that there are no voids in a vertical direction between the capture elements of the various layers. Each sandwich has two layers and FIG. 28 shows four layers of capture elements.

Figure 29:
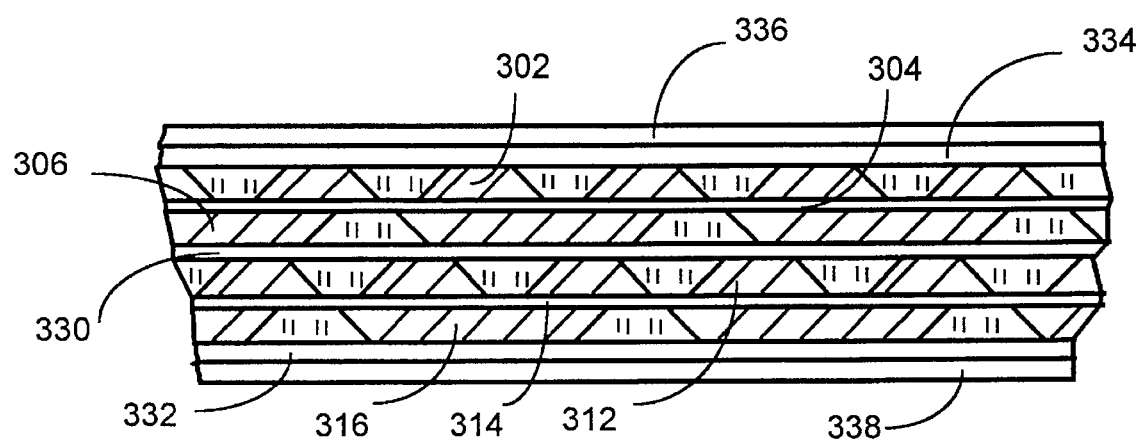
FIG. 29 is an elevation section of FIG. 28 according to the present invention.

When a sandwich such as the sandwich shown in FIG. 25A is etched to form the array of capture elements in each layer, the sandwich is held together by the flexible bonding material 304. Also, the capture elements of the second sandwich are bound together by flexible bonding material 314. To form the flexible puncture proof material shown in FIG. 28, the first sandwich is bound to the second sandwich with a flexible bonding material. FIG. 29 is a side elevation view of the first sandwich bound to the second sandwich with flexible bonding material 330. The flexible bonding material 330 can be silicone elastomer, acrylic adhesive, or a reinforced flexible bonding material such as nylon mesh embedded in silicone elastomer.

After the layers of new sandwiches are bound together, then no voids are left vertically between the capture elements. A sharp instrument attempting to puncture the flexible puncture proof material is captured by one of the apertures 340 in a capture element.

In order to add post etch reinforcement to the flexible puncture proof material, the surfaces of the bonded first sandwich and second sandwich can be reinforced with a nylon mesh bonded to the etched surfaces with silicone elastomer. Alternately the post etch reinforcement could consist of nylon film, cloth, or other flexible material glued to the etched surfaces. Another form of post etch reinforcement is to cover the surfaces with polyimid or other flexible material. This post etch reinforcement material is represented as elements 332 and elements 334 in FIG. 29. The post etch reinforcement, which can be added to each surface of each etched sandwich, makes the puncture proof material stronger but less flexible; however, post etch reinforcement such as elements 332 and 334 of FIG. 29 do help preserve the relationship of the capture elements in the array.

After the post etch reinforcement, a flexible medium can be added on one side of the puncture proof material as shown by element 336 to provide a barrier to water and infection. On the other side of the flexible puncture proof material a base layer 338 can be added to provide a spacer in case a sharp instrument is captured by apertures on the lowest layer of the flexible puncture proof material. The spacer is to prevent the point that protrudes from the aperture in a capture element in the lowest layer from puncturing the skin of a wearer of a glove for instance.

Figure 30A:
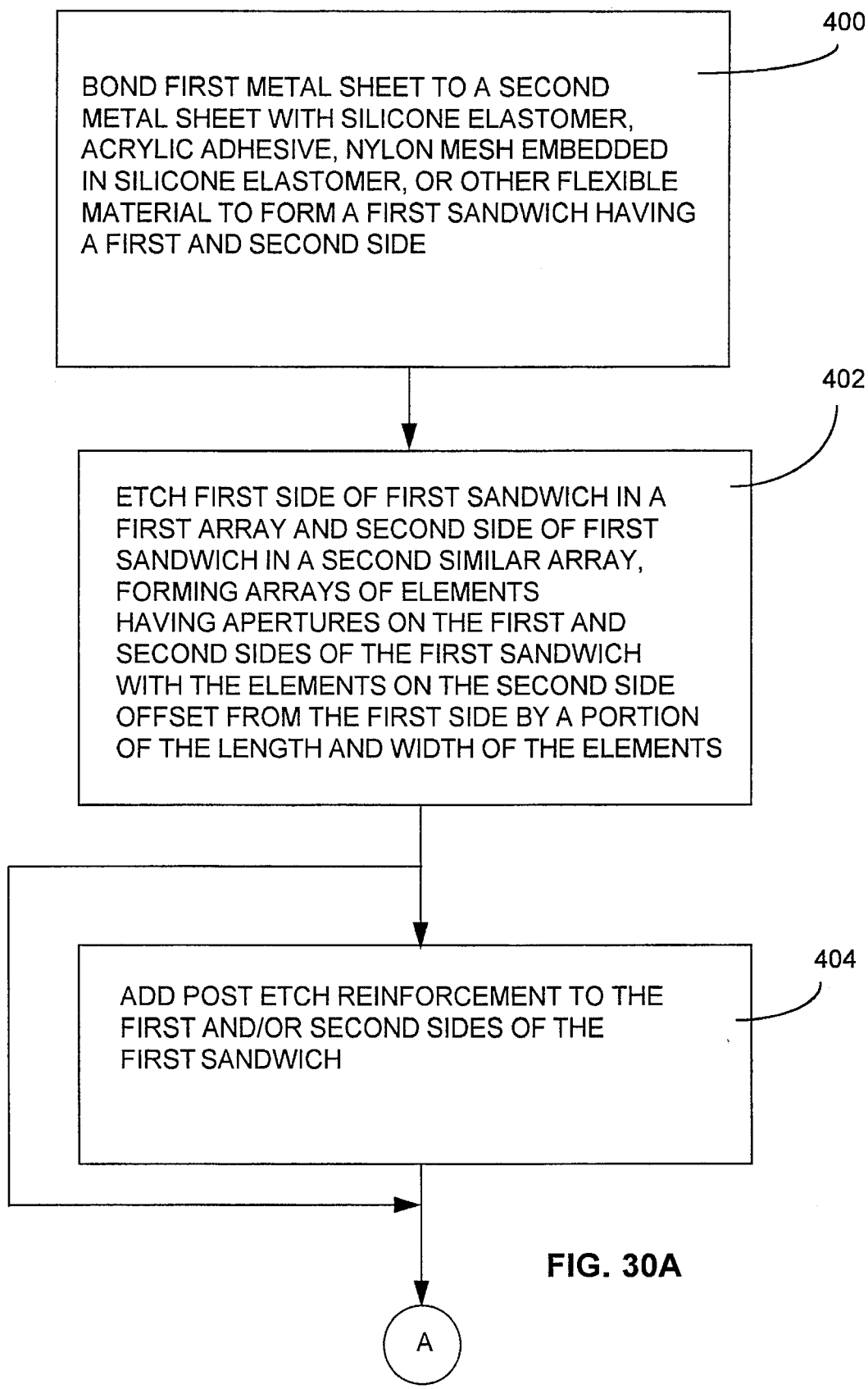
FIGS. 30A, 30B and 30C are flow diagrams of a method for forming a flexible puncture proof material according to the present invention.
Figure 30B:
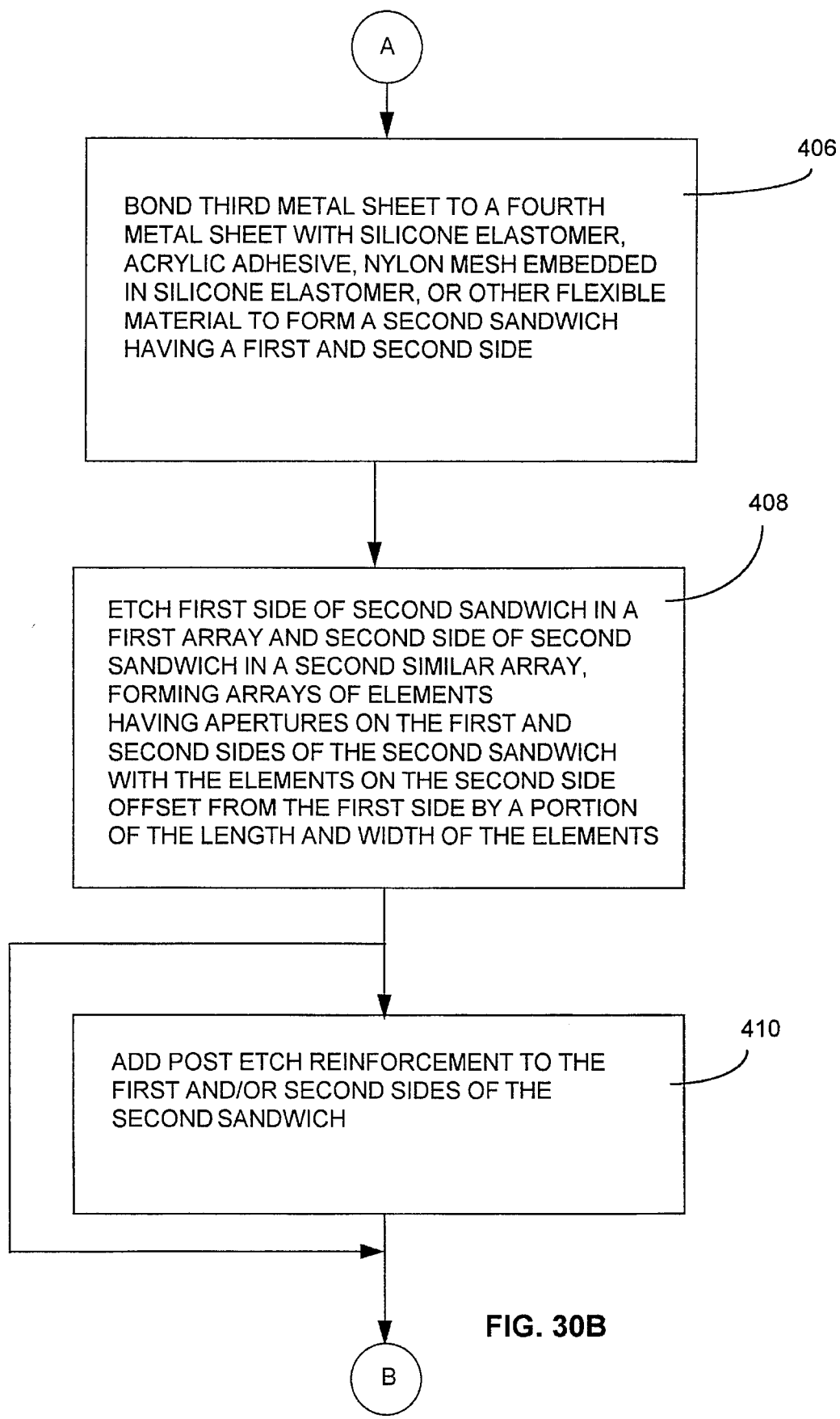
Figure 30C:
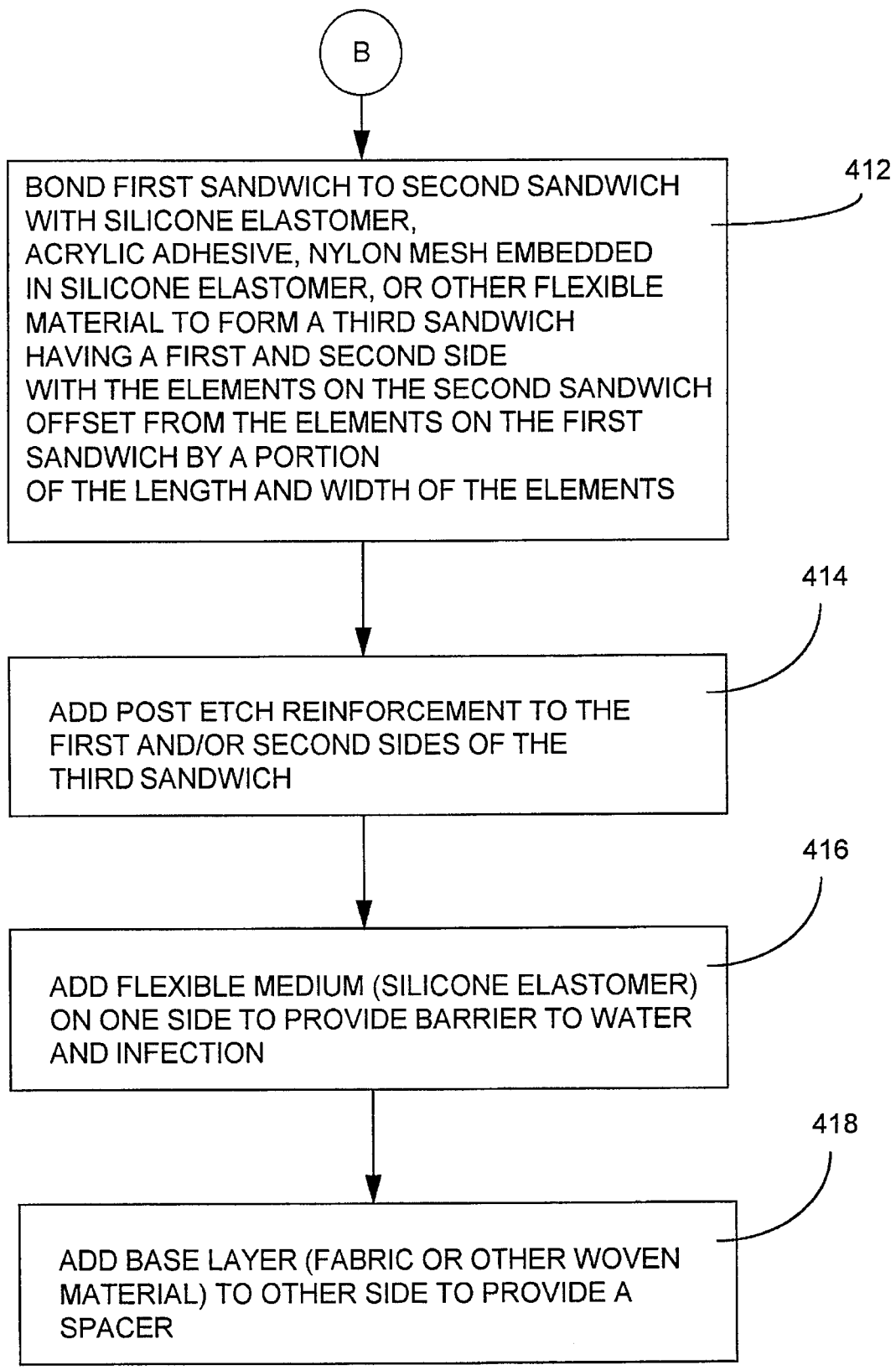

FIGS. 30A, 30B and 30C are flow diagrams of a method for fabricating the flexible puncture proof material shown in FIGS. 28 and 29. In step 400 a first metal sheet is bonded to a second metal sheet with silicone elastomer, acrylic adhesive, nylon mesh embedded in silicone elastomer or another flexible material to form a first sandwich having a first and second side. Then in step 402 the first side of the first sandwich is etched in a first array and the second side of the first sandwich in second similar array, forming arrays of capture elements having apertures on the first and second side of the first sandwich with the elements on the second side offset from the first side by a portion of the length and width of the capture elements. In step 404 a post etch reinforcement can be added to the first and/or second sides of the first sandwich; however, this step may be bypassed. In step 406 a third metal sheet is bonded to a fourth metal sheet with silicone elastomer, acrylic adhesive, nylon mesh embedded in silicone elastomer or another flexible material to form a second sandwich having a first and second side. Then in step 408 the first side of the second sandwich is etched in a first array and the second side of the second sandwich is etched in a second similar array forming arrays of capture elements having apertures. These capture elements are formed on the first and second side of the second sandwich with the elements on the second side offset from the first side by a portion of the length and width of the capture elements. Then in step 410 post etch reinforcement can be added to the first and/or second sides of the second sandwich.

In step 412 as shown in FIG. 30C, the first sandwich is bonded to the second sandwich with a flexible material which can be silicone, elastomer, acrylic adhesive or a nylon mesh embedded in silicone elastomer or another flexible material to form a third sandwich having a first and second side. The capture elements on the second sandwich are offset from the capture elements on the first sandwich by a portion of the length and width of the capture elements. The offset of each layer of capture elements ensures that there are no voids between capture elements in the vertical direction between layers. Then in step 414 a post etch reinforcement can be added to the first and/or second sides of the third sandwich. Then in step 416, a flexible medium such as silicone elastomer can be added to one side to provide a barrier to water and infection. Then in step 418 a base layer can be added to the other side to provide a spacer between a sharp instrument that is caught by an aperture of a capture element in the last layer of the flexible puncture proof material so that a wearer of the flexible puncture proof material is not scratched by a slightly protruding point. It should be understood that depending on the relative diameter of the aperture and the diameter of the point of a sharp instrument, the point may only protrude slightly, if at all. In that case a minimal spacer is sufficient.

Figure 31:
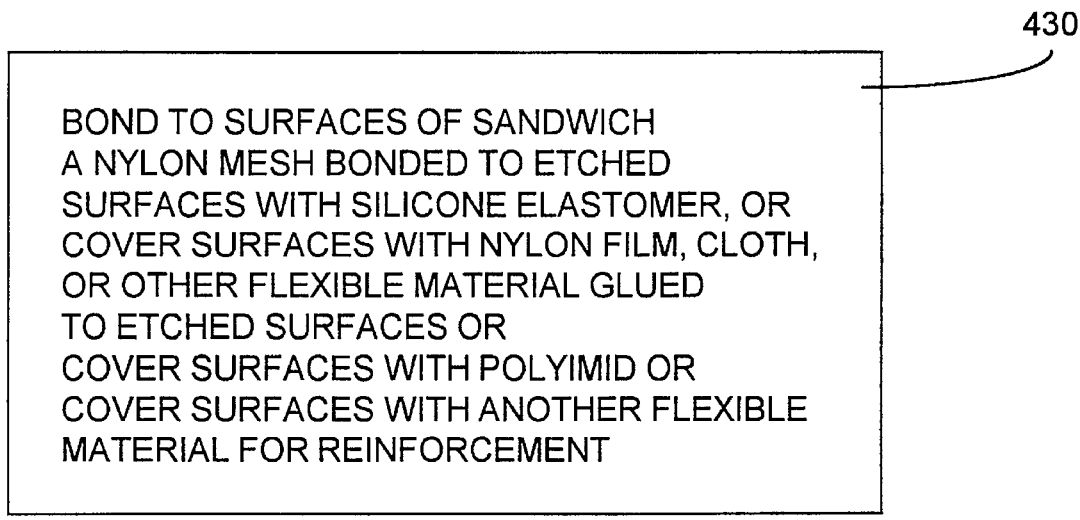
FIG. 31 is a flow diagram of a method for providing post etch reinforcement according to the present invention.

FIG. 31 is a flow diagram of a method for post etch reinforcement. In step 430 surfaces to be reinforced are covered with a nylon mesh which is bonded to the etched surfaces with silicone elastomer. Alternately the surfaces can be covered with nylon film, cloth, or other flexible material glued to the etched surfaces. In another embodiment the surfaces are covered with polyimid or another similar material for reinforcement.

Figure 32:
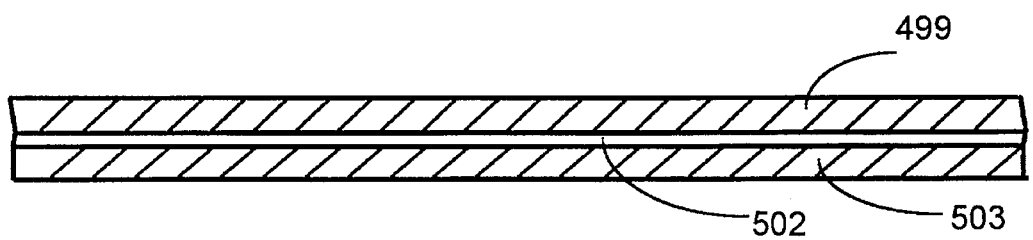
FIG. 32 is an elevation view showing two metal sheets bonded together according to the present invention.

In another embodiment a first sheet of metal 499 is permanently bonded to a second sheet of metal 503, as shown in FIG. 32. The permanent bond can be formed by a material such as epoxy.

The first sheet of metal 499 can be a sheet of 3 mil thick stainless steel. The second sheet of metal 503 can be a ½ to 1 mil sheet of stainless steel. After the sheets are bonded together with the epoxy material 502 to form a first sandwich, then the two sides of the sandwich are etched with differing patterns. The first side is etched with patterns that form an array of capture elements each having apertures. The second side of the first sandwich is etched to form bridges between the capture elements on the first side of the sandwich.

Figure 33:
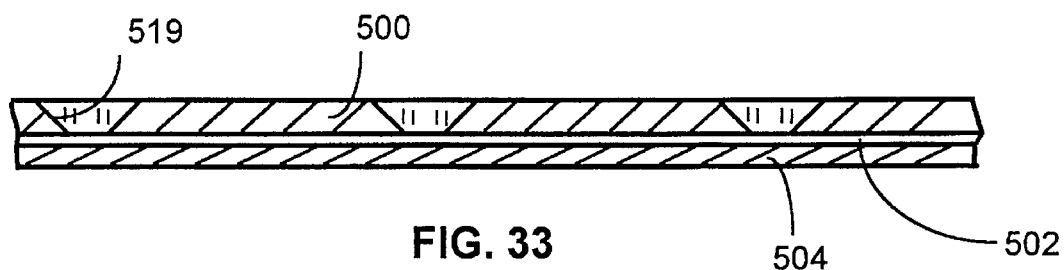
FIG. 33 is an elevation view showing the metal sheets of FIG. 32 after they have been etched according to the present invention.
Figure 34A:
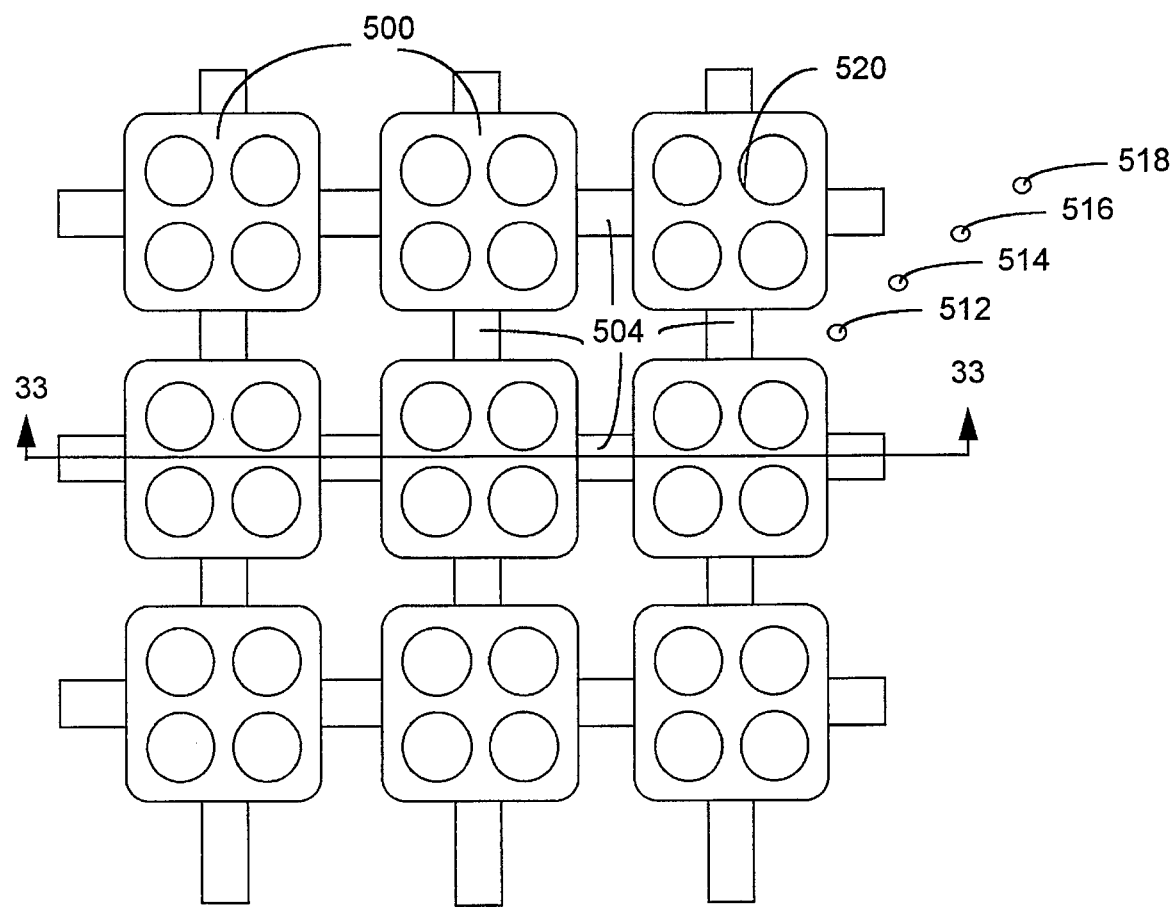
FIGS. 34A and 34B shows top and bottom views, respectively, of capture elements joined by bridges according to the present invention.

FIG. 33 is a section of FIG. 34A and shows capture elements 500 separated by spaces 519. Also shown in FIG. 33 is bridge 504. As shown in FIG. 34A after etching thin bridges 504 are formed between adjacent capture elements 500. Each of the capture elements have apertures 520. Also shown in FIG. 34A are a series of alignment holes 512, 514, 516 and 518. The alignment holes can be used to align four etched sandwiches in the form of FIG. 34A to form a larger sandwich which consists of multiple layers. Four layers can be used to ensure that no voids are left vertically between the layers; however, depending on the geometry of the capture elements, three layers may be sufficient to ensure that a sharp instrument attempting to penetrate the layers of the sandwich will be captured by an aperture on one of the capture elements 500 on one of the layers.

Figure 34B:
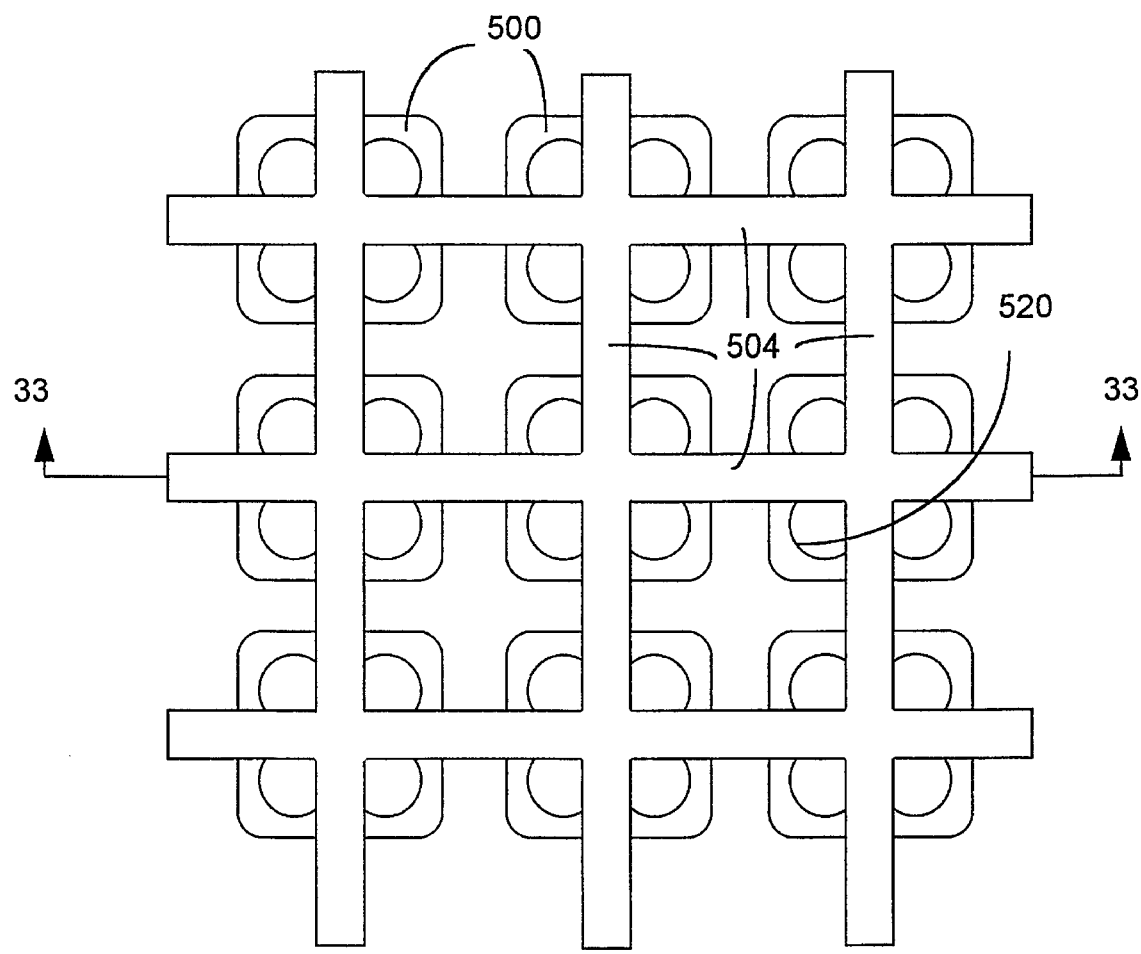

FIG. 34B is a bottom view of the etched sandwich shown in FIG. 34A which is a top view of the etched sandwich. As shown in FIG. 34B the bridges 504 form a lattice connecting the array of capture elements 500. Other arrangements of the bridges 504 are possible. The bridges can be in any pattern that connects a capture element to adjacent capture elements. The purpose of the bridges 504 is to maintain the capture elements 500 in a fixed relationship to each other. When multiple sandwiches each as shown in FIG. 34A have been constructed, then by using the alignment holes, multiple layers can be overlaid on one another and bonded to one another using a flexible material such as silicone elastomer or acrylic adhesive. FIG. 34F illustrates the relationship of two layers. As shown the two layers are aligned by aligning alignment hole 512 on one layer to alignment hole 514 on another layer. In this case each layer consists of capture elements linked together by bridges 504.

Figure 35A:
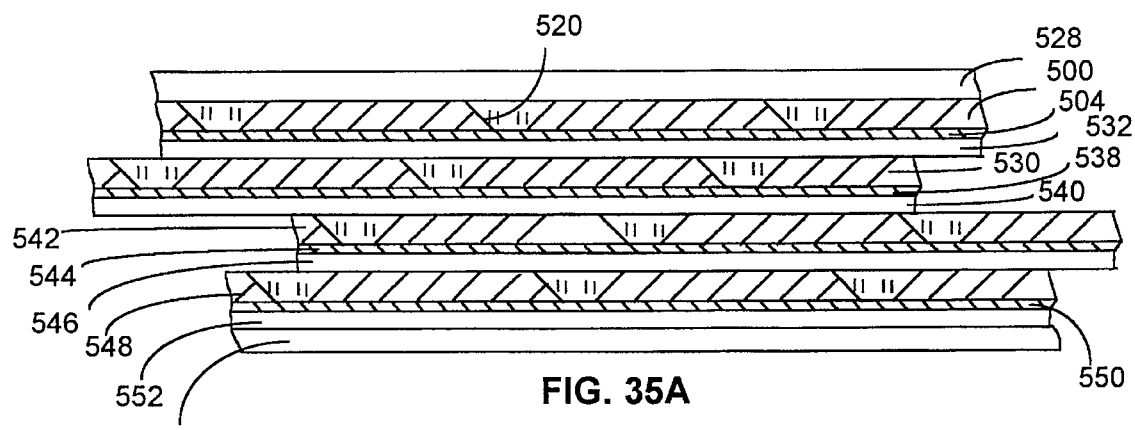
FIG. 35A is an elevation view showing multiple layers of the structure shown in FIGS. 34A and 34B bonded together by a flexible medium according to the present invention.

FIG. 35A shows four layers stacked on top of each other to ensure that no voids are present vertically between the layers so that a sharp instrument may not pass through the layers without being captured by an aperture in a capture element. Between each of the layers in FIG. 35A is a flexible bonding material such as silicone elastomer or acrylic adhesive. The flexible bonding material in FIG. 35A is represented by elements 532, 540 and 546. The capture elements are elements 500, 530, 542 and 548. The bridges between the capture elements are formed by elements 504, 538, 544 and 550. Layers 528 and 554 can be silicone elastomer to provide a barrier against water or infection and the layer 552 can be used to provide a spacer for the lowest layer of the flexible puncture proof material.

Figure 34C:
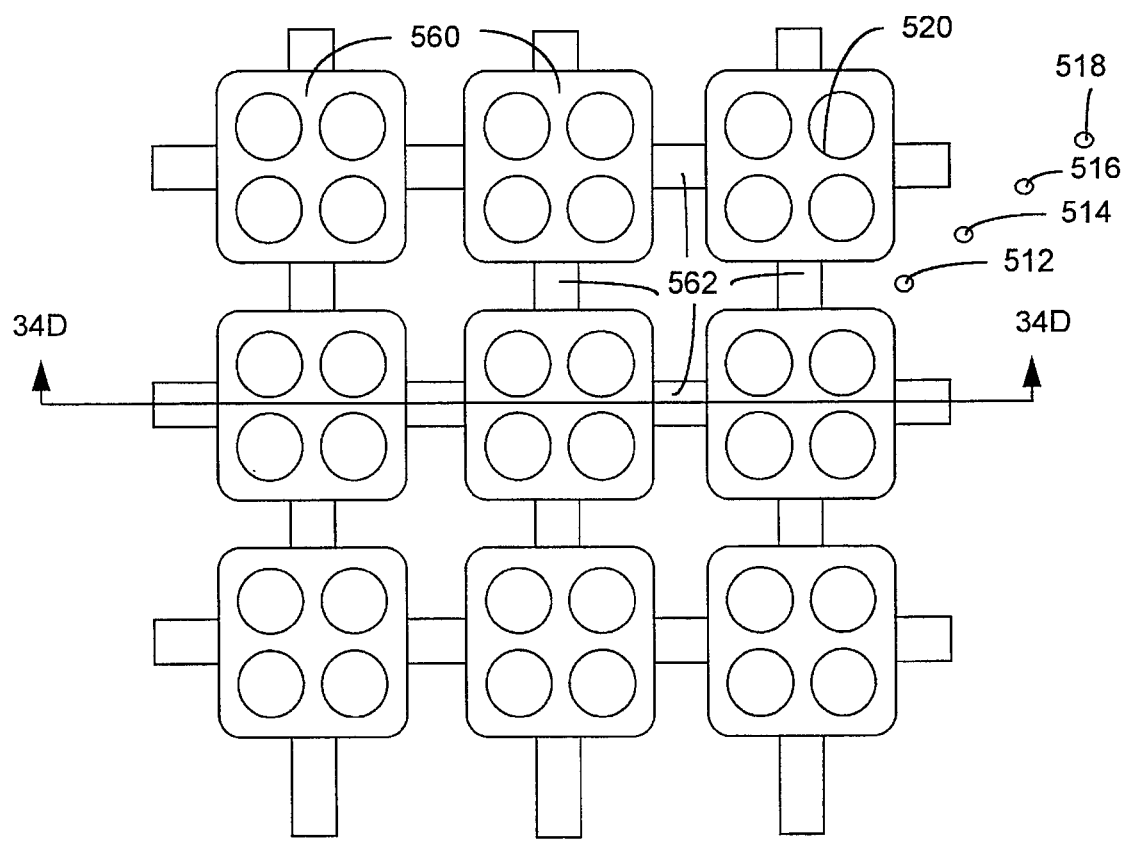
FIGS. 34C, 34D and 34E show an alternate structure for joining capture elements with bridges according to the present invention.
Figure 34D:
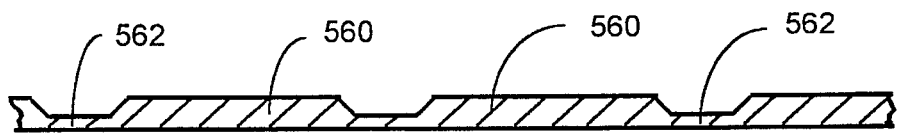

An alternate embodiment for forming a flexible puncture proof material is shown in FIGS. 34C and 34D. In FIG. 34C capture elements 560 are again joined together with bridges 562. The capture elements 560 again have apertures 520. Alignment holes 512, 514, 516 and 518 can be used to align multiple layers formed in the manner of FIG. 34C.

Figure 34E:
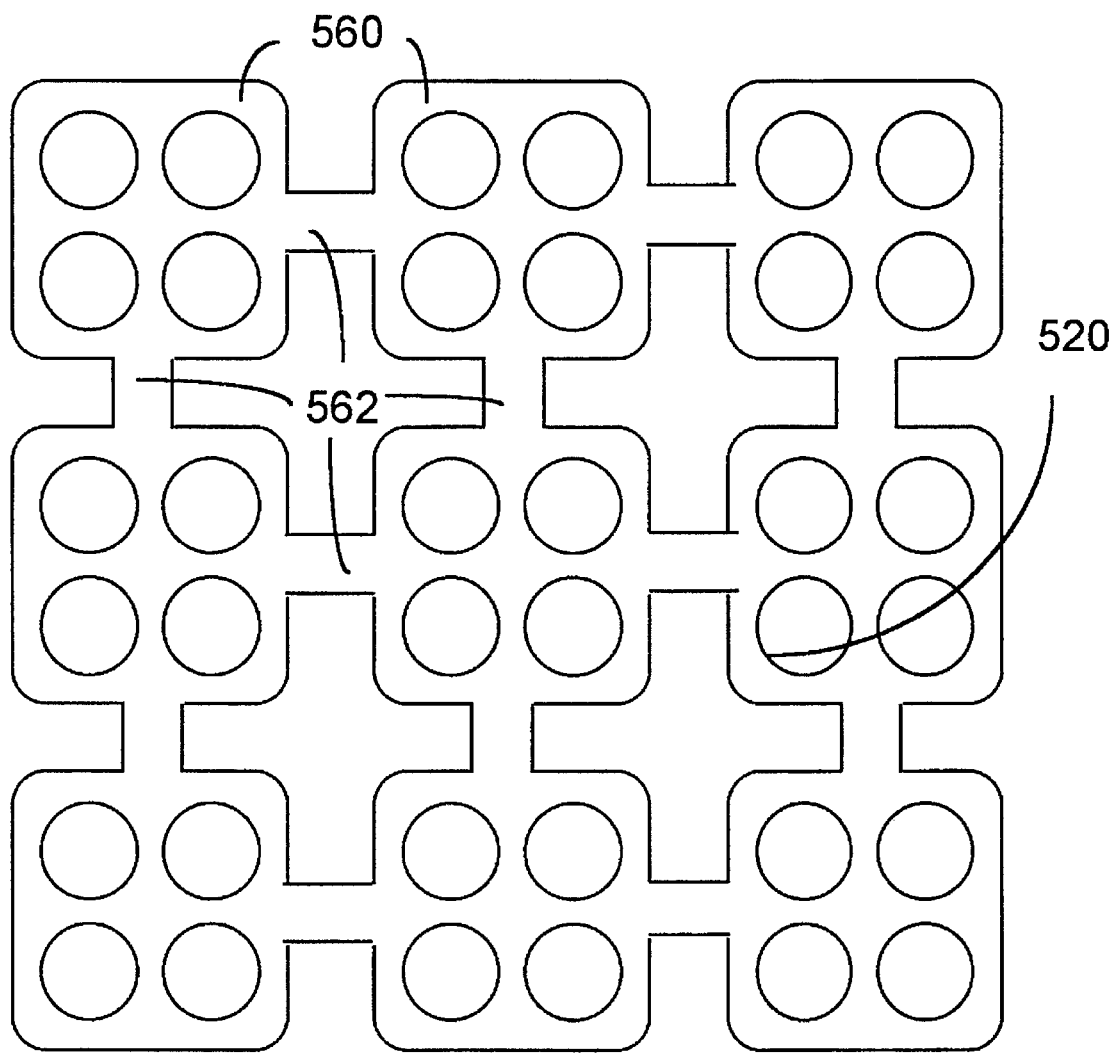
Figure 34F:
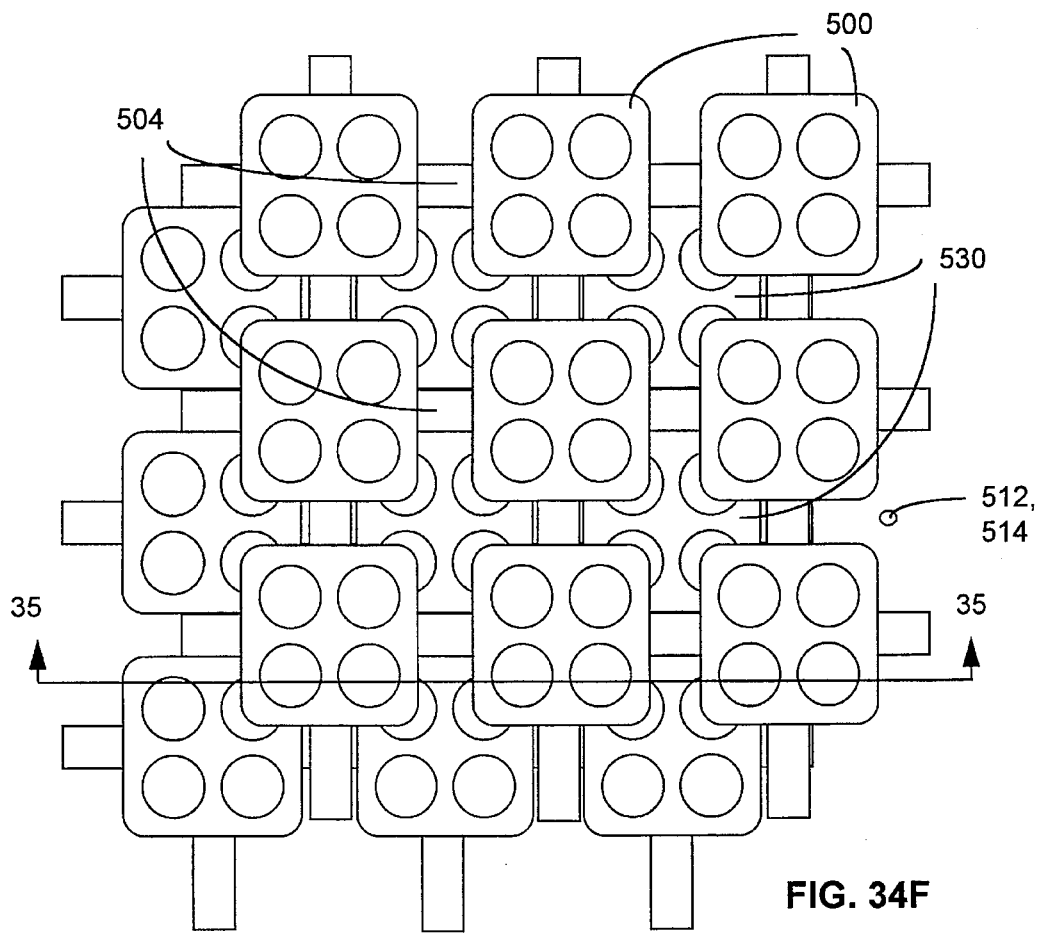
FIG. 34F illustrates two layers of capture elements joined by bridges, the two layers bonded together with a flexible medium according to the present invention.
Figure 35B:
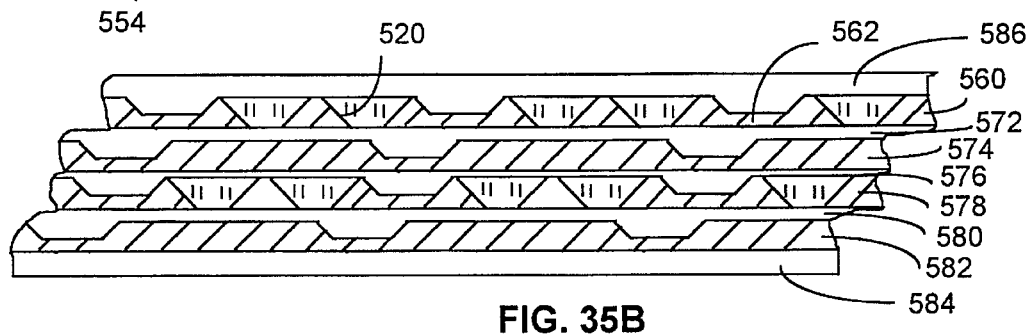
FIG. 35B is an elevation view of multiple layers of the structure shown in FIGS. 34C, 34D and 34E bonded together with a flexible medium according to the present invention.

FIG. 34D is an elevation section of FIG. 34C along line 34D to 34D of FIG. 34C. As illustrated in FIG. 34D, the capture elements 560 and bridges 562 are formed by etching a single sheet of metal. The single sheet of metal before etching could be 3 mils thick and be made of stainless steel. After etching the capture elements 560 are 3 mils thick. The bridges between capture elements can be etched to be ½ to 1 mil thick. The apertures 520 would be etched through the metal sheet. FIG. 34E shows a bottom view of the etched sheet shown in FIG. 34C. The etched sheets formed in the manner of FIG. 34C and 34E are stacked vertically with each sheet offset relative to other sheets so that there are no voids vertically between the layers of etched sheets. The sheets can be aligned in a manner similar to that shown in FIG. 34F. The sheets are then bonded together with flexible bonding material. FIG. 35B is a side elevation view of four etched sheets bonded together. The flexible bonding material is shown as elements 572, 576 and 580 of FIG. 35B. The etched sheets are shown as elements 560, 574, 578 and 582 of FIG. 35B. Etched apertures are shown as elements 520. The layers 586 and 584 can be silicone elastomer to provide a barrier against water and infection or can be spacer material, as described above.

Figure 36A:
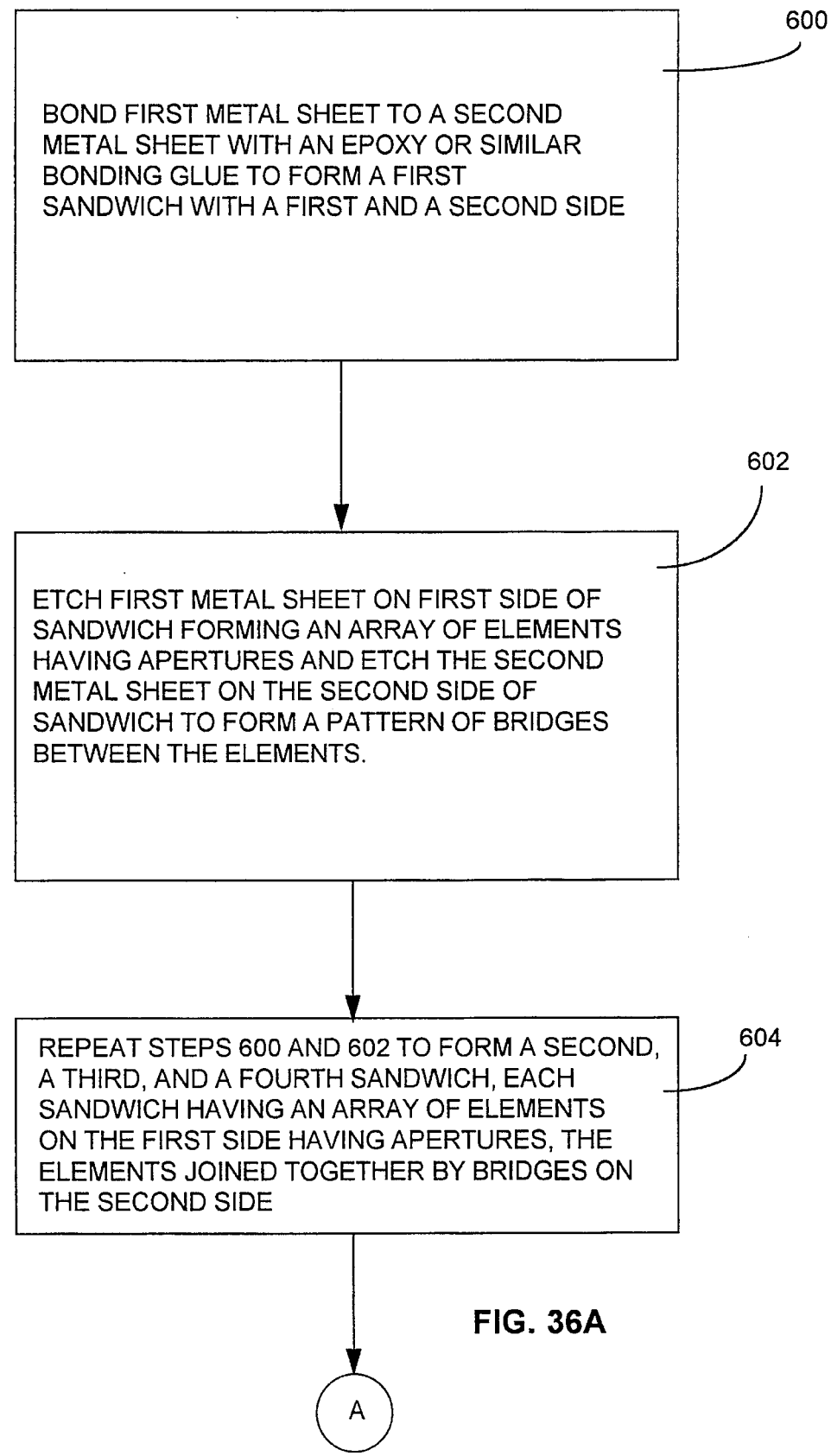
FIGS. 36A and 36B are flow diagrams of a method for constructing a flexible puncture proof material according to the present invention.
Figure 36B:
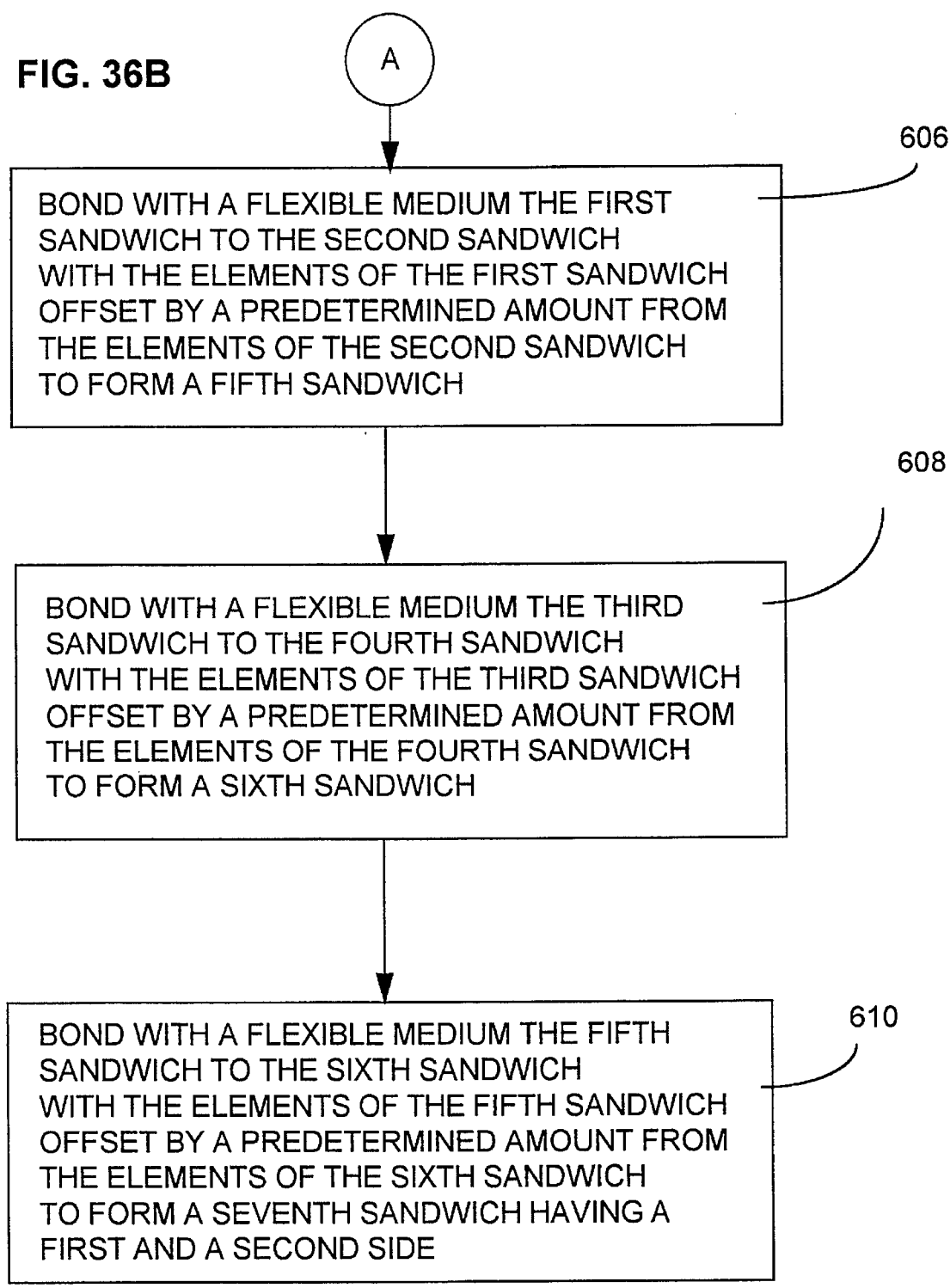

FIGS. 36A and 36B are flow diagrams of a method for forming the flexible puncture proof material shown in FIG. 35A. In step 600, a first metal sheet is bonded to a second metal sheet with epoxy or similar bonding glue to form a first sandwich with a first and second side. Then in step 602 the first side is etched to form an array of capture elements having apertures and the second side is etched to form a pattern of bridges between the capture elements on the first side. Then in step 604, steps 600 and 602 are repeated to form a second, third and fourth sandwich, each sandwich having an array of capture elements with apertures on the first side, the capture elements joined together by bridges etched on the second side. Then in step 606, the first sandwich is bonded to the second sandwich with a flexible medium with the elements of the first sandwich offset by a predetermined amount from the elements of the second sandwich to form a fifth sandwich. In step 608, the third sandwich is bonded to the fourth with the elements of the third sandwich offset by a predetermined amount from the elements of the fourth sandwich to form a sixth sandwich. Then in step 610, the fifth sandwich is bonded with a flexible medium to the sixth sandwich with the elements of the fifth sandwich offset by a predetermined amount from the elements of the sixth sandwich to form a seventh sandwich having a first and second side. The elements of the first, second, third and fourth sandwich are offset from each other when the sandwiches are bonded together so that the seventh sandwich has no voids vertically between the capture elements.

It is also possible to combine steps 606, 608, and 610 by placing the first, second, third and fourth sandwiches in a fixture with the elements of the first, second, third and fourth sandwiches offset from each other so that there are no voids vertically between the capture elements, and then bonding the layers together with silicone elastomer. This silicone elastomer also provides a barrier to water and infectious agents, such as bacteria or viruses.

No post etch reinforcement is required in this embodiment, because the bridges keep the capture elements in position. A base layer for a spacer can be provided as described for other embodiments.

Figure 37A:
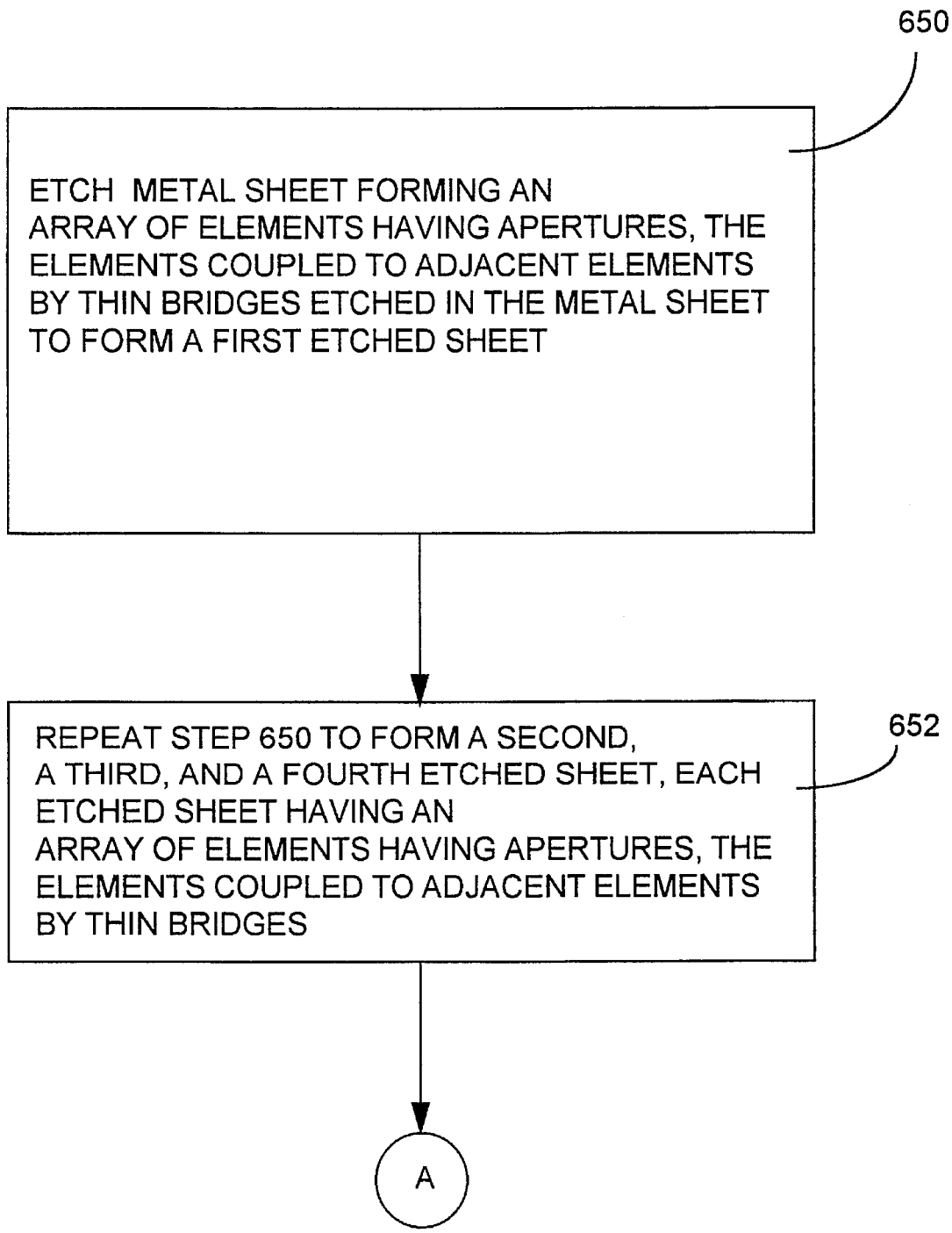
FIGS. 37A and 37B are flow diagrams of an alternate method for constructing a flexible puncture proof material according to the present invention.
Figure 37B:
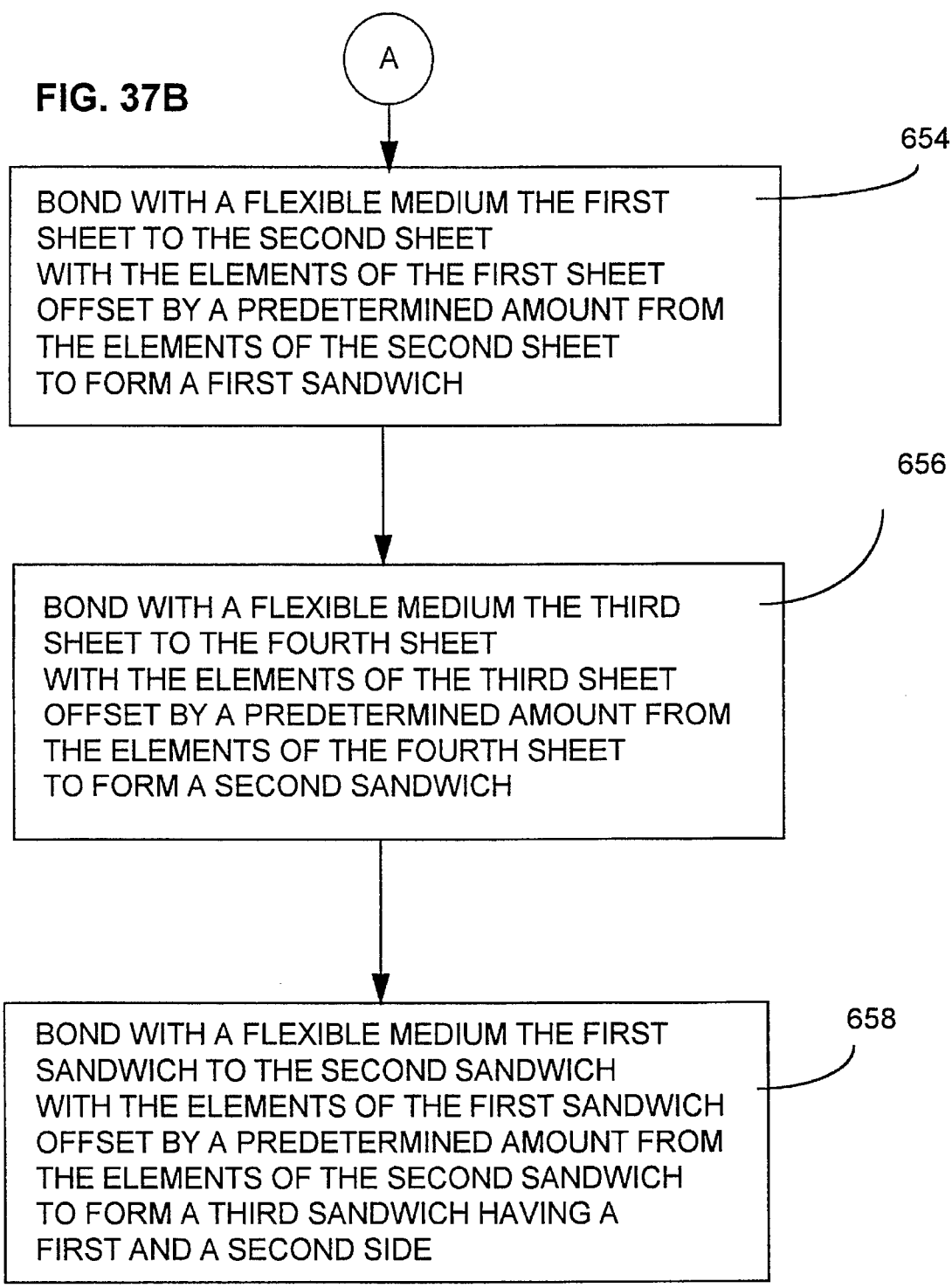

FIG. 37A and 37B are flow diagrams of a method for forming a flexible puncture proof material in the manner shown in FIG. 35B. In step 650 a metal sheet is etched to form an array of capture elements having apertures. The capture elements are coupled to adjacent elements by thin bridges etched in the metal sheet. This forms a first etched sheet. In step 652, step 650 is repeated to form a second, third and fourth etched sheet. Then in step 654, the first sheet is bonded with a flexible medium to the second sheet with the capture elements of the first sheet offset by a predetermined amount from the capture elements of the second sheet to form a first sandwich. Then in step 656, the third sheet is bonded with a flexible medium to the fourth sheet with the capture elements of the third sheet offset by a predetermined amount from the capture elements of the fourth sheet to form a second sandwich. Then in step 658, the first sandwich is bonded with a flexible medium to the second sandwich with the elements of the first sandwich offset by a predetermined amount from the elements of the second sandwich to form a third sandwich having a first and second side. In each case the flexible bonding medium can be silicone elastomer or acrylic adhesive, for example.

It is also possible to combine steps 654, 656, and 658 by placing the first, second, third and fourth etched sheets in a fixture with the elements of the first, second, third and fourth etched sheets offset from each other so that there are no voids vertically between the capture elements, and then bonding the layers together with silicone elastomer. This silicone elastomer also provides a barrier to water and infectious agents, such as bacteria or viruses.

No post etch reinforcement is required in this embodiment, because the thin bridges keep the capture elements in position. A base layer for a spacer can be provided as described for other embodiments.

Figure 38:
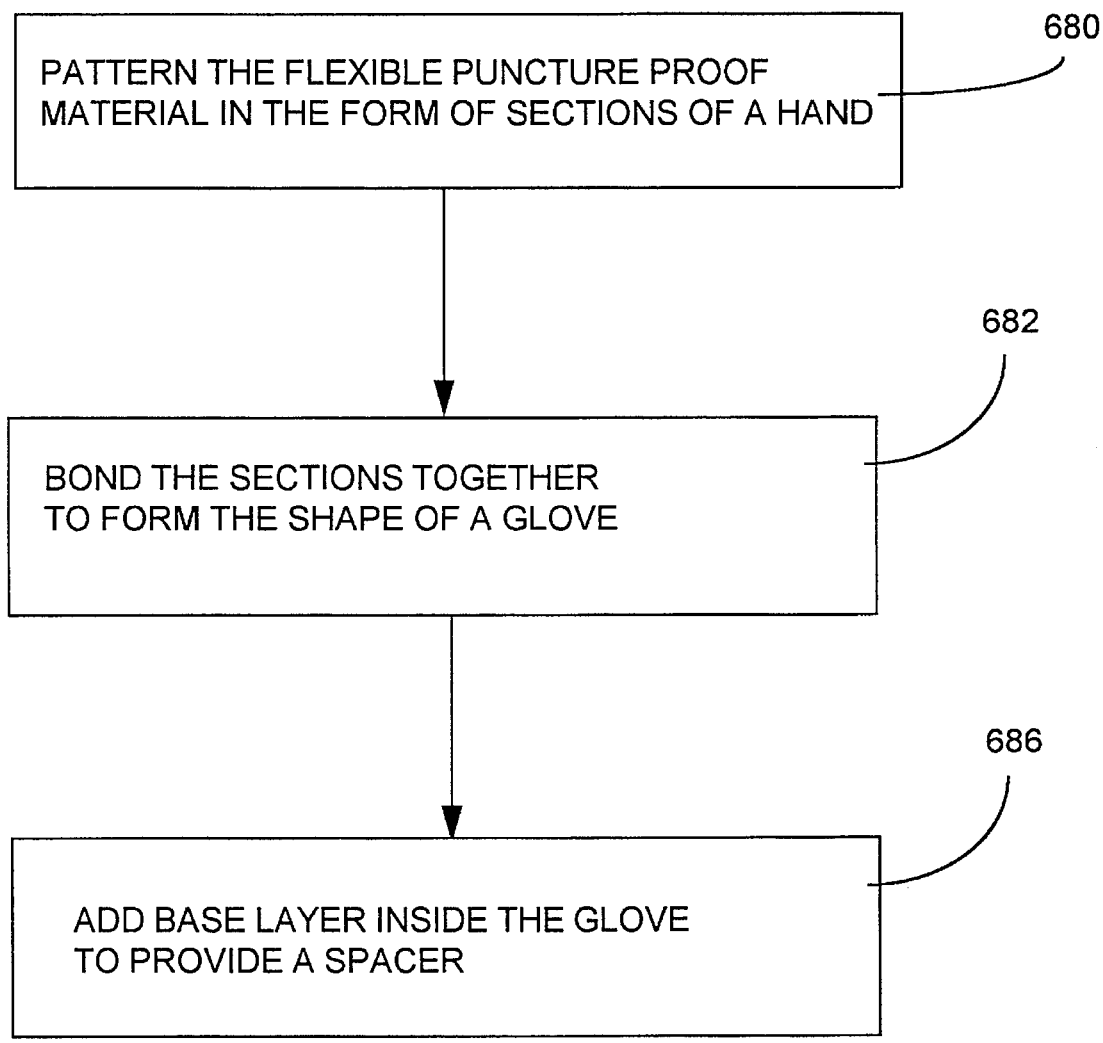
FIG. 38 is a flow diagram of a method for making a glove from the flexible puncture proof material according to the present invention.

FIG. 38 is a flow diagram of a method for constructing a glove from a flexible puncture proof material. In step 680, the flexible puncture proof material is patterned in the form of sections of a hand. Then in step 682 the sections are bonded together to form the shape of a glove. Then in step 684, the exterior of the glove is covered with a flexible medium such as silicone elastomer to provide a barrier to water and infection. Then in step 686, a base layer is added inside the glove to provide a spacer between the wearer of the glove and the lowest layer of the capture elements so that a point of an instrument captured by a capture element but protruding slightly, will not scratch the wearer of the glove.

Figure 39:
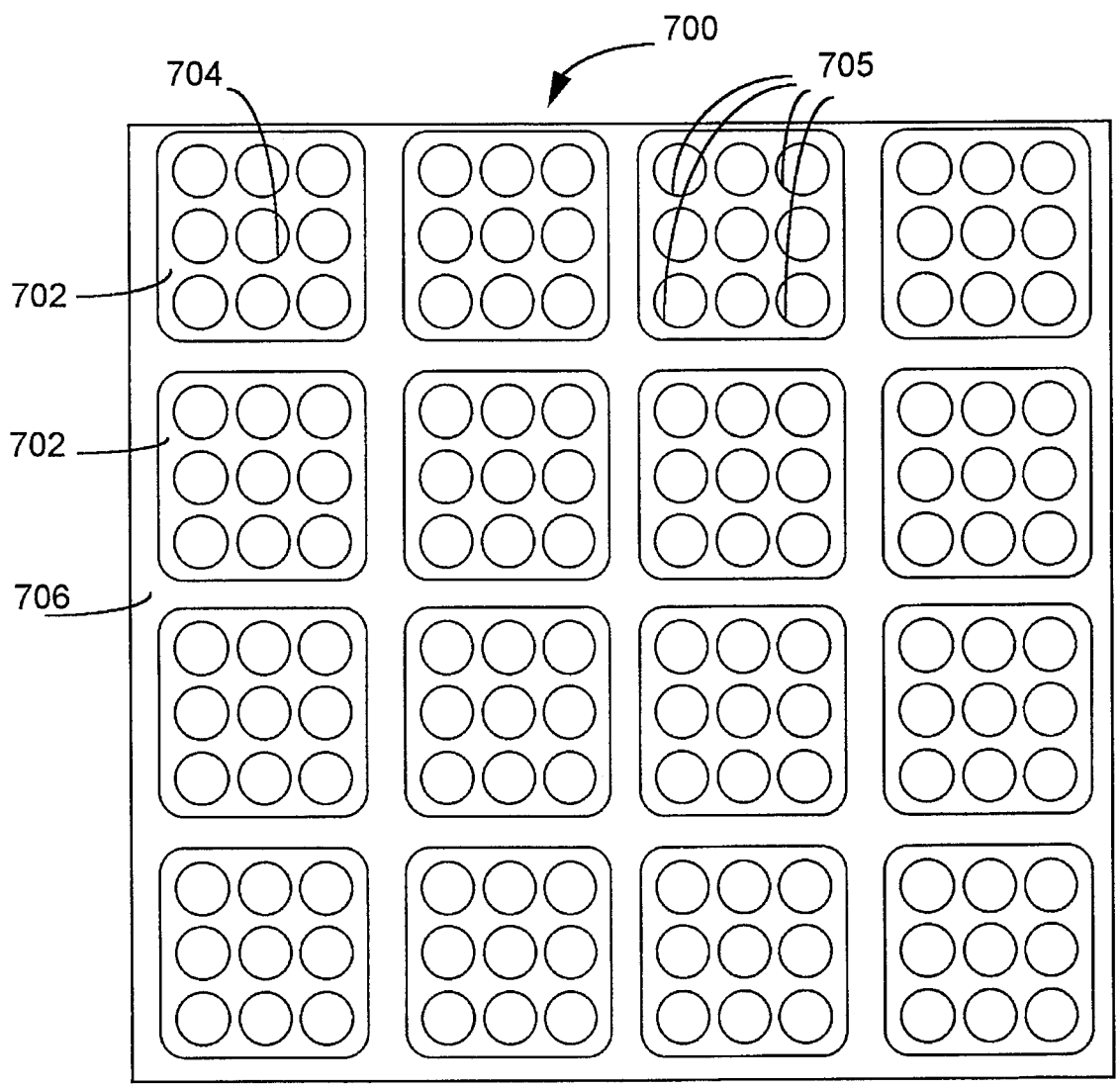
FIG. 39 is a diagram showing capture elements in an array with apertures in each capture element according to the present invention.

In another embodiment of the invention, a sheet of metal is bonded to a carrier and reinforcement material. Kapton of about ½ mil in thickness can be thermally bonded to the metal sheet or acrylic adhesive can be used to bond the Kapton to the metal sheet. Alternatively, a nylon or fine wire mesh can be bonded to the metal sheet with silicone elastomer. Then a single sided etch of the metal sheet is performed to form a layer of capture elements 702 having apertures 704 and 705, as shown in FIG. 39. After etching the material 706 retains the capture elements 702 in an array as shown in FIG. 39. The apertures in each capture element can form an N by N array such as a 2×2 or 3×3 array of apertures. It is also possible to have other patterns of apertures in each capture element. Four layers identical layers are formed, and then the four layers are placed in a fixture, with the layers slightly offset from one another to close any voids, and then laminated and bonded with a soft silicone elastomer, in a single step process. Since the four layers are impregnated by silicone elastomer, no additional coating is required to make the flexible material water tight to exclude bacteria. A spacer may be added as described for other embodiments.

Figure 44:
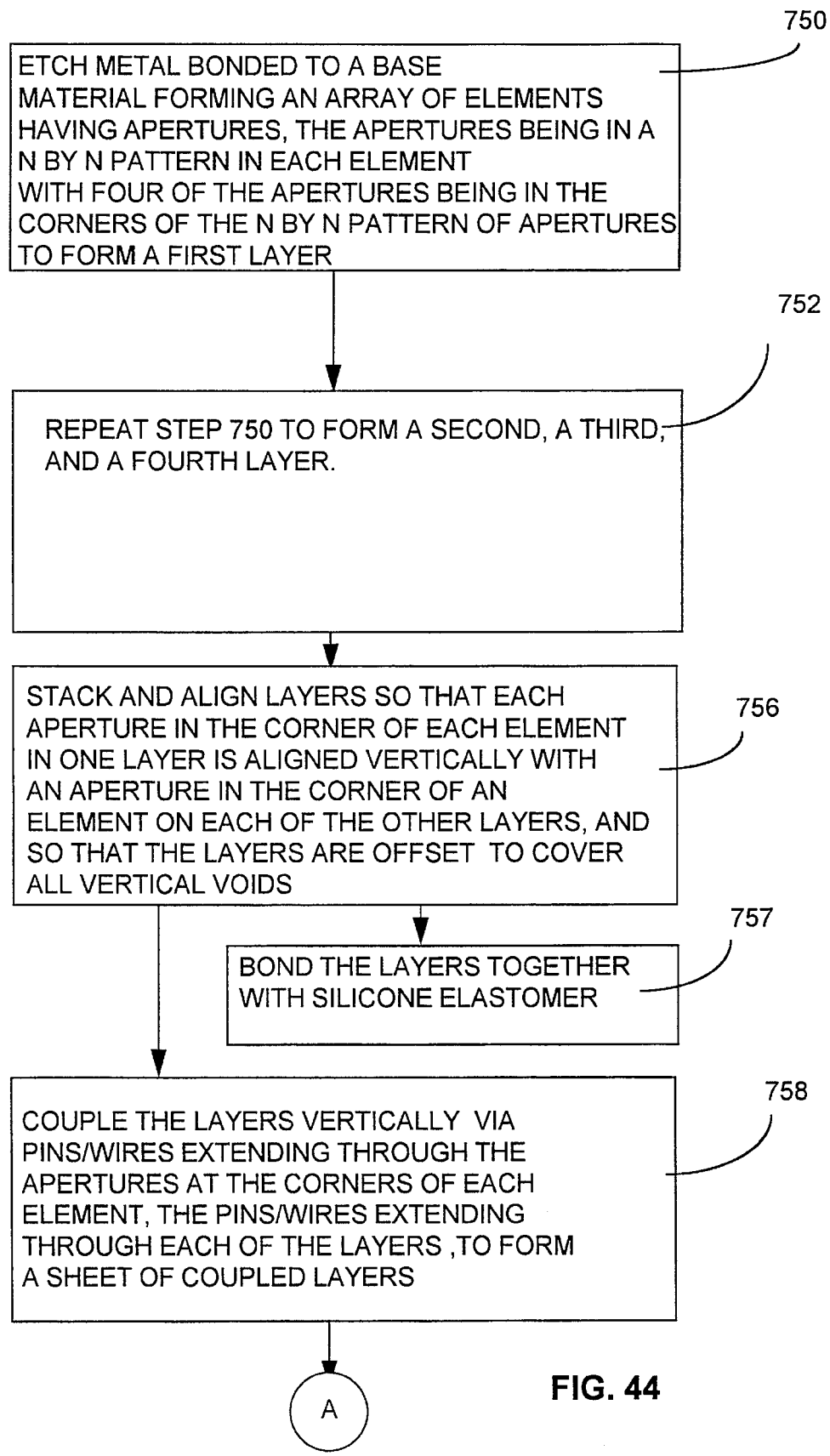
FIGS. 44 and 45 are flow diagrams of a method for fabricating a flexible puncture proof material according to the present invention.
Figure 45:
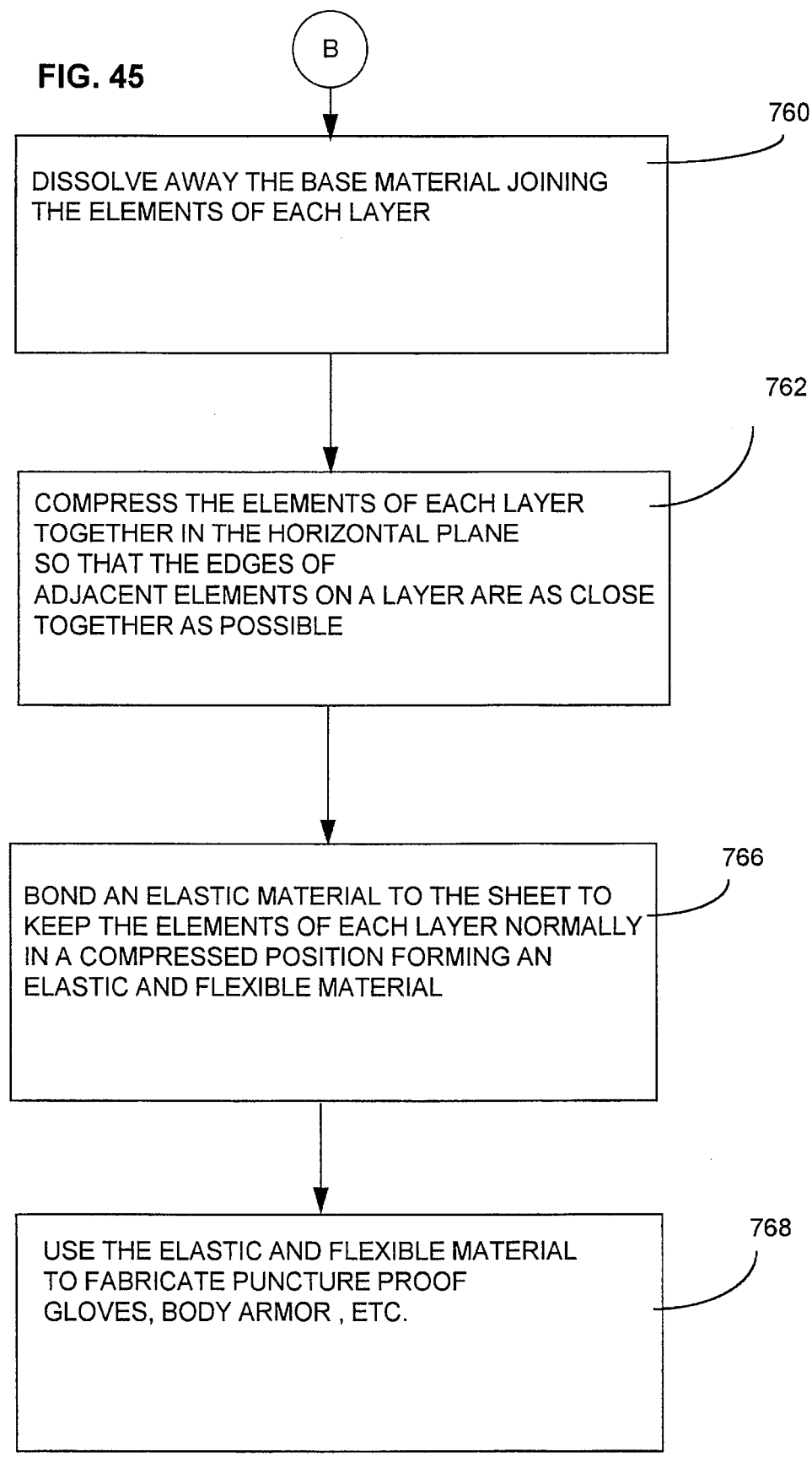

Steps 750, 752, 756 and 757 of FIG. 44, summarize the steps for constructing this flexible puncture proof material. Steps 750, 752, and 756 are described below in relation to another embodiment; however in step 756 it is not necessary to align layers so that apertures in corners are aligned. It is only necessary that the layers are stacked offset to cover all vertical voids. Step 757 bonds the four layers together with silicone elastomer.

This embodiment has an advantage over the double sided etch shown in FIG. 26B, because as shown in FIG. 26B, the apertures in the bottom layer of the etch are inverted compared to the top layer. The result is that when a sharp instrument pierces the top layer and is in contact with the bottom layer of FIG. 26B, then the sharp instrument is less likely to encounter an aperture on the bottom layer, because the diameter of the apertures are less at the top of the bottom layer than at the bottom of the bottom layer, as is evident in FIG. 26B. In the embodiment with four layers of single sided etched metal as described here, the layers are all oriented with the large diameters of the apertures facing upward to best capture the point of a sharp instrument. Also, the pre-etch reinforcement with Kapton is closer to the center of rotation of the material than the post etch reinforcement, which improves flexibility.

In another embodiment of the invention, a sheet of metal is bonded to a base material such as Kapton. Then the sheet of metal is etched to form capture elements 702 having apertures 704 and 705, again as shown in FIG. 39. After etching the base material 706 retains the capture elements 702 in an array as shown in FIG. 39. The apertures in each capture element form an N by N array. In FIG. 39, 9 apertures 704 are shown per capture element 702. The N by N array of apertures in each capture element are arranged such that apertures 705 are in each corner of each capture element. This arrangement of apertures is a preferred arrangement, but a 2×2 array or other arrangement is possible.

The capture elements shown in FIG. 39 are essentially square; however, it should be understood that the capture elements can be in other polygon shapes, such as rectangles or hexagons.

Figure 40:
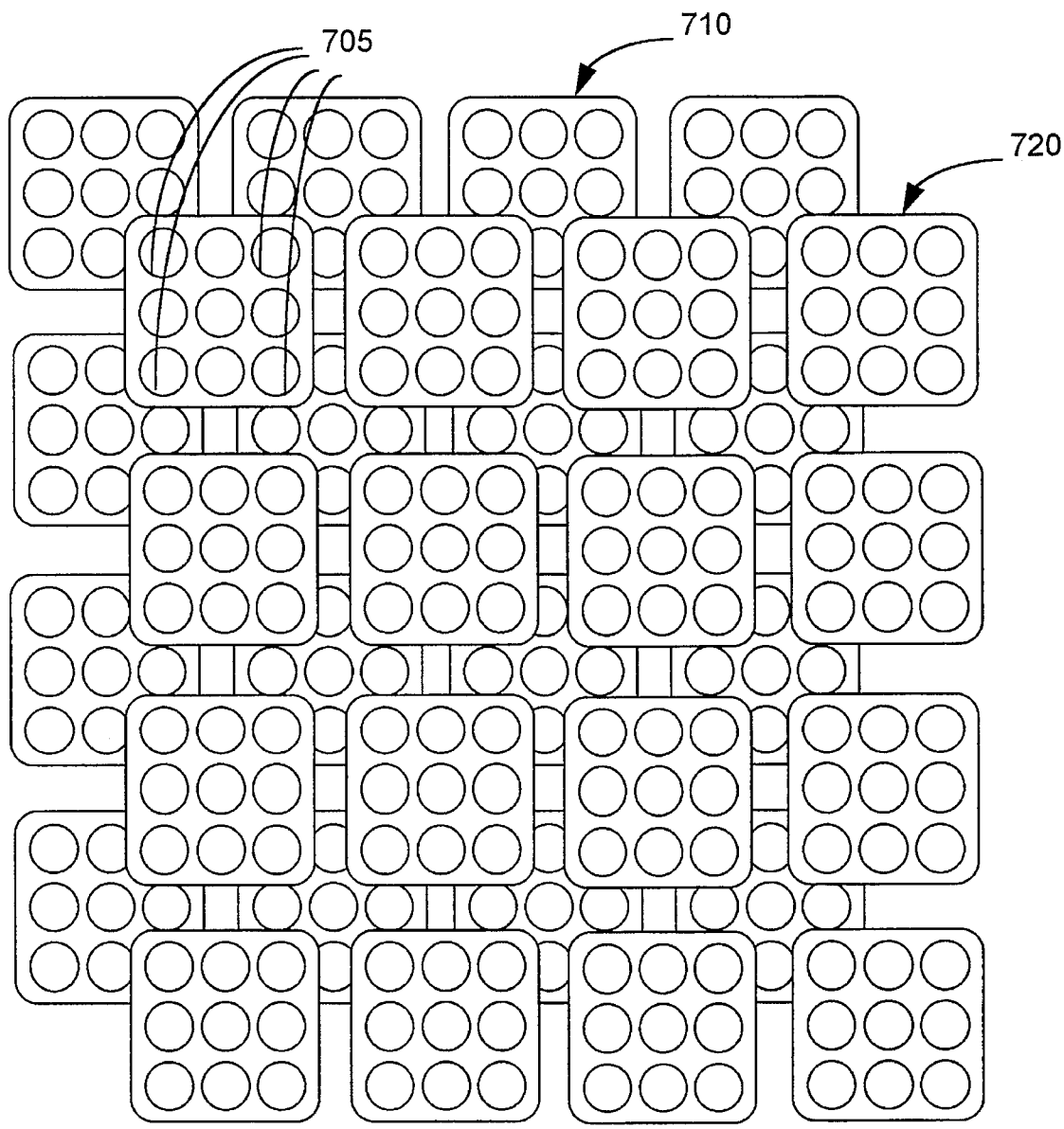
FIG. 40 shows two layers of capture elements according to FIG. 39 overlaid one on top of the other according to the present invention.

Multiple etched sheets in the form of FIG. 39 are constructed. Then the etched sheets are overlaid as shown in FIG. 40 so that the apertures 705 in the corners of overlain capture elements are vertically aligned. The etched sheet 710 is offset from the etched sheet 720 so that multiple stacked layers leave no vertical voids between the stacked layers. Thus a sharp instrument attempting to puncture the flexible puncture proof material will always be captured by an aperture of one of the capture elements. The next step in the process is to couple the layers vertically.

Figure 41:
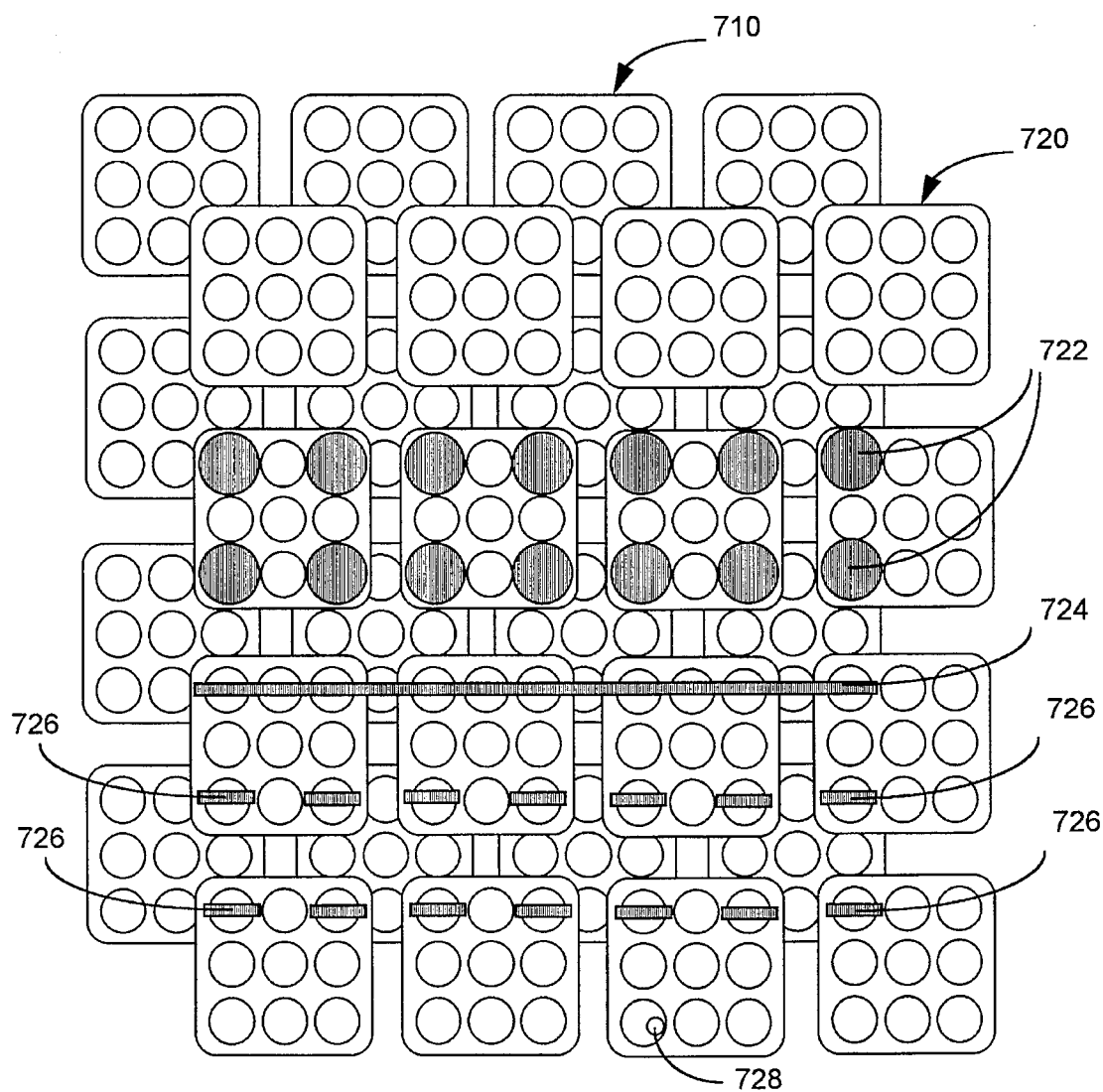
FIG. 41 is a top view showing apparatus for vertically coupling the layers of FIG. 40 according to the present invention.
Figure 42:
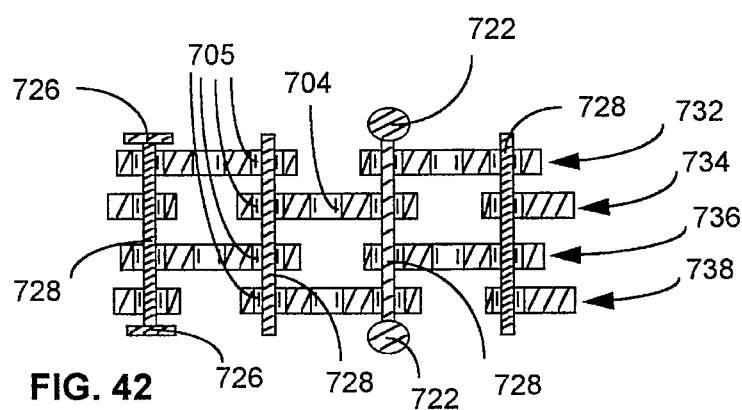
FIG. 42 is a side elevation view showing vertical coupling between multiple layers of capture elements according to the present invention.

One technique for linking the etched layers vertically is illustrated by elements 724, 726 and 728 in FIGS. 41 and 42. Pins 728 are extended through apertures 705 in the capture elements as shown by pin 728 in FIG. 42.

The sheets are stacked using a jig that registers the sheets to each other via alignment holes (not shown) in the sheets. The jig provides full access to both the upper and lower surfaces of the stacked sheets for robotic machines. A high precision unit advances a 6 mil wire through the aligned corner apertures 705 on the sheets for an entire row. A second robotic unit then positions a single heavier wire (about 14 mils) on a frame, in apposition with the row of projecting 6 mil wires. A robotic spot welder then compresses and fuses the T-junction of a full row. This can be repeated for each of the rows. A T-junction would also be formed on the bottom of each wire threaded through the aligned corner apertures 705. In FIG. 42, the wire threaded through the corner apertures 705 is shown as element 728. The single heavier wire across the ends of the projecting wire 728 is shown as element 724 on FIG. 41. The last step in this process is to laser cut the single thick wire 724 to form individual "T"s. After the wire 724 has been spot welded to the wires 728 and laser cut to form T's on the top and the bottom of the wire 728,.then the capture elements of each layer are coupled together as shown in FIG. 42. The top view of the layers shown in FIG. 41 shows the T's 726 and indicates they are cut to have a length larger than the diameter of the aperture in the capture elements. Also shown in FIG. 41 is the approximate relative size of the wire 728 to an aperture.

An alternate and simpler method of linking the capture elements vertically is to pass a wire through the corner apertures of the stack of sheets and then use a laser beam in the horizontal plane to cut off the wires close to the capture elements above and below the stack of sheets. The laser beam vaporizes a segment of the wire 728, cutting the wire, but also creating a small ball 722 or protrusion at each end of the wire 728. The ball 722 created at the end of each wire 728 is larger than the diameter of the apertures 705 so the capture elements are coupled in the vertical dimension. FIG. 41 shows the balls 722 that would be formed at each corner of each capture element on the top and bottom of the stack of sheets.

Whether the capture elements are vertically linked using the T's with the wire 728 and wire 726 combination or the wire 728 and ball 722 combination, after all capture elements in a stacked sheet have been vertically coupled, then the sheet is immersed in a bath to dissolve the base material away. Kapton used as a base material can be dissolved away using sodium hydroxide at a temperature of 100 degrees centigrade.

The resulting puncture proof material is then quite flexible. Patterns for various shapes such as hand shapes are then cut by laser and then bonded together to form clothing such as gloves for surgeons.

Figure 43:
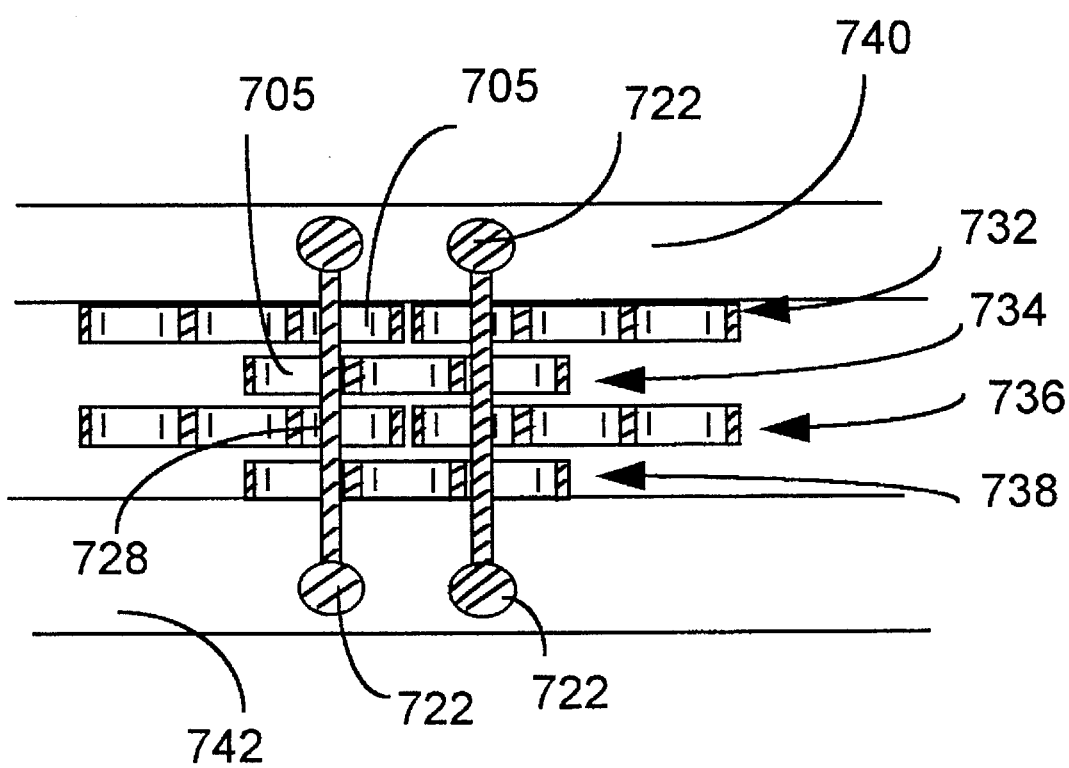
FIG. 43 is a diagram showing capture elements compressed together horizontally according to the present invention.

Another feature of this embodiment is that it is possible to use this embodiment to obtain elasticity as well as flexibility. Elasticity is obtained by compressing the capture elements together in the horizontal plane after they have been linked together as shown in FIG. 43. After compressing the capture elements as close together as possible in the horizontal plane, an elastic material is bonded to the top and/or the bottom of the coupled layers as shown by elements 740 and 742 in FIG. 43. The elastic material 740 and 742 normally holds the capture elements together in a compressed manner; however, the capture elements will spread apart when a wearer stretches the material. This arrangement ensures that the flexible puncture proof material is also elastic. This can have great benefit in the case of tight fitting situations such as a glove which must bend and stretch as a hand flexes. After the elastic flexible puncture proof material shown in FIG. 43 is formed, then other layers can be added to the material to form water and infection barriers and to add a spacer, as described above.

FIGS. 44 to 47 are flow diagrams of methods for forming an elastic flexible puncture proof material according to the present invention. In step 750, metal bonded to a base material such as ½ mil Kapton as a "carrier" is etched to form an array of capture elements each having a pattern of apertures. One such pattern is an N by N pattern, which includes four apertures in the corners of the N by N pattern. The etched metal sheet forms a first layer. The base material has the purpose of maintaining the capture elements in alignment after they have been etched. In step 752, step 750 is repeated to form a second, a third and a fourth layer. Then in step 756 the layers are stacked so that the apertures in the corners of each capture element of the stacked layers are aligned vertically and so that the layers are offset from each other so that there are no vertical voids. Then in step 758 the layers are vertically coupled via pins or wires extended through the apertures of the corners of each capture element. The pins or wires extend through each of the layers to form a sheet of coupled layers.

Once the layers have been coupled, the base material joining the capture elements of each layer is dissolved away, as shown in step 760. If Kapton is used as the base material, then the Kapton can be dissolved away using a bath of sodium hydroxide at 100 degrees centigrade. Then in step 762, the capture elements of each layer are compressed together in a horizontal plane so that the edges of adjacent capture elements on a layer are as close together as possible. Then in step 766 an elastic material is bonded to the sheet on the top and/or bottom surface to keep the capture elements of each layer normally in a compressed position forming an elastic and flexible material. Then in step 768 the elastic and flexible material can be used to fabricate puncture proof gloves and body armor.

Figure 46:
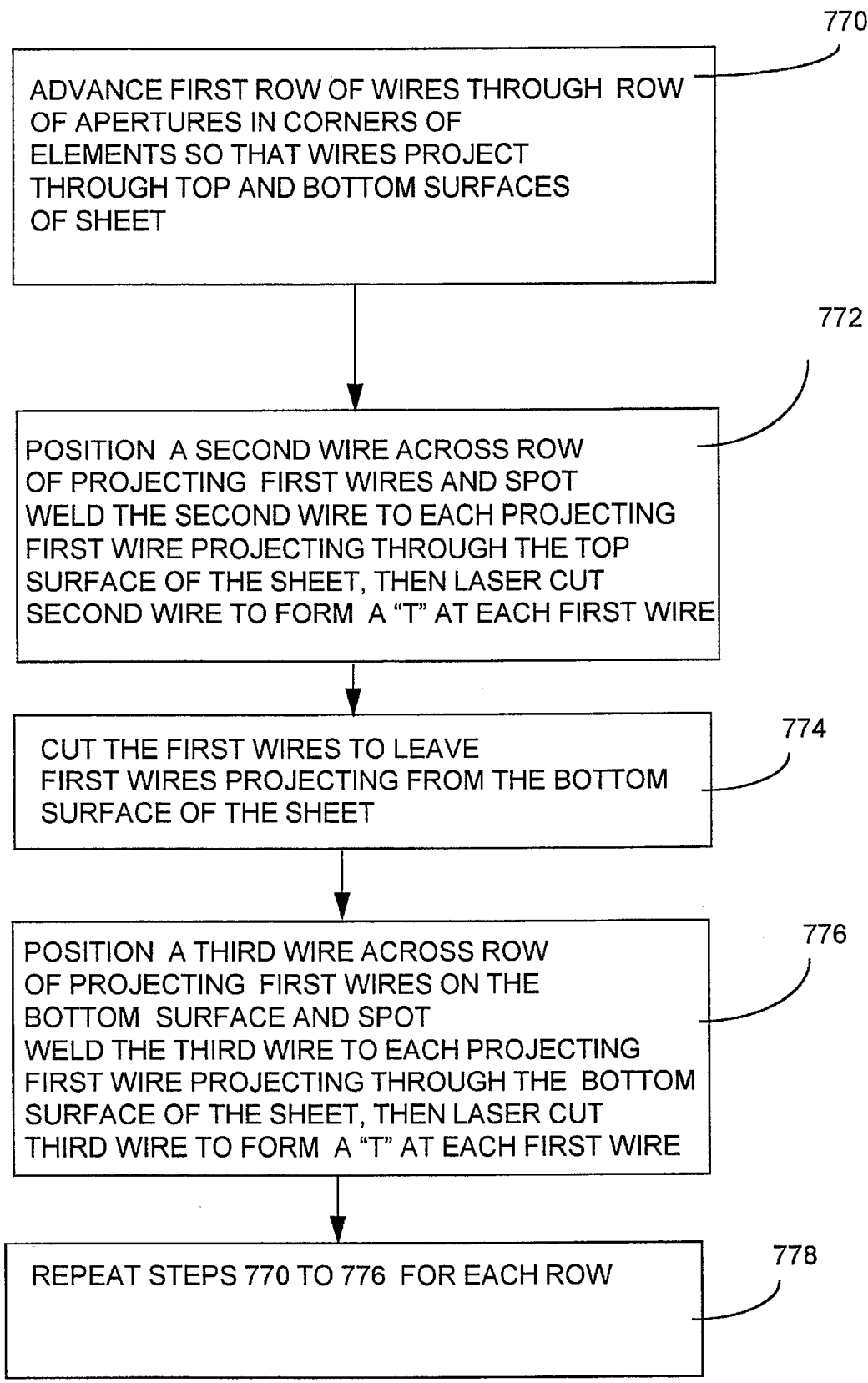
FIG. 46 is a flow diagram of a method for coupling capture elements vertically according to the present invention.

FIGS. 46 and 47 are flow diagrams of alternate methods of coupling the layers vertically via pins or wires as indicated in step 758 of FIG. 44. In step 770 of FIG. 46, a first row of wires is advanced through a row of apertures in the corners of the capture elements so that the wires project through the top and bottom surfaces of the stacked sheet of layers. Then in step 772, a second wire is positioned across a row of projecting first wires and spot welded to each projecting first wire projecting through the top surface of the sheet. Then a laser is used to cut the second wire to form a T at each first wire. Then in step 774 the first wires are cut to leave the first wires projecting from the bottom surface of the sheet. Then in step 776, a third wire is positioned across the row projecting first wires on the bottom sheet and spot welded to each projecting first wire. Then a laser is used to cut the third wire to form a T at each first wire. In step 778, the steps 770 through 776 are repeated for each row of the stacked layers.

FIG. 47 is an alternate method of performing step 758 of FIG. 44. In step 780, wires are advanced through apertures in the corners of the row of capture elements so that the wires project through the top and the bottom surfaces of the sheet of stacked layers. Then in step 782 a laser is used to cut the projecting wires near the top and bottom surfaces of the sheet. The laser cuts the first row of wires and forms balls or protrusions at the end of each wire. The balls have a diameter greater than the diameter of the apertures and the stacked layers are thereby vertically linked.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A flexible puncture proof material for preventing a puncture by a sharp element having a pointed end, the flexible puncture proof material comprising:

a flexible layer for providing a flexible substrate and for providing a binding and embedding substrate for binding and embedding capture elements;

a first plurality of capture elements for capturing the pointed end of the sharp element, the first plurality of capture elements being essentially identical and arranged in a first two dimensional array bound to and embedded in the flexible layer;

a second plurality of capture elements for capturing the pointed end of the sharp element, each capture element being essentially identical to the first plurality of capture elements, the second plurality of capture elements arranged in a second two dimensional array bound to and embedded in the flexible layer, the second two dimensional array offset by a fraction of a width dimension of one of the capture elements relative to the first two dimensional array for capturing the pointed end of the sharp element if the pointed end of the sharp element passes between the first plurality of capture means; and a third plurality of capture elements for capturing the pointed end of the sharp element, each capture element being essentially identical to the first plurality of capture elements, the third plurality of capture elements arranged in a third two dimensional array bound to and embedded in the flexible layer, the third two dimensional array offset by a fraction of the width dimension of one of the capture elements relative to the first two dimensional array and to the second two dimensional array for capturing the pointed end of the sharp element if the pointed end of the sharp element passes between the first plurality of capture elements and between the second plurality of capture elements wherein each of said plurality of capture elements has at least one aperture large enough to accept and capture said pointed end of said sharp element and small enough to prevent said pointed end from passing through said aperture.

2. The flexible puncture proof material of claim 1 wherein each capture element comprises:

a plate having at least one aperture large enough to accept and capture said pointed end of said sharp element and small enough to prevent said sharp element from passing through said aperture.

3. The flexible puncture proof material of claim 1 wherein said flexible layer for providing a flexible substrate comprises a silicone elastomer.

4. The flexible puncture proof material of claim 2 wherein said plate comprises a disc having a circular edge and having a circular aperture.

5. The flexible puncture proof material of claim 4 wherein said disc comprises a disc 3 mils to 6 mils thick and 40 mils to 80 mils in diameter having an aperture 8 to 12 mils in diameter.

6. The flexible puncture proof material of claim 2 wherein said plate comprises a disc having at least four apertures.

7. The flexible puncture proof material of claim 4 wherein said disc comprises:

a disc about 5 mils thick and about 60 mils in diameter having four apertures interior to said disc forming four spokes each about 6 mils wide from a center of said disc and forming a circular edge of said disc about 6 mils wide.

8. The flexible puncture proof material of claim 2 wherein said plate comprises a disc having sides forming a polygon.

9. The flexible puncture proof material of claim 8 wherein said disc further comprises sides forming a hexagon.

10. The flexible puncture proof material of claim 1 wherein:

each capture means of the first plurality of capture means is essentially tangent to adjacent capture means in the first two dimension array;

each capture means of the second plurality of capture means is essentially tangent to adjacent capture means in the second two dimension array; and each capture means of the third plurality of capture means is essentially tangent to adjacent capture means in the third two dimension array.

11. A flexible puncture proof material for preventing a puncture by a sharp element having a pointed end, the flexible puncture proof material comprising:

a flexible layer for providing a flexible substrate and for providing a binding and embedding substrate for binding and embedding capture elements;

a first plurality of capture elements for capturing the pointed end of the sharp element, the first plurality of capture elements being essentially identical and arranged in a first two dimensional array bound to and embedded in the flexible layer;

a second plurality of capture elements for capturing the pointed end of the sharp element, each capture element being essentially identical to the first plurality of capture elements, the second plurality of elements arranged in a second two dimensional array bound to and embedded in the flexible layer, the second two dimensional array offset by a fraction of a width dimension of one of the capture elements relative to the first two dimensional array for capturing the pointed end of the sharp element if the pointed end of the sharp element passes between the first plurality of capture elements; and a third plurality of capture elements for capturing the pointed end of the sharp element, each capture element being essentially identical to the first plurality of capture elements, the third plurality of capture elements arranged in a third two dimensional array bound to and embedded in the flexible layer, the third two dimensional array offset by a fraction of a width dimension of one of the capture elements relative to the first two dimensional array and the second two dimensional array for capturing the pointed end of the sharp element if the pointed end of the sharp element passes between the first plurality of capture elements and the second plurality of capture elements, wherein each of said capture elements comprises:

a plate having a surface; and at least one indentation on said surface for capturing the pointed end of the sharp element.

12. A flexible puncture proof material for preventing a puncture by a sharp element having a pointed end, the flexible puncture proof material comprising:
- a flexible layer for providing a flexible substrate and for providing a binding and embedding substrate for binding and embedding capture elements;
- a first plurality of capture elements for capturing the pointed end of the sharp element, the first plurality of capture elements being essentially identical and arranged in a first two dimensional array bound to and embedded in the flexible layer;
- a second plurality of capture elements for capturing the pointed end of the sharp element, each capture element being essentially identical to the first plurality of capture elements, the second plurality of elements arranged in a second two dimensional array bound to and embedded in the flexible layer, the second two dimensional array offset by a fraction of a width dimension of one of the capture elements relative to the first two dimensional array for capturing the pointed end of the sharp element if the pointed end of the sharp element passes between the first plurality of capture elements; and
- a third plurality of capture elements for capturing the pointed end of the sharp element, each capture element being essentially identical to the first plurality of capture elements, the third plurality of capture elements arranged in a third two dimensional array bound to and embedded in the flexible layer, the third two dimensional array offset by a fraction of a width dimension of one of the capture elements relative to the first two dimensional array and the second two dimensional array for capturing the pointed end of the sharp element if the pointed end of the sharp element passes between the first plurality of capture elements and the second plurality of capture elements, wherein each of said capture elements comprises:
- a plate having a concave surface for capturing the pointed end of the sharp element.

13. A flexible puncture proof material for preventing a puncture by a sharp element having a pointed end, the flexible puncture proof material comprising:
- a flexible layer for providing a flexible substrate and for providing a binding and embedding substrate for binding and embedding shingles;
- a first plurality of shingles for capturing the pointed end of the sharp element, each shingle having a width and length, the first plurality of shingles arranged in a first plurality of rows each comprised of partially overlapping adjacent shingles, each first plurality of rows bound to and embedded in the flexible layer; and
- a second plurality of shingles for capturing the pointed end of the sharp element, each shingle having a width and length essentially identical to the width and length of the first plurality of shingles, the second plurality of shingles arranged in a second plurality of rows each comprised of partially overlapping adjacent shingles, said second plurality of rows bound to and embedded in the flexible layer and arranged relative to said first plurality of rows so that each of the second plurality of rows partially overlaps one or two adjacent rows of the first plurality of rows;
- wherein each of said shingles has at least one aperture large enough to accept and capture said pointed end of said sharp element and small enough to prevent said pointed end from passing through said aperture.

14. A flexible puncture proof material for preventing a puncture by a sharp element having a pointed end, the flexible puncture proof material comprising:
- a flexible layer for providing a flexible substrate and for providing a binding and embedding substrate for binding and embedding shingles;
- a first plurality of shingles for capturing the pointed end of the sharp element, each shingle having an S shaped cross section in length and having a width, the first plurality of shingles arranged in a first plurality of rows each comprised of interlocked adjacent shingles, each first plurality of rows bound to and embedded in the flexible layer; and
- a second plurality of shingles for capturing the pointed end of the sharp element, each shingle having an S shaped cross section in length and having a width essentially identical to the length and width of the first plurality of shingles, the second plurality of shingles arranged in a second plurality of rows each comprised of interlocked adjacent shingles;
- wherein each second plurality of rows is bound to and embedded in the flexible layer, and each of the second plurality of rows is arranged relative to the first plurality of rows so that the second plurality of rows partially overlaps one or two adjacent rows of the first plurality of rows.

15. A flexible puncture proof material for preventing a puncture by a sharp element having a pointed end, the flexible puncture proof material comprising:
- a flexible layer for providing a flexible substrate and for providing a binding and embedding substrate for binding and embedding shingles;
- a first plurality of shingles for capturing the pointed end of the sharp element, each shingle having a hemicylindrical cross section in length and having a width, the first plurality of shingles arranged in a first plurality of rows each comprised of interlocked adjacent shingles, each first plurality of rows bound to and embedded in the flexible layer; and
- a second plurality of shingles for capturing the pointed end of the sharp element, each shingle having a hemicylindrical cross section in length and having a width essentially identical to the length and width of the first plurality of shingles, the second plurality of shingles arranged in a second plurality of rows each comprised of interlocked adjacent shingles, each second plurality of rows bound to and embedded in the flexible layer;
- wherein each of the second plurality of rows is arranged relative to the first plurality of rows so that the second plurality of rows partially overlaps one or two adjacent rows of the first plurality of rows.

16. A flexible puncture proof material for preventing a puncture by a sharp element having a pointed end, the flexible puncture proof material comprising:
- flexible layer means for providing a flexible substrate and for providing a binding and embedding substrate for binding and embedding capture means;
- a first plurality of capture means for capturing the pointed end of the sharp element, the first plurality of capture means arranged in a first two dimensional array bound to and embedded in the flexible layer means; and
- a second plurality of capture means for capturing the pointed end of the sharp element, the second plurality of capture means arranged in a second two dimensional array, the second two dimensional array offset by a fraction of a width dimension of one of the capture elements relative to the first two dimensional array for capturing the pointed end of the sharp element if the pointed end of the sharp element passes between the first plurality of capture means wherein each of said plurality of capture means has at least one aperture large enough to accept and capture said pointed end of said sharp element and small enough to prevent said pointed end from passing through said aperture.

17. A flexible puncture proof material for preventing a puncture by a sharp element having a pointed end, the flexible puncture proof material comprising:

a first sandwich comprising:

a first sheet etched in a first pattern to form a first array of capture elements wherein each of the capture elements has at least one aperture large enough to accept and capture the pointed end of the sharp element and small enough to prevent the pointed end from passing through the aperture;

a second sheet bonded to the first sheet with a flexible material forming the first sandwich, the second sheet etched in a second pattern to form a second array of capture elements wherein the second array is offset by a fraction of a width dimension of one of the capture elements from the first array of capture elements and wherein each of the capture elements has at least one aperture large enough to accept and capture the pointed end of the sharp element and small enough to prevent the pointed end from passing through the aperture;

a second sandwich comprising:

a third sheet etched in a third pattern to form a third array of capture elements wherein each of the capture elements has at least one aperture large enough to accept and capture the pointed end of the sharp element and small enough to prevent the pointed end from passing through the aperture;

a fourth sheet bonded to the third sheet with a flexible material forming the second sandwich, the fourth sheet etched in a fourth pattern to form a fourth array of capture elements wherein the fourth array is offset by a fraction of a width dimension of one of the capture elements from the third array of capture elements and wherein each of the capture elements has at least one aperture large enough to accept and capture the pointed end of the sharp element and small enough to prevent the pointed end from passing through the aperture; and a flexible bonding material for bonding the first sandwich to the second sandwich to form a third sandwich having a first and a second side.

18. The flexible puncture proof material of claim 17 further comprising a flexible material bonded to the first and second side of the third sandwich.

19. The flexible puncture proof material of claim 18 wherein the flexible material comprises a nylon mesh bonded to the first and second sides of the third sandwich with silicone elastomer.

20. The flexible puncture proof material of claim 18 wherein the flexible material comprises a nylon film glued to the first and second side of the third sandwich.

21. The flexible puncture proof material of claim 18 further comprising:

a flexible material bonded to the first and second side of the first sandwich; and a flexible material bonded to the first and second side of the second sandwich.

22. The flexible puncture proof material of claim 17 wherein the first, second, third and fourth sheets comprise stainless steel.

23. The flexible puncture proof material of claim 17 wherein the capture elements are approximately 3 mils thick, approximately 40 mils long by 40 mils wide and have at least four apertures approximately 12 mils in diameter.

24. A flexible puncture proof material for preventing a puncture by a sharp element having a pointed end, the flexible puncture proof material comprising:

a first sandwich comprising a first sheet bonded to a second sheet wherein the first sheet is etched in a first pattern to form a first array of capture elements wherein each of the capture elements has at least one aperture large enough to accept and capture the pointed end of the sharp element and small enough to prevent the pointed end from passing through the aperture; and the second sheet is etched in a second pattern that couples each capture element in the first array of capture elements to at least one adjacent capture element in the first array.

25. The flexible puncture proof material of claim 24 further comprising:

a second etched sandwich substantially identical to the first etched sandwich;

a third etched sandwich substantially identical to the first etched sandwich;

a fourth etched sandwich substantially identical to the first etched sandwich; and a flexible bonding material for bonding together the first etched sandwich, the second etched sandwich, the third etched sandwich, and the fourth etched sandwich to form a fifth sandwich wherein the first etched sandwich, the second etched sandwich, the third etched sandwich, and the fourth etched sandwich are offset by a fraction of a width dimension of one of the capture elements from one another to close any vertical voids between the capture elements of the first, second, third and fourth sandwiches.

26. The flexible puncture proof material of claim 24 wherein:

the first sheet comprises a stainless steel sheet approximately 3 mils thick; and the second sheet comprises a stainless steel sheet approximately 1 mil thick.

27. The flexible puncture proof material of claim 24 wherein the capture elements are approximately 40 mils long by 40 mils wide and have at least four apertures approximately 12 mils in diameter.

28. A flexible puncture proof material for preventing a puncture by a sharp element having a pointed end, the flexible puncture proof material comprising:

a first sandwich comprising:

a first sheet etched to form a first plurality of capture elements for capturing the pointed end of the sharp element, the first plurality of capture elements being essentially identical and arranged in a first two dimensional array with each capture element coupled by partially etched portions of the first sheet to adjacent capture elements in the first two dimensional array;

a second sheet etched to form a second plurality of capture elements for capturing the pointed end of the sharp element, the second plurality of capture elements being essentially identical and arranged in a second two dimensional array with each capture element coupled by partially etched portions of the second sheet to adjacent capture elements in the second two dimensional array; and a first flexible layer for binding the first etched sheet to the second etched sheet to form the first sandwich;

wherein each of the plurality of capture elements has at least one aperture large enough to accept and capture the pointed end of the sharp element and small enough to prevent the pointed end from passing through the aperture.

29. The flexible puncture proof material of claim 28 further comprising:

a second sandwich substantially identical to the first sandwich; and a second flexible layer for binding the first sandwich to the second sandwich.

30. The flexible puncture proof material of claim 29 wherein the capture elements are approximately 40 mils long by 40 mils wide and have at least four apertures approximately 12 mils in diameter.

31. The flexible puncture proof material of claim 29 wherein the capture elements are approximately 3 mils thick and wherein the partially etched portions are approximately 1 mil thick.

32. A flexible puncture proof material for preventing a puncture by a sharp element having a pointed end, the flexible puncture proof material comprising:

a first sheet etched to form a first array of capture elements wherein each of the capture elements has a plurality of apertures large enough to accept and capture the pointed end of the sharp element and small enough to prevent the pointed end from passing through the aperture;

a second sheet etched to form a second array of capture elements, the second array of capture elements offset by a fraction of a width dimension of one of the capture elements from the first array of capture elements, wherein each of the capture elements has a plurality of apertures large enough to accept and capture the pointed end of the sharp element and small enough to prevent the pointed end from passing through the aperture; and means for vertically coupling the first sheet to the second sheet.

33. The flexible puncture proof material of claim 32 further comprising:

a third sheet etched to form a third array of capture elements wherein each of the capture elements has a plurality of apertures large enough to accept and capture the pointed end of the sharp element and small enough to prevent the pointed end from passing through the aperture;

a fourth sheet etched to form a fourth array of capture elements, the fourth array of capture elements offset by a fraction of a width dimension of one of the capture elements from the third array of capture elements, wherein each of the capture elements has a plurality of apertures large enough to accept and capture the pointed end of the sharp element and small enough to prevent the pointed end from passing through the aperture; and wherein the means for vertically coupling the first sheet to the second sheet comprises means for vertically coupling the third sheet and the fourth sheet to the first sheet and to the second sheet.

34. The flexible puncture proof material of claim 33 wherein the first, second, third and fourth sheets comprise stainless steel.

35. The flexible puncture proof material of claim 33 wherein the means for vertically coupling the first sheet to the second sheet and the means for vertically coupling the third sheet and the fourth sheet to the first sheet and to the second sheet comprises a plurality of pin means for vertically coupling the capture elements in each of the sheets, each pin means extending through an aperture in a capture element in each of the first, second, third and fourth arrays of capture elements.

36. The flexible puncture proof material of claim 35 wherein each pin means for vertically coupling comprises a first wire extending through an aperture in a capture element in each of the first, second, third and fourth arrays of capture elements.

37. The flexible puncture proof material of claim 36 wherein each pin means for vertically coupling further comprises a second wire welded on the ends of the first wire.

38. The flexible puncture proof material of claim 36 wherein each pin means for vertically coupling further comprises an enlargement on the ends of the first wire, the enlargement having a dimension greater than the diameter of an aperture.

39. The flexible puncture proof material of claim 33 wherein each of the capture elements has an N by N array of apertures.

40. The flexible puncture proof material of claim 36 wherein each pin means for vertically coupling comprises a first wire extending through an aperture in a corner of the N by N array of apertures in a capture element in each of the first, second, third and fourth arrays of capture elements.

41. The flexible puncture proof material of claim 33 further comprising an elastic means bound to the first array of capture elements for forming an elastic flexible puncture proof material.

42. The flexible puncture proof material of claim 41 wherein the elastic means comprises a silicone elastomer.

43. The flexible puncture proof material of claim 32 wherein the capture elements are approximately 3 mils thick, approximately 70 mils long by 70 mils wide and have at least nine apertures approximately 12 mils in diameter.

44. A flexible puncture proof material for preventing a puncture by a sharp element having a pointed end, the flexible puncture proof material comprising:

a first sheet bonded to a base material, the first sheet having a first array of capture elements wherein each of the capture elements has an array of apertures large enough to accept and capture the pointed end of the sharp element and small enough to prevent the pointed end from passing through the aperture;

a second sheet bonded to the base material, the second sheet having a second array of capture elements wherein each of the capture elements has an array of apertures large enough to accept and capture the pointed end of the sharp element and small enough to prevent the pointed end from passing through the aperture;

a third sheet bonded to the base material, the third sheet having a third array of capture elements wherein each of the capture elements has an array of apertures large enough to accept and capture the pointed end of the sharp element and small enough to prevent the pointed end from passing through the aperture;

a fourth sheet bonded to the base material, the fourth sheet having a fourth array of capture elements wherein each of the capture elements has an array of apertures large enough to accept and capture the pointed end of the sharp element and small enough to prevent the pointed end from passing through the aperture; and a flexible bonding material bonding the first, second, third and fourth sheets together, the sheets stacked and aligned so that the capture elements of the first, second, third and fourth sheets are offset by a fraction of a width dimension of one of the capture elements to close vertical voids between the capture elements on the sheets.

45. The flexible puncture proof material of claim 44 wherein the first, second, third and fourth sheets comprise stainless steel.

46. The flexible puncture proof material of claim 44 wherein the base material comprises Kapton.

47. The flexible puncture proof material of claim 44 wherein the flexible bonding material comprises silicone elastomer.

48. The flexible puncture proof material of claim 44 wherein the capture elements are approximately 3 mils thick, approximately 70 mils long by 70 mils wide and have at least nine apertures approximately 12 mils in diameter.

* * * * *